United States Patent
Katayama

(10) Patent No.: US 7,948,854 B2
(45) Date of Patent: May 24, 2011

(54) OPTICAL HEAD APPARATUS AND OPTICAL INFORMATION RECORDING/REPRODUCING APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 12/091,799

(22) PCT Filed: Oct. 27, 2006

(86) PCT No.: PCT/JP2006/321489
§ 371 (c)(1),
(2), (4) Date: Apr. 28, 2008

(87) PCT Pub. No.: WO2007/049738
PCT Pub. Date: May 3, 2007

(65) Prior Publication Data
US 2009/0046548 A1    Feb. 19, 2009

(30) Foreign Application Priority Data

Oct. 28, 2005  (JP) ................... 2005-314219
Oct. 11, 2006  (JP) ................... 2006-277256

(51) Int. Cl.
*G11B 7/00* (2006.01)
(52) U.S. Cl. ......... 369/112.02; 369/112.03; 369/112.05; 369/44.32
(58) Field of Classification Search ........................ None
See application file for complete search history.

(56) References Cited

U.S. PATENT DOCUMENTS

| 5,195,081 | A | 3/1993 | Usui |
| 6,487,160 | B1 * | 11/2002 | Iida et al. ................. 369/112.02 |
| 6,707,773 | B2 | 3/2004 | Katayama |
| 7,548,359 | B2 | 6/2009 | Murakami et al. |
| 7,626,900 | B2 | 12/2009 | Tanimoto |
| 7,643,395 | B2 | 1/2010 | Kim et al. |
| 2002/0041542 | A1 | 4/2002 | Sano et al. |
| 2005/0199778 | A1 | 9/2005 | Kadowaki et al. |
| 2005/0254391 | A1 | 11/2005 | Nagatomi et al. |

FOREIGN PATENT DOCUMENTS

| JP | 62248151 | 10/1987 |
| JP | 5-100114 | 4/1993 |
| JP | 07318862 | 12/1995 |
| JP | 9-081942 | 3/1997 |

(Continued)

OTHER PUBLICATIONS

US Patent Office issued an US Office Action dated Jan. 15, 2010, U.S. Appl. No. 11/792,939.

(Continued)

*Primary Examiner* — Joseph Haley
(74) *Attorney, Agent, or Firm* — Young & Thompson

(57) ABSTRACT

An optical head apparatus of an optical information recording/reproducing apparatus is provided with a light source. An objective lens focuses an output light emitted by said light source on a disc optical recording medium for which a groove or a pit for tracking is provided. T photo-detector receives a reflected light reflected by said optical recording medium. A polarizing splitter unit splits said output light and said reflected light. A quarter-wave plate disposed between said polarizing splitter section and said objective lens. A birefringence compensating unit reduces a change in an amplitude of a track error signal caused by birefringence in a protective layer of said optical recording medium.

15 Claims, 30 Drawing Sheets

FOREIGN PATENT DOCUMENTS

| | | |
|---|---|---|
| JP | 09306054 | 11/1997 |
| JP | 10124906 | 5/1998 |
| JP | 11-073658 | 3/1999 |
| JP | 11-219529 | 8/1999 |
| JP | 2000-076688 | 3/2000 |
| JP | 2000-155973 | 6/2000 |
| JP | 2000-155979 | 6/2000 |
| JP | 2000-182254 | 6/2000 |
| JP | 2001-110074 | 4/2001 |
| JP | 2001-155375 | 6/2001 |
| JP | 2001-236666 | 8/2001 |
| JP | 2002-092933 | 3/2002 |
| JP | 2002-237085 | 8/2002 |
| JP | 2002-245639 | 8/2002 |
| JP | 2002-279683 | 9/2002 |
| JP | 2002-358677 | 12/2002 |
| JP | 2002-367197 | 12/2002 |
| JP | 2003-016672 | 1/2003 |
| JP | 2003-045047 | 2/2003 |
| JP | 2003-051130 | 2/2003 |
| JP | 2003-091856 | 3/2003 |
| JP | 2003-132582 | 5/2003 |
| JP | 2003248118 | 9/2003 |
| JP | 2003-346365 | 12/2003 |
| JP | 2004039018 | 2/2004 |
| JP | 2004-069977 | 3/2004 |
| JP | 2004-070977 | 3/2004 |
| JP | 2004163225 | 6/2004 |
| JP | 2005044429 | 2/2005 |
| JP | 2005-317106 | 11/2005 |
| JP | 2005-353187 | 12/2005 |
| JP | 2006196156 | 7/2006 |

OTHER PUBLICATIONS

US Patent Office issued an US Office Action dated Jan. 21, 2010, U.S. Appl. No. 11/816,072.

International Search Report & Written Opinion of International Searching Authority mailed Nov. 21, 2006.

U.S. Office Action—U.S. Appl. No. 12/444,202—Dec. 28, 2010.

* cited by examiner

OPTICAL HEAD APPARATUS AND OPTICAL INFORMATION RECORDING/REPRODUCING APPARATUS

TECHNICAL FIELD

The present invention relates to an optical information recording/reproducing apparatus for recording/reproducing information onto or from an optical recording medium, and an optical head apparatus incorporated within the optical information recording/reproducing apparatus.

BACKGROUND ART

FIG. 26 shows the configuration of a conventional typical optical head apparatus. The optical head apparatus is provided with a semiconductor laser 1, a collimator lens 2, a polarizing beam splitter 3, a quarter-wave plate 4, an objective lens 6, a cylindrical lens 8, a convex lens 9 and a photo-detector 10. The output light emitted by the semiconductor laser 1, which serves as a light source, is collimated by the collimator lens 2. The collimated light enters into the polarizing beam splitter 3 as a P-polarized light, and almost 100% thereof enters the quarter-wave plate 4 after passing through the polarizing beam splitter 3. The quarter-wave plate 4 converts the incoming light from linear to circular polarized light when the incoming light passes therethrough. The circular polarized light is focused by the objective lens 6 onto a disc 7, which is a sort of optical recording medium. The reflected light reflected by the disc 7 passes through the objective lens 6 in the opposite direction and enters the quarter-wave plate 4. The quarter-wave plate 4 converts the incoming light from circular to linear polarized light when the incoming light passes therethrough. The direction of polarization of the linear-polarized light on this return path is orthogonal to that of the linear-polarized light on the outward path. The linear-polarized light enters the polarizing beam splitter 3 as an S-polarized light, and almost 100% thereof enters the cylindrical lens 8, after being reflected. This light passes through the cylindrical lens 8 and the convex lens 9 and is received by the photo-detector 10.

Such an optical system, which incorporates a polarizing beam splitter and a quarter-wave plate, is referred to as a polarization optical system. The optical head apparatus using a polarization optical system is featured in that there is nearly no light loss in the polarizing beam splitter which separates the light of the outward path and the light of the return path for both of the return and outward paths. Therefore, the optical head apparatus using a polarization optical system offers a high optical output in recording operations, while offering a high S/N ratio in reproducing operations; the optical head apparatus using a polarization optical system is mainly used as an optical head apparatus adapted to write-once read-many optical recording mediums and rewritable optical recording mediums. The optical head apparatus using a polarization optical system is also as an optical head apparatus adapted to read-only optical recording mediums.

Write-once-read-many optical recording mediums and rewritable optical recording mediums are usually provided with grooves for achieving tracking. When a track error signal is detected from these optical recording mediums, the detection is usually achieved by a push-pull method. The push-pull method involves receiving a reflected light from an optical recording medium by a photo-detector with the reflected light divided into two regions defined by a straight line which crosses the beam axis on a face vertical to the beam axis and extends in the direction corresponding to the tangential direction of the optical recording medium. Assuming that output signals from the photo-detector corresponding to these two regions are referred to as Ia are Ib, the sum signal is given by Ia+Ib, and the push-pull signal is given by Ia−Ib. The track error signal obtained by the push-pull method is given by (Ia−Ib)/(Ia+Ib). One index that represents the quality of the track error signal obtained by the push-pull method is the push-pull signal modulation factor. The push-pull signal modulation factor is obtained by dividing the amplitude of the push-pull signal by the level of the sum signal for the case when the focused spot on the optical recording medium crosses the groove of the optical recording medium. In other words, the push-pull signal modulation factor corresponds to the amplitude of the track error signal obtained by the push-pull method.

On the other hand, read-only optical recording mediums are usually provided with pits for achieving tracking. When a track error signal is detected from this optical recording medium, the detection is usually achieved by a DPD (Differential Phase Detection) technique. The DPD method involves receiving a reflected light from an optical recording medium by a photo-detector with the reflected light divided into four regions defined by straight lines which each cross the beam axis on a face vertical to the beam axis, one extending in the direction corresponding to the radial direction of the optical recording medium and the other extending in the direction corresponding to the tangential direction. Assuming that output signals from the optical detector corresponding to two regions positioned at one set of opposite angles out of the four regions are referred to as Ia and Ic, and output signals from the optical detector corresponding to other two regions positioned at the other set of opposite angles are referred to as Ib and Id, the track error signal (DPD signal) obtained by the DPD method is given by the temporal difference between (Ia+Ic) and (Ib+Id). One index which represents the quality of the track error signal obtained by the DPD method is the DPD signal amplitude. The DPD signal is defined as the amplitude of the DPS signal standardized by the duration of the channel clock for the case when the focused spot on the optical recording medium crosses a pit of the optical recording medium. That is, the DPD signal amplitude corresponds to the amplitude of the track error signal obtained by the DPD method.

In general, the push-pull signal modulation factor and the DPD signal amplitude varies depending on the in-plane position of the optical recording medium. When the push-pull signal modulation factor and the DPD signal amplitude largely vary depending on the in plane position of the optical recording medium, a gain of the track servo which is optimally adjusted for the position where the push-pull signal modulation factor and the DPD signal amplitude are high is excessively low for the position where the push-pull signal modulation factor and the DPD signal amplitude are low, causing the residual error in the track servo. Reversely, a gain of the track servo which is optimally adjusted for the position where the push-pull signal modulation factor and the DPD signal amplitude are low is excessively high for the position where the push-pull signal modulation factor and the DPD signal amplitude are high, resulting in the oscillation of the track servo. Therefore, it is necessary to decrease the changes in the push-pull signal modulation factor and DPD signal amplitude depending on the in-plane position of the optical recording medium, in order to achieve the stable track servo control for all the in-plane positions of the optical recording medium.

The allowed maximum change in the push-pull signal modulation factor depending on the in-plane position of the optical recording medium is defined by the written standards of the optical recording medium. The standard for the DVD-R system requires:

$$(PP_{max}-PP_{min})/(PP_{max}+PP_{min})<0.15,$$

where $PP_{max}$ and $PP_{min}$ are the maximum and minimum values of the push-pull signal modulation factor, respectively. When the maximum changes in the push-pull signal modulation factor and the DPD signal amplitude are equal to or less than the allowed maximum changes in the push-pull signal modulation factor defined for the DVD-R system, the stable track servo is achieved for all the in-plane positions of the optical recording medium. When the maximum changes in the push-pull signal modulation factor and the DPD signal amplitude exceed the allowed maximum changes in the push-pull signal modulation factor defined for the DVD-R system, this makes it difficult to achieve the stable track servo for all the in-plane positions of the optical recording medium. Therefore, an optical head apparatus and an optical information recording/reproducing apparatus which record or reproduce information onto or from such optical recording mediums require measures for suppressing the changes in the push-pull signal modulation factor and DPD signal amplitude depending on the in-plane position of the optical recording medium.

It should be noted that polycarbonate, which exhibits birefringence, is usually used for the protective layer of optical recording mediums, due to the low cost. The use of an optical head apparatus based on a polarization optical system for recording or reproducing information onto or from an optical recording medium with a protective layer exhibiting birefringence causes reduction in the amount of light received. Here, let us define the relation between the disc 7, which is an optical recording medium, and XYZ-coordinates as shown in FIG. 27. The X-axis is defined as the radius direction of the disc 7, the Y-axis as the tangential direction, and the Z-axis as the normal direction of the disc 7. The protective layer usually exhibits biaxial anisotropy in the refractive index, and the three main axes substantially coincide with the X-axis, the Y-axis and the Z-axis. Assuming that the three principal indices of refraction associated thereto are defined as $n_x$, $n_y$ and $n_z$, respectively, and that the values of in-plane birefringence and vertical birefringence are defined as $\Delta n_i$ and $\Delta n_v$, respectively, then, the value $\Delta n_i$ of the in-plane birefringence is defined as:

$$\Delta n_i = n_x - n_y,$$

and the value $\Delta n_v$ of the vertical birefringence is defined as:

$$\Delta n_v = (n_x+n_y)/2 - n_z.$$

The value $\Delta n_i$ of the in-plane birefringence depends on the manufacturing conditions of the protective layer and varies in accordance with the in-plane position of the optical recording medium. On the contrary, the value $\Delta n_v$ of the vertical birefringence is substantially uniquely determined in accordance with the material of the protective layer, kept approximately constant, independently of the in-plain position of the optical recording medium. When polycarbonate is used as the protective layer, the value $\Delta n_i$ of the in-plane birefringence varies over a range of about $\pm 3 \times 10^{-5}$, while the value $\Delta n_v$ of vertical birefringence is approximately constant within a range between about $6 \times 10^{-4}$ and about $8 \times 10^{-4}$. A technique for separately measuring the in-plane and vertical birefringence of the protective layer as thus described is disclosed in, for example, Japanese Laid Open Patent Application No. JP 2004-163225 A. The inventor of the present invention have found out that the above-described changes in the push-pull signal modulation factor and DPD signal amplitude depending on the in-plane position of the optical recording medium is caused by the changes in the in-plane birefringence depending on the in-plane position of the optical recording medium under the existence of the vertical birefringence. The influence of the birefringence is increased as the wavelength of the light source is reduced. Therefore, the HD DVD-R system and the HD DVD-ROM system, which use a light source with a wavelength of about 405 nm for recording/reproducing, experience larger changes in the push-pull signal modulation factor and the DPD signal amplitude than the DVD-R system and the DVD-ROM system, which uses a light source with a wavelength of about 660 nm for recording/reproducing.

FIG. 28 shows a calculation example of the relation between the value of in-plane birefringence and the sum signal level with the value of vertical birefringence used as a parameter, while FIG. 29 shows a calculation example of the relation between the value of in-plane birefringence and the push-pull signal amplitude with the value of vertical birefringence used as a parameter. Additionally, FIG. 30 shows a calculation example of the relation between the value of in-plane birefringence and the push-pull signal modulation factor with the value of vertical birefringence used as the parameter, which is obtained from the sum signal level shown in FIG. 28 and the push-pull signal amplitude shown in FIG. 29. The calculation conditions are as follows: the wavelength of the light source is 405 nm, the opening number of the objective lens is 0.65, the thickness of the protective layer of the optical recording medium is 0.6 mm, the pitch of the groove is 0.4 μm, and the depth of the groove is 25 nm. These conditions correspond to the conditions for the HD DVD-R system. The vertical axes of FIG. 28 and FIG. 29 are standardized at the sum signal level for the case when the groove is not formed on the optical recording medium. Black circles on the drawings indicate the calculation result for the value of vertical birefringence being 0, and white circles on the drawings indicate the calculation result for the value of vertical birefringence being $7 \times 10^{-4}$.

As shown in FIG. 28, the sum signal level shows the maximum value when the value $\Delta n_i$ of in-plane birefringence is 0, for both of the cases with or without the existence of vertical birefringence, and the sum signal level decreases as the absolute value of the value $\Delta n_i$ of in-plane birefringence is increased. On the other hand, as shown in FIG. 29, the push-pull signal amplitude shows the maximum value when the value $\Delta n_i$ of in-plane birefringence is 0, similarly to the sum signal level and the push-pull signal amplitude is decreased as the absolute value of the value $\Delta n_i$ of in-plane birefringence is increased, for the case when the vertical birefringence does not exist; however, for the case when the vertical birefringence exists, the push-pull signal amplitude is monotonously decreased as the value $\Delta n_i$ of in-plane birefringence is changed from positive to negative values. As a result, as shown in FIG. 30, the push-pull signal modulation factor is constant independently of the value $\Delta n_i$ of in-plane birefringence, when the vertical birefringence does not exist, while the push-pull signal modulation factor is monotonously decreased as the value $\Delta n_i$ of in-plane birefringence is changed from positive to negative values under the existence of the vertical birefringence.

For the case that the value $\Delta n_v$ of vertical birefringence is $7 \times 10^{-4}$, the foregoing $(PP_{max}-PP_{min})/(PP_{max}+PP_{min})$ greatly exceeds 0.15, which is the allowed maximum value defined in the standard for the DVD-R system, when the value $\Delta n_i$ of in-plane birefringence varies within a range between $+3 \times 10^{-5}$ (where the difference between the maximum and minimum values is $6 \times 10^{-5}$). In order to eliminate the necessity of taking measures for suppressing the change in the push-pull signal modulation factor depending on the in-plane position of the optical recording medium, $(PP_{max}-PP_{min})/(PP_{max}+PP_{min})$ is required to be less than 0.15, which is the allowed maximum value defined by the standard for the DVD-R system, and the variation in the value $\Delta n_i$ of in-plane birefringence is required to be reduced within a range of $\pm 1.15 \times 10^{-5}$ (the difference between the maximum and minimum values is $2.3 \times 10^{-5}$). Reversely, unless the variation in the value $\Delta n_i$ of in-plane birefringence is reduced within the range of $\pm 1.15 \times 10^{-5}$ (the difference between the maximum and minimum values is $2.3 \times 10^{-5}$), a measure is required for suppressing the change in the push-pull signal modulation factor depending on the in-plane position of the optical recording medium.

For the case that the value $\Delta n_v$ of vertical birefringence is $6 \times 10^{-4}$, a similar calculation has shown that, in order to eliminate the necessity of taking measures for suppressing the change in the push-pull signal modulation factor depending on the in-plane position of the optical recording medium, $(PP_{max}-PP_{pin})/(PP_{max}+PP_{min})$ is required to be less than 0.15, and the variation in the value $\Delta n_i$ of in-plane birefringence is required to be reduced within a range of $\pm 1.35 \times 10^{-5}$ (the difference between the maximum and minimum values is $2.7 \times 10^{-5}$). Reversely, unless the variation in the value $\Delta n_i$ of in-plane birefringence is reduced within the range of $\pm 1.35 \times 10^{-5}$ (the difference between the maximum and minimum values is $2.7 \times 10^{-5}$), a measure is required for suppressing the change in the push-pull signal modulation factor depending on the in-plane position of the optical recording medium.

Furthermore, for the case that the value $\Delta n_v$ of vertical birefringence is $8 \times 10^{-4}$, a similar calculation has shown that, in order to eliminate the necessity of taking measures for suppressing the change in the push-pull signal modulation factor depending on the in-plane position of the optical recording medium, $(PP_{max}-PP_{min})/(PP_{max}+PP_{min})$ is required to be less than 0.15, and the variation in the value $\Delta n_i$ of in-plane birefringence is required to be reduced within a range of $1.0 \times 10^{-5}$ (the difference between the maximum and minimum values is $2.0 \times 10^{-5}$). Reversely, unless the variation in the value $\Delta n_i$ of in-plane birefringence is reduced within the range of $\pm 1.0 \times 10^{-5}$ (the difference between the maximum and minimum values is $2.0 \times 10^{-5}$), a measure is required for suppressing the change in the push-pull signal modulation factor depending on the in-plane position of the optical recording medium.

In summary, in order to eliminate the necessity of the measure for suppressing the change in the push-pull signal modulation factor depending on the in-plane position of the optical recording medium, $(PP_{max}-PP_{min})/(PP_{max}+PP_{min})$ is required to be less than 0.15 for the value $\Delta n_v$ of vertical birefringence ranging between $6 \times 10^{-4}$ and $8 \times 10^{-4}$, and the product of $\Delta n_v$ and $(\Delta n_{imax}-\Delta n_{imin})$ is required to be equal to or less than $1.6 \times 10^{-8}$, where the maximum and minimum values of in-plane birefringence are defined as $\Delta n_{imax}$, $\Delta n_{imin}$, respectively. Reversely, unless the product of $\Delta n_v$ and $(\Delta n_{imax}-\Delta n_{imin})$ is reduced to be equal to or less than $1.6 \times 10^{-8}$, a measure is required for suppressing the change in the push-pull signal modulation factor depending on the in-plane position of the optical recording medium.

When the value $\Delta n_i$ of the in-plane birefringence ranges in a range of $\pm 3 \times 10^{-5}$ (the difference between the maximum and minimum values is $6 \times 10^{-5}$), on the other hand, a similar calculation has shown that the value $\Delta n_v$ of vertical birefringence should be adjusted to $2.7 \times 10^{-4}$ or less in order to reduce $(PP_{max}-PP_{min})/(PP_{max}+PP_{min})$ below 0.15. In other words, $(PP_{max}-PP_{min})/(PP_{max}+PP_{min})$ is reduced below 0.15 by the reduction of the effective value $\Delta n_v$ of vertical birefringence down to $2.7 \times 10^{-4}$ or less, which is a measure for suppressing the change in the push-pull signal modulation factor depending on the in plane position of the optical recording medium, even when the value $\Delta n_i$ of in-plane birefringence varies over a range of $+3 \times 10^{-5}$ (the difference between the maximum and minimum values is $6 \times 10^{-5}$).

FIG. 31 shows a calculation example of the relation between the value of in-plane birefringence and the DPD signal amplitude with the value of vertical birefringence used as a parameter. The calculation conditions are as follows: the wavelength of the light source is 405 nm, the opening number of the objective lens is 0.65, the thickness of the protective layer of the optical recording medium is 0.6 mm, the pitch of the pits is 0.4 μm, and the depth of the pits is 25 nm. These conditions correspond to the conditions for the HD DVD-ROM system. The vertical axis of FIG. 31 is standardized by the duration of the channel clock. The black circles on the drawing indicate the calculation result for the value of vertical birefringence being 0, and the white circles on the drawing indicate the calculation result for the value of vertical birefringence being $7 \times 10^{-4}$.

As shown in FIG. 31, the DPD signal amplitude is constant independently of the value $\Delta n_i$ of in-plane birefringence when no vertical birefringence exists; however, under the existence of vertical birefringence, the DPD signal amplitude is monotonously decreased as the value $\Delta n_i$ of in-plane birefringence is changed from positive to negative values.

Consideration is then given to the mechanism in which the variation in the in-plane birefringence under the existence of the vertical birefringence causes the changes in the push-pull signal modulation factor and the DPD signal amplitude as mentioned above. When the protective layer of the disc 7 is free from birefringence, the reflected light from the disc 7 is converted into a S-polarized light with respect to the polarizing beam splitter 3 after passing through the quarter-wave plate 4. Therefore, nearly 100% of this light is reflected by the polarizing beam splitter 3 and received by the photo-detector 10. On the contrary, the birefringence of the protective layer of the disc 7 causes the reflected light from the disc 7 to be converted into an elliptically-polarized light after passing through the quarter-wave plate 4. That is, the S-polarized component for the polarizing beam splitter 3 is decreased, while the P-polarized component is generated. Accordingly, nearly 100% of the S-polarized component is reflected by the polarizing beam splitter 3 and received by the photo-detector 10, while nearly 100% of the P-polarized component passes through the polarizing beam splitter 3 and returns to the semiconductor laser 1. This is the reason of the decrease in the amount of light received by the photo-detector 10.

Although the in-plane and vertical birefringences both decrease the amount of light received by the photo-detector, the influences on the light passing through the protective layer of the optical recording medium are different between the in-plane and vertical birefringences. The birefringence of the protective layer offers an optical phase difference between the polarization components in the X-axis and Y-axis directions for the light passing through the protective layer. In the following, the optical phase difference is defined as positive when the phase of the polarization component in the X-axis direction leads ahead of the phase of the polarization component in the Y-axis direction, while the optical phase difference is defined as negative when the phase of the polarization component in the X-axis direction lags behind the phase of the polarization component in the Y-axis direction. The influence of the in-plane birefringence on the light passing through the protective layer of the optical recording medium does not depend on the input direction to the optical recording medium and the incident angle thereof. Positive in-plane birefringence causes a constant negative optical phase difference over a section vertical to the beam axis of the light passing through the protective layer, while negative in-plane birefringence causes a constant positive optical phase difference over the section vertical to the beam axis of the light passing through the protective layer. On the contrary, the influence of the vertical birefringence on the light passing through the protective layer of the optical recording medium depends on the incident direction and angle to the optical recording medium. Assuming that the original point is defined as the intersection of the beam axis on a section vertical to the beam axis of the light passing through the protective layer, a positive optical phase difference is generated in the vicinity of the X-axis in the region of X<0 and the region of X>0 except the region of X=0, while the negative optical phase difference is generated in the vicinity of the Y-axis in the region of Y<0 and the region of Y>0 except the region of Y=0. Also, the optical phase difference generated at the original point is 0, and the absolute value of the generated optical phase difference is increased with the distance the original point.

When the focused spot formed on the optical recording medium crosses the groove or pit on the optical recording medium, the change in the magnitude of the reflected light from the optical recording medium is mainly generated in the region of X<0 and the region X>0 except the region of X=0, in the vicinity of the X-axis. That is, the lights in these regions contribute to the increases in the push-pull signal modulation factor and the DPD signal amplitude. For the case when the in-plane birefringence is positive under the existence of the vertical birefringence, the optical phase differences caused by the in-plane and vertical birefringences are cancelled out in the region of X<0 and the region X>0 except the region of X=0 in the vicinity of the X-axis, thereby decreasing the absolute value of the optical phase difference, while the optical phase differences caused by the in-plane and vertical birefringences are added together in the region of Y<0 and the region of Y>0 except the region of Y=0 in the vicinity of the Y-axis, thereby increasing the absolute value of the optical phase difference. The proportion of light received by the photo-detector is decreased as the absolute value of the optical phase difference is increased, and therefore the proportion of light received by the photo-detector is increased in the region of X<0 and the region X>0 except the region of X=0 in the vicinity of the X-axis, as compared with the region of Y<0 and the region of Y>0 except the region of Y=0 in the vicinity of the Y-axis. This results in the increases in the push-pull signal modulation factor and the DPD signal amplitude. For the case that the in-plane birefringence is negative under the existence of the vertical birefringence, on the other hand, the optical phase differences caused by the in-plane and vertical birefringences are added together in the region of X<0 and the region X>0 except the region of X=0 in the vicinity of the X-axis, thereby increasing the absolute value of the optical phase difference, and the optical phase differences caused by the in-plane and vertical birefringence are cancelled out in the region of Y<0 and the region of Y>0 except the region of Y=0 in the vicinity of the Y-axis, thereby decreasing the absolute value of the optical phase difference. The proportion of the light received by the photo-detector is decreased as the absolute value of the optical phase difference is increased, and therefore the proportion of the light received by the photo-detector is reduced in the region of X<0 and the region X>0 except the region of X=0 as compared with the region of Y<0 and the region of Y>0 except the region of Y=0 in the vicinity of the Y-axis. This results in the decreases in the push-pull signal modulation factor and the DPD signal amplitude.

Substrates, which correspond to the protective layers for substrate-incident optical recording mediums, such as HD-DVDs, are usually manufactured through injection molding. In this case, the in-plane birefringence depends on the position in the radius direction of the optical recording medium, while exhibiting substantially no dependency on the position in the tangential direction. Specifically, the in-plane birefringence is positive in the inner portion of the optical recording medium, and the in-plane birefringence monotonously decreases from the inside to the outside; the in-plane birefringence is negative in the outer portion. Therefore, the push-pull signal modulation factor and the DPD signal amplitude are high in the inner portion of the optical recording medium, monotonously decreasing as it goes from inner to outer portion; the push-pull signal modulation factor and the DPD signal amplitude are low in the outer portion. On the contrary, covers, which correspond to the protective layers for cover-incident optical recording mediums such as BDs, are usually manufactured by punching of sheets. In this case, the in-plane birefringence depends on the position in the tangential direction of the optical recording medium, while exhibiting substantially no dependency on the position in the radius direction. Specifically, the in-plane birefringence alternately shows a positive local maximum value and a negative local minimum value twice at intervals of 90 degrees for one circulation of the optical recording medium. Therefore, the push-pull signal modulation factor and the DPD signal amplitude alternately show a high maximal value and a low minimal value twice at intervals of 90 degrees for one circulation of the optical recording medium.

In relation to the foregoing descriptions, a measuring method of birefringence properties of the optical recording medium is disclosed in Japanese Laid Open Patent Application No. JP-A 2004-163225. In this conventional measuring method of birefringence properties, light is emitted onto a measurement target medium through an objective lens having a numerical aperture equal to or greater than a predetermined numerical aperture, and the light amount of the polarization component in a specific direction within the reflected light reflected on the reflection surface of the measurement target medium is measured and defined as a first amount of light APH. Light is emitted onto the measurement target medium through the objective lens having the numerical aperture equal to or greater than the predetermined numerical aperture, and the light amount of the polarization components in the specific direction and in the direction orthogonal to the specific direction within the reflected light reflected on the reflection surface of the measurement target medium is measured and defined as a second light quantity ANH. The vertical birefringence property of the measurement target medium is determined on the basis of the ratio APH/ANH of the first and second light amounts and the in-plane birefringence property of the measurement target medium.

An optical disc apparatus is also disclosed in Japanese Laid Open Patent Application No. JP-A2003-248118. Formed on a wavelength plate in this conventional optical disc apparatus are micro cyclic structures sized half or less of the wavelength of the light within a targeted wavelength range. Two substrates are prepared which are opposed with each other with the micro cyclic structures shifted by half a cycle and engaged with each other. The interval between these substrates is adjusted to vary the overlap amount of the micro cyclic structure. The thus-configured wavelength plate, which has a combined birefringence structure incorporating birefringence structures each having superior controllability of the birefringence property through changing the shape to provide a variable phase difference, covers a wide usage range, adaptably changing the polarization state for the light of wavelengths over the entire desired wavelength range.

Also, an optical pickup apparatus is disclosed in Japanese Laid Open Patent Application No. JP-A 2004-39018. This conventional optical pickup apparatus emits light onto the recording surface of an information recording medium and receives the reflected light from the recording surface. The optical pickup apparatus is provided with: an optical system including at least one light source, an objective lens for focusing the light beam emitted from the light source onto the recording surface, and an optical element arranged in the optical path of the light beam emitted from the light source and to the objective lens, which element includes an electro-optic crystal having a refractive index distribution in accordance with the voltage applied through an electrode and exhibiting a longitudinal electro-optic effect for compensating the astigmatism component in the wave aberration of the light beam focused on the recording surface, which system guides the return light beam reflected on the recording surface to a predetermined light receiving position; and a photo-detector arranged on the light reception position.

DISCLOSURE OF INVENTION

An object of the present invention is to provide an optical head apparatus and an optical information recording/reproducing apparatus, which solve the above-mentioned problems of the conventional optical head apparatus using a polarization optical system and suppress the change in the track error signal amplitude depending on the in-plane position of the optical recording medium.

In an aspect of the present invention, an optical head apparatus is provided with a light source, an objective lens, a photo-detector, a polarizing splitter unit, a quarter-wave plate, and a birefringence compensating unit to reduce the change in the track error signal amplitude caused by the birefringence in the protective layer of an optical recording medium. The objective lens focuses an output light emitted by the light source on the disc-shaped optical recording medium for which a groove or a pit for tracking is provided. The photo-detector receives a reflected light reflected by the optical recording medium. The polarizing splitter unit splits the output light and the reflected light. The quarter-wave plate is disposed between the polarizing splitter section and the objective lens. The birefringence compensating unit reduces the change in the amplitude of the track error signal caused by birefringence in the protective layer of the optical recording medium.

In the present invention, the protective layer exhibits vertical birefringence and in-plane birefringence, the in-plane birefringence varying depending on an in-plane position. The birefringence compensating unit provides compensation of the vertical birefringence for reducing the change in the amplitude of the track error signal depending on the variation in the in-plane birefringence. The track error signal is detected by a push-pull method or a DPD method. The birefringence compensating unit provides an optical phase difference for the light passing through the protective layer, so as to cancel the optical phase difference caused by the vertical birefringence. The birefringence compensating unit is provided between the quarter-wave plate and the objective lens.

In the present invention, the birefringence compensating unit includes a material member exhibiting uniaxial anisotropy in refractive index. The birefringence compensating unit is divided into a plurality of regions by a plurality of straight lines crossing a beam axis around the beam axis. At least a group of regions out of the plurality of regions have the optic axis of the material member directed in a predetermined direction and are further divided in a plurality of fan-shaped regions by a circular arc(s) of one or more circles with center at the beam axis, the group of regions being positioned symmetrically with respect to the beam axis and arranged in a direction corresponding to a radial direction of the optical recording medium. Each of the plurality of fan-shaped regions is configured so that the absolute value of the optical phase difference between the polarization component in the direction parallel to the optic axis and the polarization component in the direction vertical to the optic axis is set to a predetermined value. The predetermined direction of the optic axis of the member is substantially directed in a radial direction of the circular arc or substantially directed in a tangential direction of the circular arc.

The birefringence compensating unit is formed as an isotropic material member provided with uniaxial anisotropy in refractive index by form birefringence. The birefringence compensating unit is provided with a radial grating with center at a beam axis or a concentric grating with center at the beam axis.

In another aspect of the present invention, an optical information recording/reproducing apparatus is provided with the above-described optical head apparatus, a first circuit, a second circuit, and a third circuit. The first circuit controls the output of the light source. T second circuit generates a readout signal, a focus error signal, and a track error signal based on the output signal outputted from the photo-detector. The third circuit controls the position of the objective lens based on the focus error signal and the track error signal. In recording operations, the first circuit drives the light source based on a recording signal for recording data onto the optical recording medium. In the reproducing operations, the first circuit drives the light source with a constant output.

The optical head apparatus according to the present invention is usable for a disc-shaped optical recording medium provided with a groove or pits for achieving tracking which medium includes a protective layer exhibiting vertical birefringence and in-plane birefringence, the in-plane birefringence being dependent on the in-plane position; the optical head apparatus, which is provided with a light source; an objective lens focusing the output light emitted by the light source on the optical recording medium; a photo-detector receiving a reflected light reflected by the optical recording medium; polarizing splitter means splitting the output light and the reflected light; a quarter-wave plate disposed between the polarizing splitter section and the objective lens, is characterized in further including vertical birefringence compensating means providing the compensation of the vertical birefringence of the protective layer of said optical recording medium for reducing the change in the track error signal amplitude depending on said in-plane birefringence.

The change in the track error signal amplitude depending on the in-plane position of the optical recording medium results from the variation of the in-plane birefringence depending on the in-plane position of the optical recording medium under the existence of the vertical birefringence. The vertical birefringence in the protective layer of the optical recording medium causes a predetermined optical phase difference between the polarization component in a predetermined direction and the polarization component in the direction orthogonal thereto, when the light passes through the protective layer of the optical recording medium. The optical head apparatus and the optical information recording/reproducing apparatus according to the present invention provides the light with an optical phase difference so as to cancel the optical phase difference with the vertical birefringence compensating means. The compensation of the vertical birefringence thus described achieves a substantially constant track error signal amplitude independently of the in-plane position of the optical recording medium as is the case that there is no vertical birefringence, even when the in-plane birefringence varies depending on the in-plane position of the optical recording medium.

The present invention provides an optical head apparatus and an optical information recording/reproducing apparatus which suppress the change in the track error signal amplitude depending on the in-plane position of the optical recoding medium. The change in the track error signal amplitude depending on the in-plane position of the optical recording medium results from the variation of the in-plane birefringence depending on the in-plane position of the optical recording medium under the existence of the vertical birefringence. Therefore, the compensation of the vertical birefringence of the protective layer of the optical recording medium allows the reduction of the change in the track error signal amplitude depending on the in-plane position of the optical recording medium.

BEST MODE FOR CARRYING OUT THE INVENTION

Exemplary embodiments of the present invention will be described below with reference to the drawings.

Figure 25:
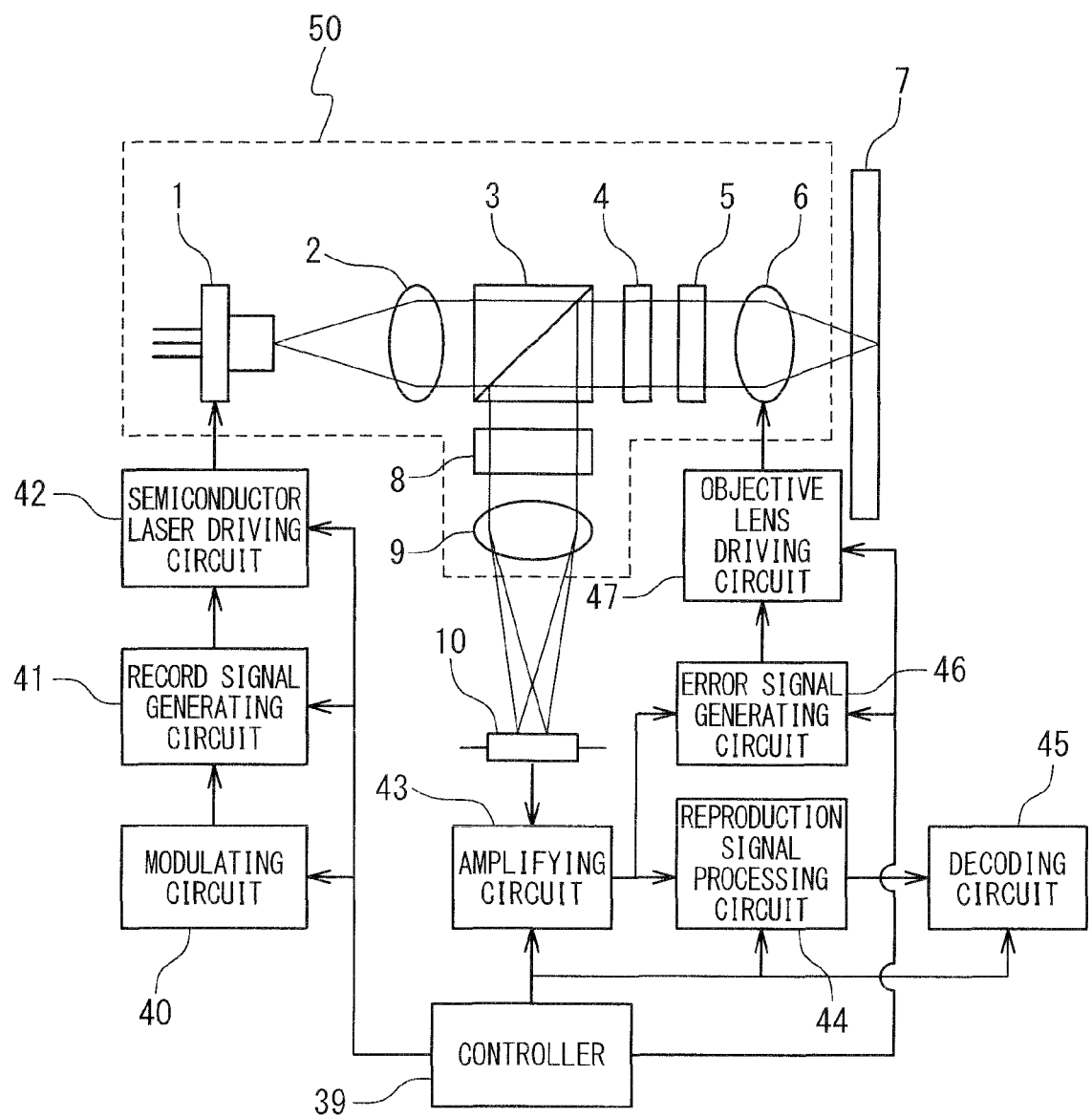
FIG. 25 is a view showing a configuration of an optical information recording reproducing apparatus according to exemplary embodiments of the optical information recording/reproducing apparatus of the present invention.
Figure 26:
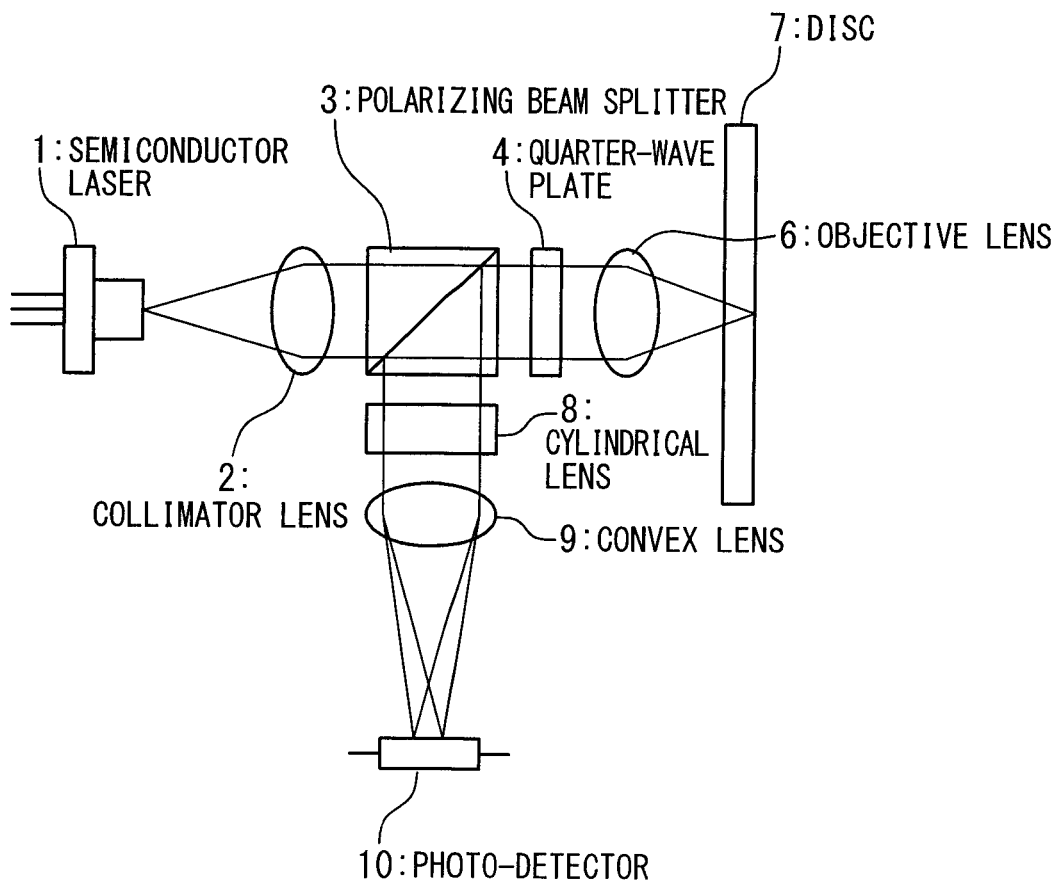
FIG. 26 is a view showing the configuration of the conventional typical optical head apparatus.

FIG. 25 shows the configuration of an optical information recording reproducing apparatus according to an exemplary embodiment of the optical information recording/reproducing apparatus of the present invention. The optical information recording reproducing apparatus is provided with a controller 39, a modulating circuit 40, a record signal generating circuit 41, a semiconductor laser driving circuit 42, an amplifying circuit 43, a reproduced signal processing circuit 44, a decoding circuit 45, an error signal generating circuit 46, an objective lens driving circuit 47 and an optical head apparatus 50.

The modulating circuit 40 modulates data to be recorded to the disc 7, in accordance with a modulation scheme. The record signal generating circuit 41 generates a record signal for driving the semiconductor laser 1 within the optical head apparatus 50 in accordance with a record strategy, on the basis of the signal modulated by the modulating circuit 40. The semiconductor laser driving circuit 42 supplies a current in response to the record signal to the semiconductor laser 1, on the basis of the record signal generated by the record signal generating circuit 41 to drive the semiconductor laser 1. This achieves data recording onto the disc 7.

On the other hand, the amplifying circuit 43 amplifies the outputs from light receiving units within the photo-detector 10 provided in the optical head apparatus 50. The reproduced signal processing circuit 44 provides RF signal generation, waveform equalization and binarization on the basis of the signal amplified by the amplifying circuit 43. The decoding circuit 45 decodes the signal binarized in the reproduced signal processing circuit 44, in accordance with a demodulation scheme. This achieves data reproduction from the disc 7.

Additionally, the error signal generating circuit 46 generates a focus error signal and a track error signal on the basis of the signal amplified by the amplifying circuit 43. In accordance with the focus error signal and the track error signal generated by the error signal generating circuit 46, the objective lens driving circuit 47 supplies currents corresponding to the focus error signal and the track error signal to an actuator (not shown) which drives the objective lens 6, to drive the objective lens 6.

Moreover, the optical system other than the disc 7 is driven in the radius direction of the disc 7 by a positioner (not shown), and the disc 7 is driven and rotated by a spindle (not shown). This provides the focus, track, positioner and spindle servo controls.

The circuits related to the data recording between the modulating circuit 40 and the semiconductor laser driving circuit 42, the circuits related to the data reproduction between the amplifying circuit 43 and the decoding circuit 45, and the circuits related to the servo controls between the amplifying circuit 43 and the objective lens driving circuit 47 are controlled by the controller 39.

This exemplary embodiment is implemented as optical information recording reproducing apparatus which carries out the recording onto and the reproduction from the disc 7.

Alternatively, an exemplary embodiment of the optical information recording/reproducing apparatus of the present invention may be implemented as a read-only optical information apparatus which carries out only the reproduction from the disc 7. In this case, the semiconductor laser 1 is not driven by the semiconductor laser driving circuit 42 in accordance with the record signal; instead, the semiconductor laser 1 is driven so that the power of output light is kept at a constant value.

Figure 1:
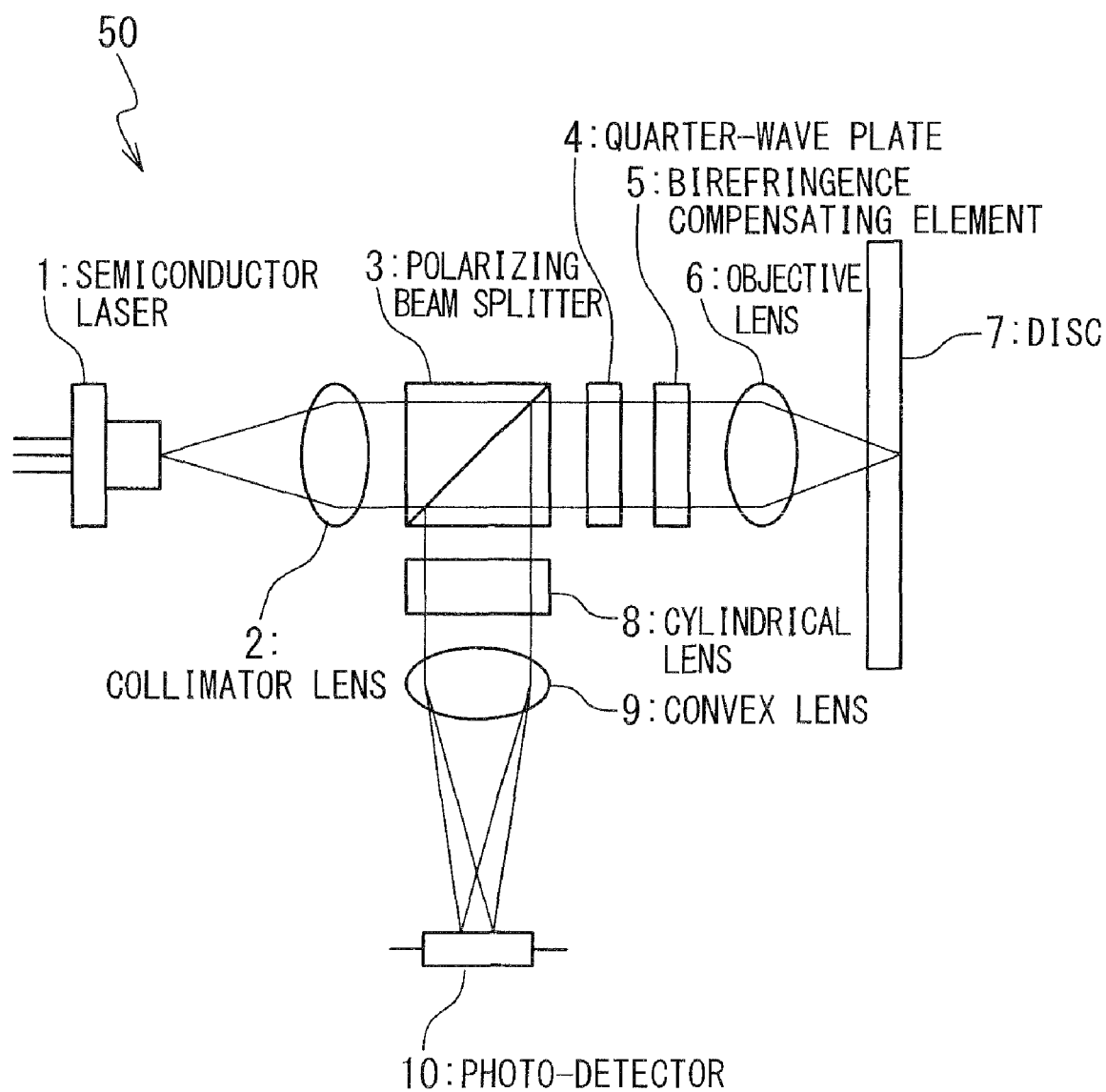
FIG. 1 is a view showing a configuration of an optical head apparatus provided within an optical information recording reproducing apparatus according to exemplary embodiments of the optical information recording/reproducing apparatus of the present invention.

FIG. 1 shows the configuration of the optical head apparatus 50. The optical head apparatus 50 is provided with a semiconductor laser 1, a collimator lens 2, a polarizing beam splitter 3, a quarter-wave plate 4, a birefringence compensating element 5, an objective lens 6, a cylindrical lens 8, a convex lens 9 and a photo-detector 10.

The output light emitted by the semiconductor laser 1, which serves as a light source, is collimated by the collimator lens 2. The collimated light enters into the polarizing beam splitter 3 as a P-polarized light, and almost 100% thereof enters the quarter-wave plate 4 after passing through the polarizing beam splitter 3. The quarter-wave plate 4 converts the incoming light from linear to circular polarized light when the incoming light passes therethrough. The circular polarized light is focused by the objective lens 6 onto the disc 7, which is a sort of optical recording medium.

The reflected light reflected by the disc 7 passes through the objective lens 6 in the opposite direction and enters the quarter-wave plate 4. The quarter-wave plate 4 converts the incoming light from circular to linear polarized light when the incoming light passes therethrough. The direction of polarization of the linear-polarized light on this return path is orthogonal to that of the linear-polarized light on the outward path. The linear-polarized light enters the polarizing beam splitter 3 as an S-polarized light, and almost 100% thereof enters the cylindrical lens 8, after being reflected. This light passes through the cylindrical lens 8 and the convex lens 9 and is received by the photo-detector 10.

The photo-detector 10 is placed at the middle between the two focal lines of the cylindrical lens 8 and the convex lens 9. The photo-detector 10 includes four light receiving units separated by a division line in the direction corresponding to the radius direction of the disc 7 and a division line in the direction corresponding to the tangential direction. In accordance with the outputs from the respective light receiving units, the focus error signal is obtained by an astigmatism technique, while the track error signal and the RF signal are obtained based on a push-pull method or a DPD method.

First Exemplary Embodiment

Figure 2:
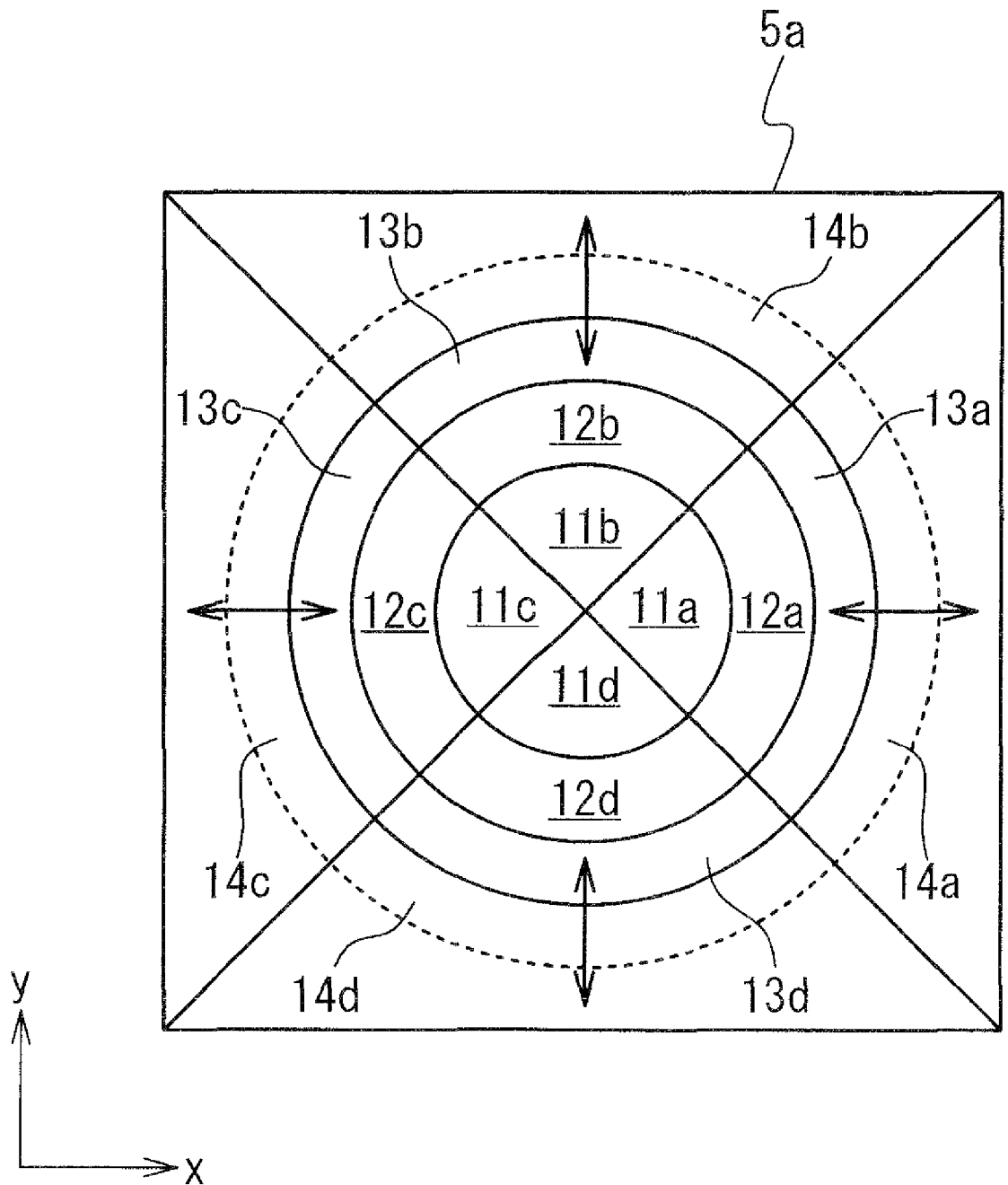
FIG. 2 is a plan view of a birefringence compensating element used in a first exemplary embodiment of the optical head apparatus of the present invention.

In a first exemplary embodiment of the optical head apparatus of the present invention, a birefringence compensating element 5a, the plan view of which is shown in FIG. 2, is used as the birefringence compensating element 5 within the optical head apparatus 50, the configuration of which is shown in FIG. 1.

FIG. 2 is a plan view of the birefringence compensating element 5a. The birefringence compensating element 5a is divided into four regions (denoted by the suffixes a to d) at intervals of 90° in the tangential direction with two straight lines which cross the beam axis. Moreover, each region is divided into four regions (denoted by the numerals 11 to 14) in the radius direction by three concentric circles whose centers are located on the beam axis. In the following descriptions, the groups of regions quartered at intervals of 90° in the tangential direction, namely, the groups of regions to which a to d are attached as the suffixes are referred to as the region groups a to d. Also, the groups of regions quartered in the radius direction, namely, the groups of regions to which the numerals "11" to "14" are assigned are referred to as the region groups 11 to 14. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5a includes members each of which exhibits uniaxial anisotropy in the refractive index. The arrows in the drawing indicate the directions of the optic axes of these members in the respective regions. The optic axes in the region groups a and c are directed in the directions of 0° with respect to the x-axis in the drawing. The optic axes in the region groups b and d are directed in the directions of 90° with respect to the x-axis in the drawing. The absolute values of the optical phase differences between the polarization components in the directions parallel and vertical to the optic axis are 0° in the region group 11, 18° in the region group 12, 36° in the region group 13, and 54° in the region group 14. The design of the birefringence compensating element 5a will be described later.

Second Exemplary Embodiment

Figure 3:
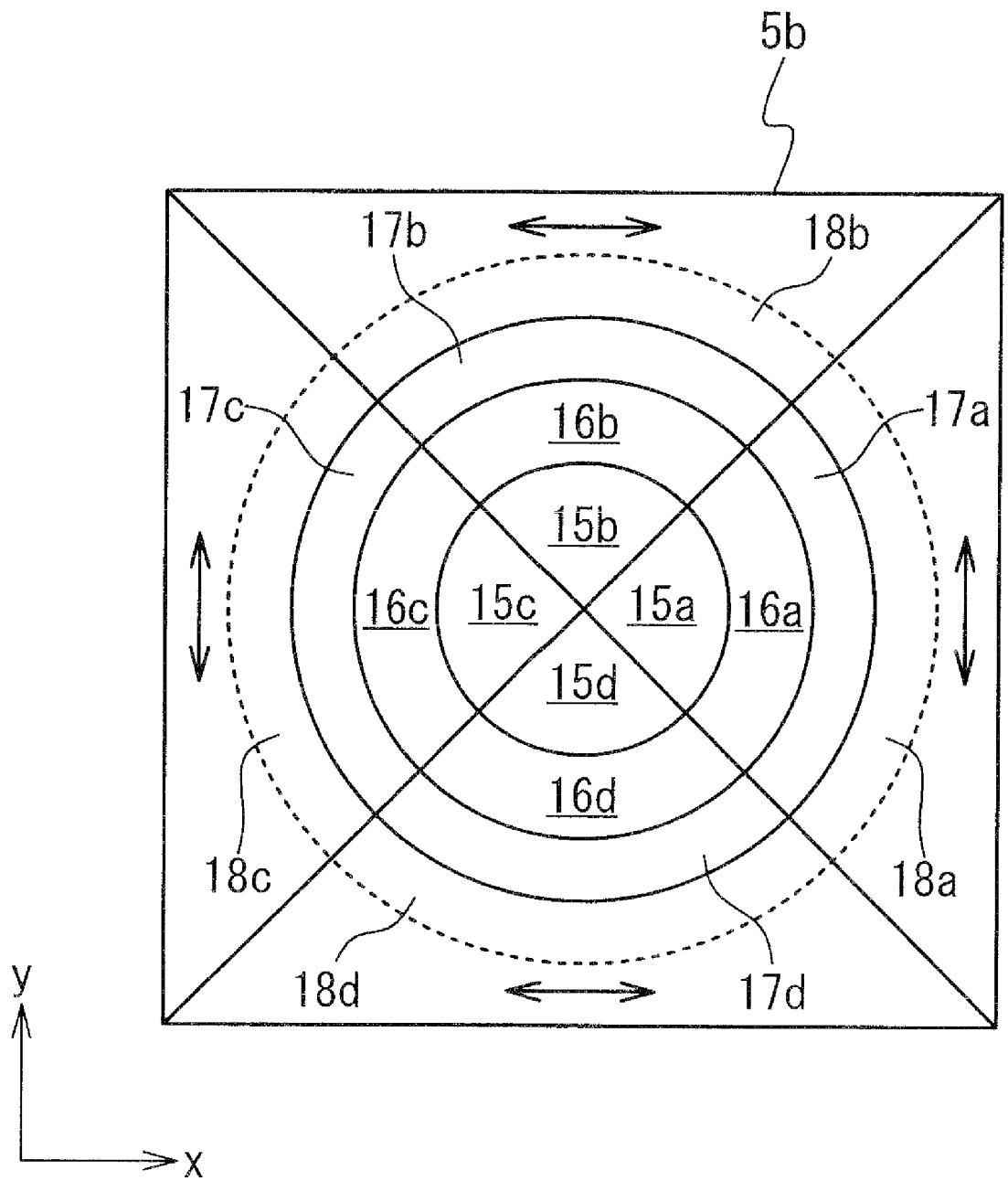
FIG. 3 is a plan view of a birefringence compensating element used in a second exemplary embodiment of the optical head apparatus of the present invention.

In a second exemplary embodiment of the optical head apparatus of the present invention, a birefringence compensating element 5b, the plan view of which is shown in FIG. 3, is used as the birefringence compensating element 5 in the optical head apparatus 50, the configuration which is shown in FIG. 1.

FIG. 3 is the plan view of the birefringence compensating element 5b. The birefringence compensating element 5b is divided into four regions (denoted by the suffixes a to d) at intervals of 90° in the tangential direction by two straight lines which cross the beam axis. Each region is divided into four regions (denoted by the numerals 15 to 18) in the radius direction by the three concentric circles whose centers are located on the beam axis. In the following descriptions, the groups of regions quartered at intervals of 90° in the tangential direction, namely, the groups of regions to which a to d are attached as the suffixes are referred as the region groups a to d. Also, the groups of regions quartered in the radius direction, namely, the groups of regions to which the numerals "15" to "18" are assigned are referred to as the region groups 15 to 18. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5b includes members each of which exhibits uniaxial anisotropy in the refractive index. The arrows in the drawing indicate the directions of the optic axes of these members in the respective regions. The optic axes in the region groups a and c are directed in the directions of 90° with respect to the x-axis in the drawing. The optic axes in the region groups b and d are directed in the directions of 0° with respect to the x-axis in the drawing. The absolute values of the optical phase differences between the polarization components in the directions parallel and vertical to the optic axis are 0° in the region group 15, 18° in the region group 16, 36° in the region group 17, and 54° in the region group 18. The design of the birefringence compensating element 5b will be described later.

Third Exemplary Embodiment

Figure 4:
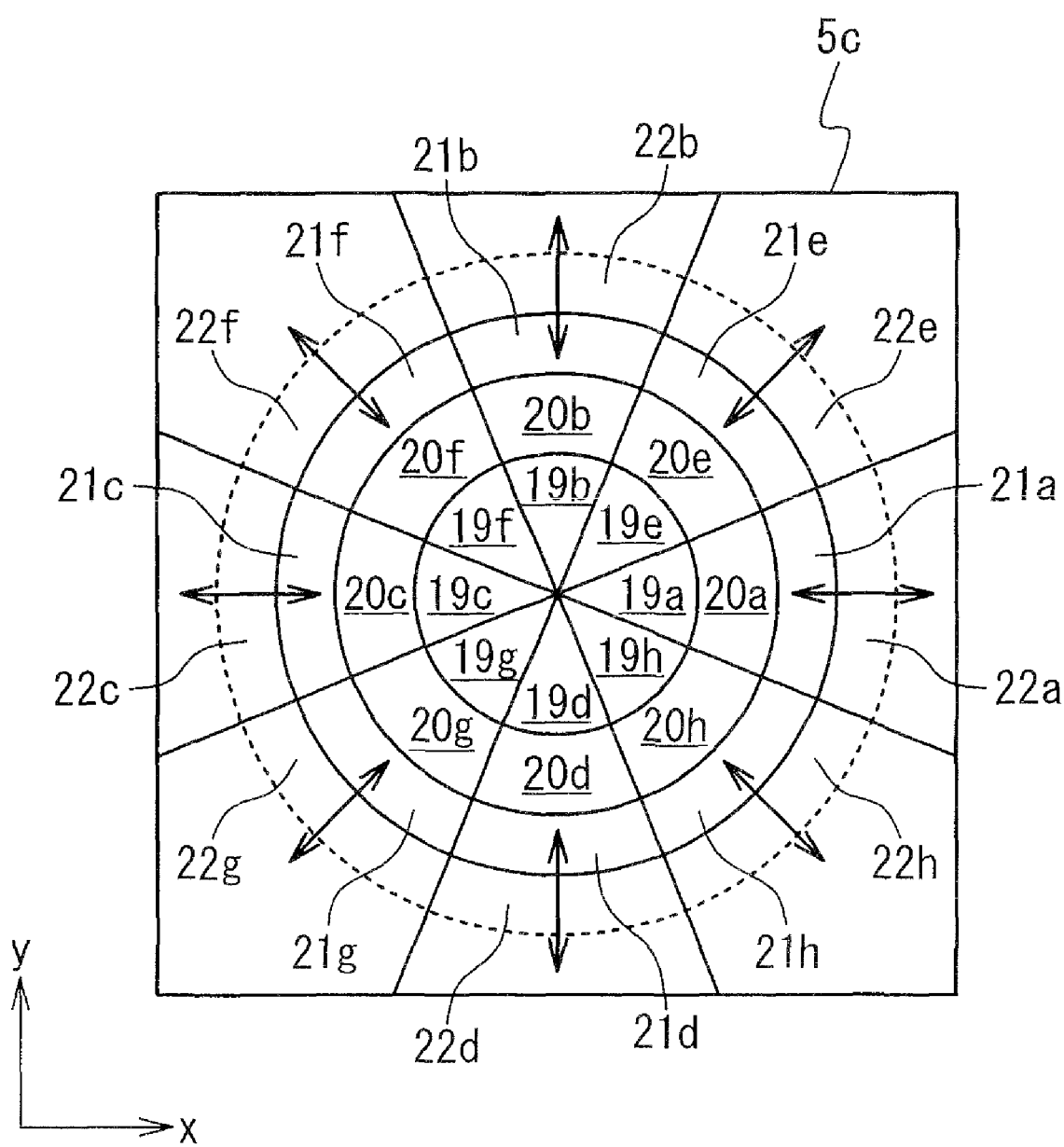
FIG. 4 is a plan view of a birefringence compensating element used in a third exemplary embodiment of the optical head apparatus of the present invention.

In a third exemplary embodiment of the optical head apparatus of the present invention, a birefringence compensating element 5c, the plan view of which is shown in FIG. 4, is used as the birefringence compensating element 5 in the optical head apparatus 50, the configuration of which is shown in FIG. 1.

FIG. 4 is the plan view of the birefringence compensating element 5c. The birefringence compensating element 5c is divided into eight regions (denoted by the suffixes a to h) at intervals of 45° in the tangential direction by four straight lines which cross the beam axis. Each region is divided into four regions (denoted by the numerals 19 to 22) in the radius direction by the three concentric circles whose centers are located on the beam axis. In the following descriptions, the groups of regions quartered at intervals of 45° in the tangential direction, namely, the groups of regions to which a to h are attached as the suffixes are referred as the region groups a to h. Also, the groups of regions quartered in the radius direction, namely, the groups of regions to which the numerals "19" to "22" are assigned are referred to as the region groups 19 to 22. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5c includes members each of which exhibits uniaxial anisotropy in the refractive index. The arrows in the drawing indicate the directions of the optic axes of these members in the respective regions. The optic axes in the region groups a and c are directed in the directions of 0° with respect to the x-axis in the drawing. The optic axes in the region groups b and d are directed in the directions of 90° with respect to the x-axis in the drawing. The optic axes in the region groups e and g are directed in the directions of 45° with respect to the x-axis in the drawing. The optic axes in the region groups f and h are directed in the directions of 135° with respect to the x-axis in the drawing. The absolute values of the optical phase differences between the polarization components in the directions parallel and vertical to the optic axis are 0° in the region group 19, 18° in the region group 20, 36° in the region group 21, and 54° in the region group 22. The design of the birefringence compensating element 5c will be described later.

Fourth Exemplary Embodiment

Figure 5:
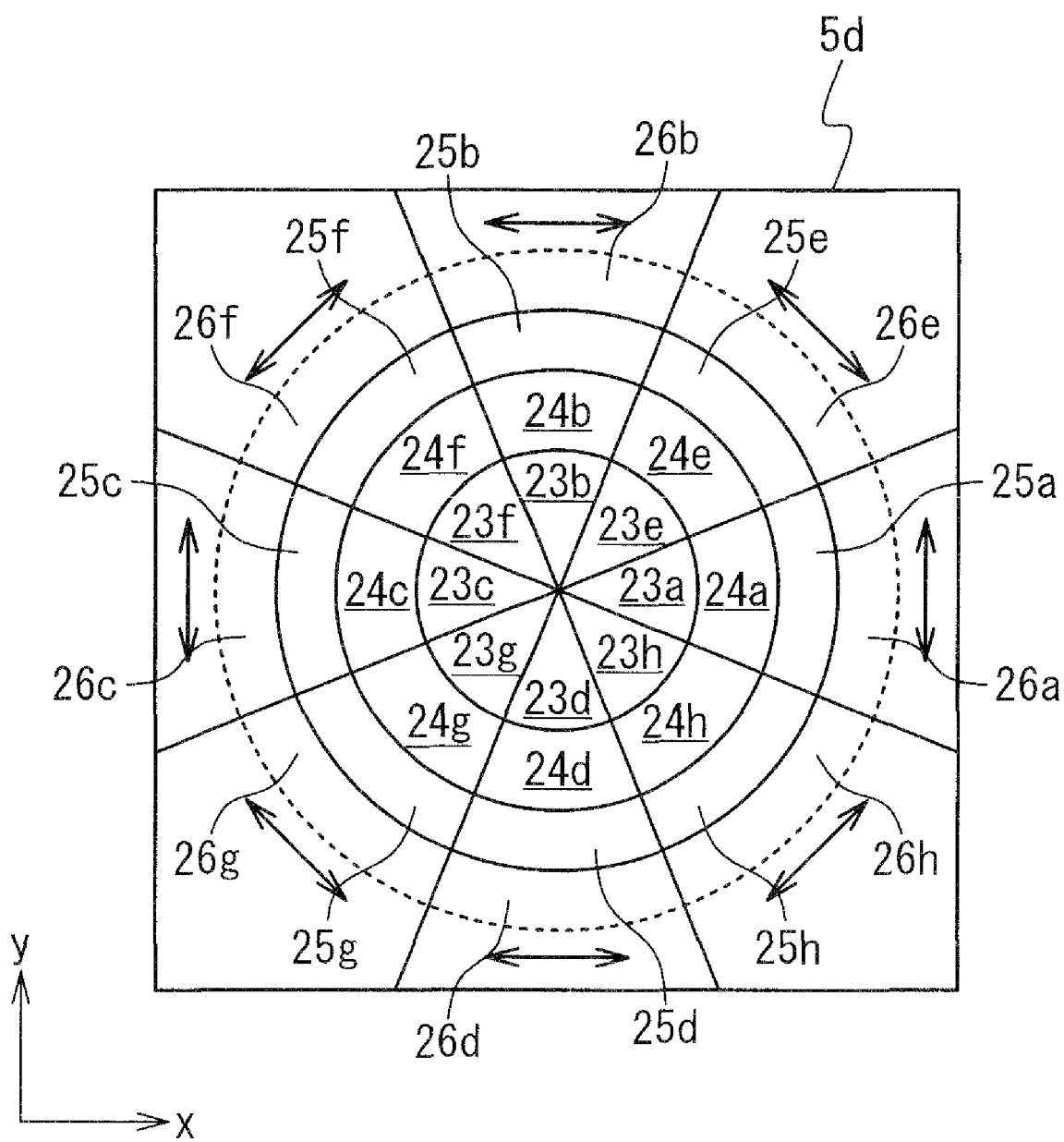
FIG. 5 is a plan view of a birefringence compensating element used in a fourth exemplary embodiment of the optical head apparatus of the present invention.

In a fourth exemplary embodiment of the optical head apparatus of the present invention, a birefringence compensating element 5d, the plan view of which is shown in FIG. 5, is used as the birefringence compensating element 5 in the optical head apparatus 50, the configuration of which is shown in FIG. 1.

FIG. 5 is the plan view of the birefringence compensating element 5d. The birefringence compensating element 5d is divided into eight regions (denoted by the suffixes a to h) at intervals of 45° in the tangential direction by four straight lines which cross the beam axis. Each region is divided into four regions (denoted by the numerals 23 to 26) in the radius direction by the three concentric circles whose centers are located on the beam axis. In the following descriptions, the groups of regions quartered at intervals of 45° in the tangential direction, namely, the groups of regions to which a to h are attached as the suffixes are referred as the region groups a to h. Also, the groups of regions quartered in the radius direction, namely, the groups of regions to which the numerals "23" to "26" are assigned are referred to as the region groups 23 to 26. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5d includes members each of which exhibits uniaxial anisotropy in the refractive index. The arrows in the drawing indicate the directions of the optic axes of these members in the respective regions. The optic axes in the region groups a and c are directed in the directions of 90° with respect to the x-axis in the drawing. The optic axes in the region groups b and d are directed in the directions of 0° with respect to the x-axis in the drawing. The optic axes in the region groups e and g are directed in the directions of 135° with respect to the x-axis in the drawing. The optic axes in the region groups f and h are directed in the directions of 45° with respect to the x-axis in the drawing. The absolute values of the optical phase differences between the polarization components in the directions parallel and vertical to the optic axis are 0° in the region group 23, 18° in the region group 24, 36° in the region group 25, and 54° in the region group 26. The design of the birefringence compensating element 5d will be described later.

Figure 27:
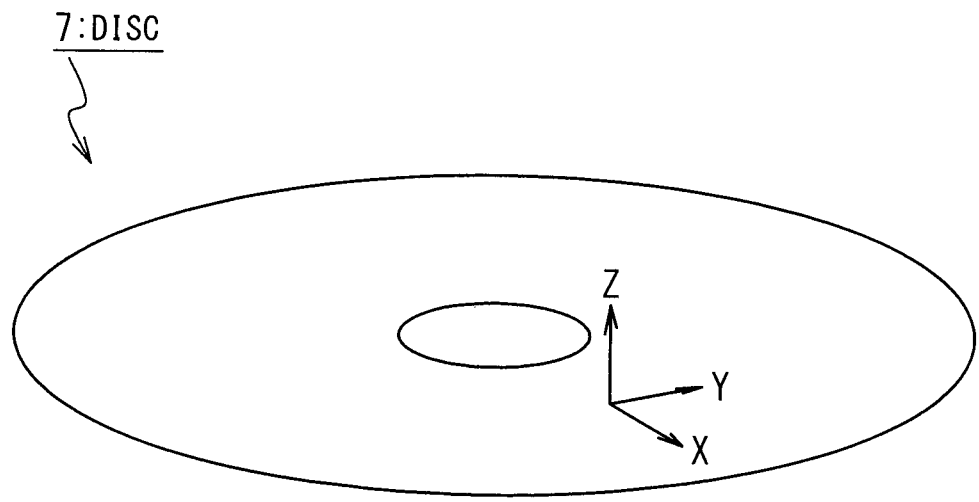
FIG. 27 is a view showing the relation between the optical recording medium and the XYZ-coordinates.

Next, a description is given of the design of the birefringence compensating element 5. Assuming that the X-axis and the Y-axis are defined on the section vertical to the beam axis as shown in FIG. 27, and the Jones matrix of the protective layer of the disc 7 is defined as S, S is given by the following equation:

$$S = \begin{pmatrix} \cos(\theta+\varphi) & -\sin(\theta+\varphi) \\ \sin(\theta+\varphi) & \cos(\theta+\varphi) \end{pmatrix} \quad \text{[Equation 1]}$$

$$\begin{pmatrix} \exp(i\frac{\alpha}{2}) & 0 \\ 0 & \exp(-i\frac{\alpha}{2}) \end{pmatrix} \begin{pmatrix} \cos(\theta+\varphi) & \sin(\theta+\varphi) \\ -\sin(\theta+\varphi) & \cos(\theta+\varphi) \end{pmatrix}$$

where φ is given by the following equation.

$$\varphi = \tan^{-1}\frac{y}{x} \quad \text{[Equation 2]}$$

Here, with respect to an ellipse defined on the section of the refractive index ellipsoid of the protective layer of the disc 7, which section is vertical to the light beam, α is the optical phase difference between the polarization component in the major axis direction of the ellipse and the polarization component in the minor axis direction, while θ is the angle representing the major axis direction or minor axis direction of the ellipse. The determining method of α, θ is well known, and therefore the explanation thereof is omitted.

With the Jones matrix of the birefringence compensating element 5 defined as B, the compensation of the vertical birefringence of the protective layer of the disc 7 can be achieved by fulfilling the requirement that the Jones matrix B of the birefringence compensating element 5 is the inverse matrix of the Jones matrix S of the protective layer of the disc 7 for the case of the non-existence of the vertical birefringence. In this case, the birefringence compensating element 5 is formed as a wavelength plate for which the direction of the optic axis is determined by θ+φ and the optical phase difference between the polarization components in the directions parallel and vertical to the optic axis is defined by α. It should be noted that the direction of the optic axis and the optical phase difference varies depending on the in-plane position of the birefringence compensating element 5, since θ+φ and α are the functions of x and y. This allows cancelling the optical phase difference caused by the light passing through the protective layer of the disc 7 with the optical phase difference caused by the light passing through the birefringence compensating element 5.

The calculation of the direction of the optic axis concludes that the direction of the optic axis is rotationally symmetrical with respect to the beam axis, directed in the radius direction or the tangential direction of the circle with center at the beam axis. That is, the direction of the optic axis continuously varies in accordance with the angle with respect to the x-axis shown in FIG. 2 to FIG. 5. In an actual implementation, the directions of the optic axis may vary discretely as shown in FIG. 2 to FIG. 5, rather than vary continuously as mentioned above. The design in which the direction of the beam axis discretely varies provides easy manufacture for the birefringence compensating element, although the effect of the compensation for the vertical birefringence is slightly reduced.

As for the birefringence compensating element 5a shown in FIG. 2, the direction of the optic axis discretely varies depending on the angle with respect to the x-axis over the four regions divided in the tangential direction. The direction of the optic axis is in the radius direction of the circle with center at the beam axis at the centers of the regions groups a, b, c and d. However, the direction of the optic axis is shifted from the radius direction of the circle with center at the beam axis with a larger shifting, as it goes from the center of each region group to the boundary with the adjacent region group.

As for the birefringence compensating element 5b shown in FIG. 3, the direction of the optic axis discretely varies depending on the angle with respect to the x-axis over the four regions divided in the tangential direction. The direction of the optic axis is in the tangential direction of the circle with center at the beam axis at the centers of the regions groups a, b, c and d. However, the direction of the optic axis is shifted from the tangential direction of the circle with center at the beam axis with a larger shifting, as it goes from the center of each region group to the boundary with the adjacent region group.

As for the birefringence compensating element 5c shown in FIG. 4, the direction of the optic axis discretely varies depending on the angle with respect to the x-axis over the eight regions divided in the tangential direction. The direction of the optic axis is in the radius direction of the circle with center at the beam axis at the centers of the regions groups a, b, c, d, e, f, g, and h. However, the direction of the optic axis is shifted from the radius direction of the circle with center at the beam axis with a larger shifting, as it goes from the center of each region group to the boundary with the adjacent region group.

As for the birefringence compensating element 5d shown in FIG. 5, the direction of the optic axis discretely varies depending on the angle with respect to the x-axis over the eight regions divided in the tangential direction. The direction of the optic axis is in the tangential direction of the circle with center at the beam axis at the centers of the regions groups a, b, c, d, e, f, g, and h. However, the direction of the optic axis is shifted from the tangential direction of the circle with center at the beam axis with a larger shifting, as it goes from the center of each region group to the boundary with the adjacent region group.

Figure 6:
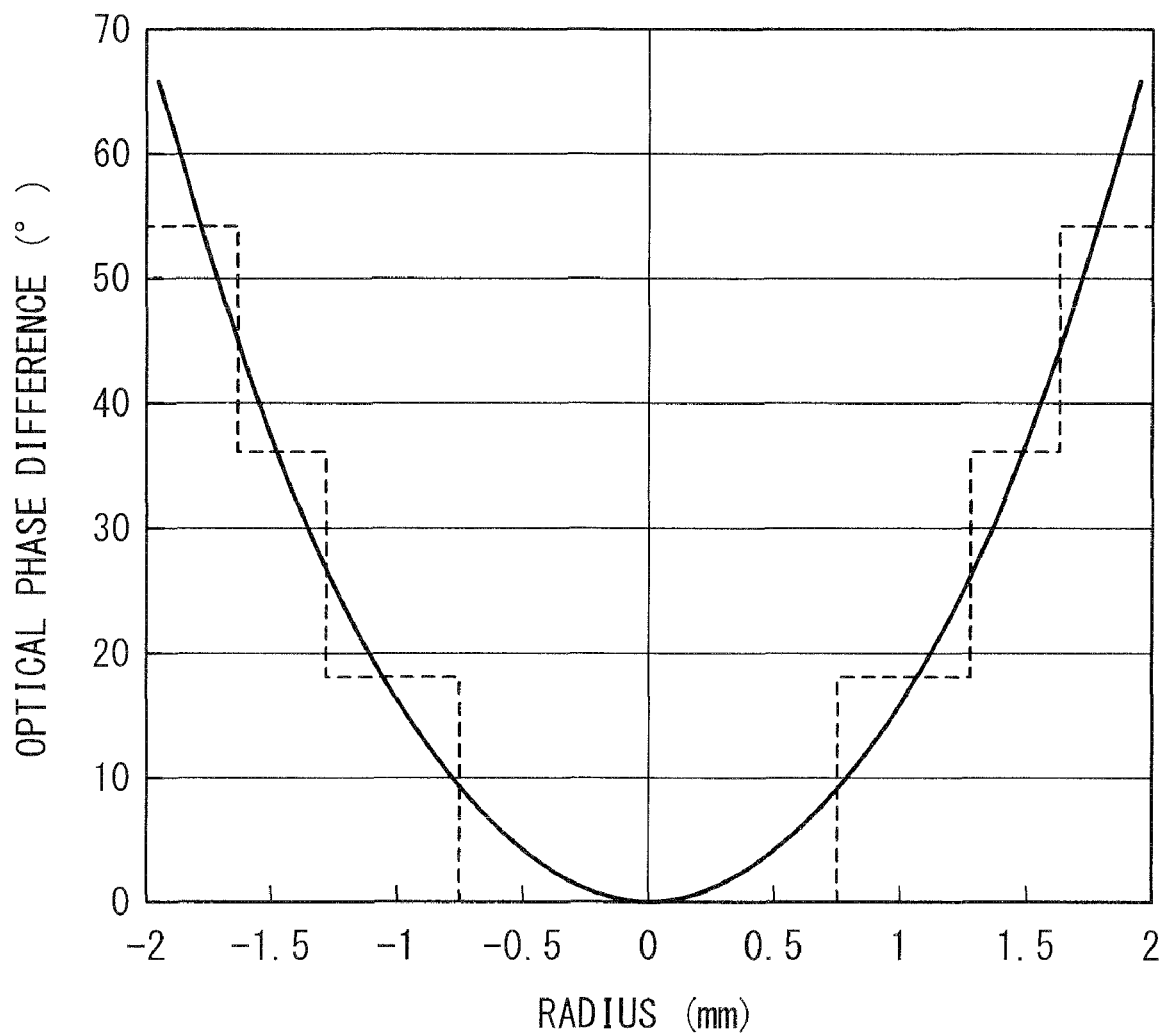
FIG. 6 is a view showing a calculation example of an optical phase difference between a polarization component in the direction parallel to the beam axis of the birefringence compensating element and a polarization component in the direction vertical to the beam axis.
Figure 7:
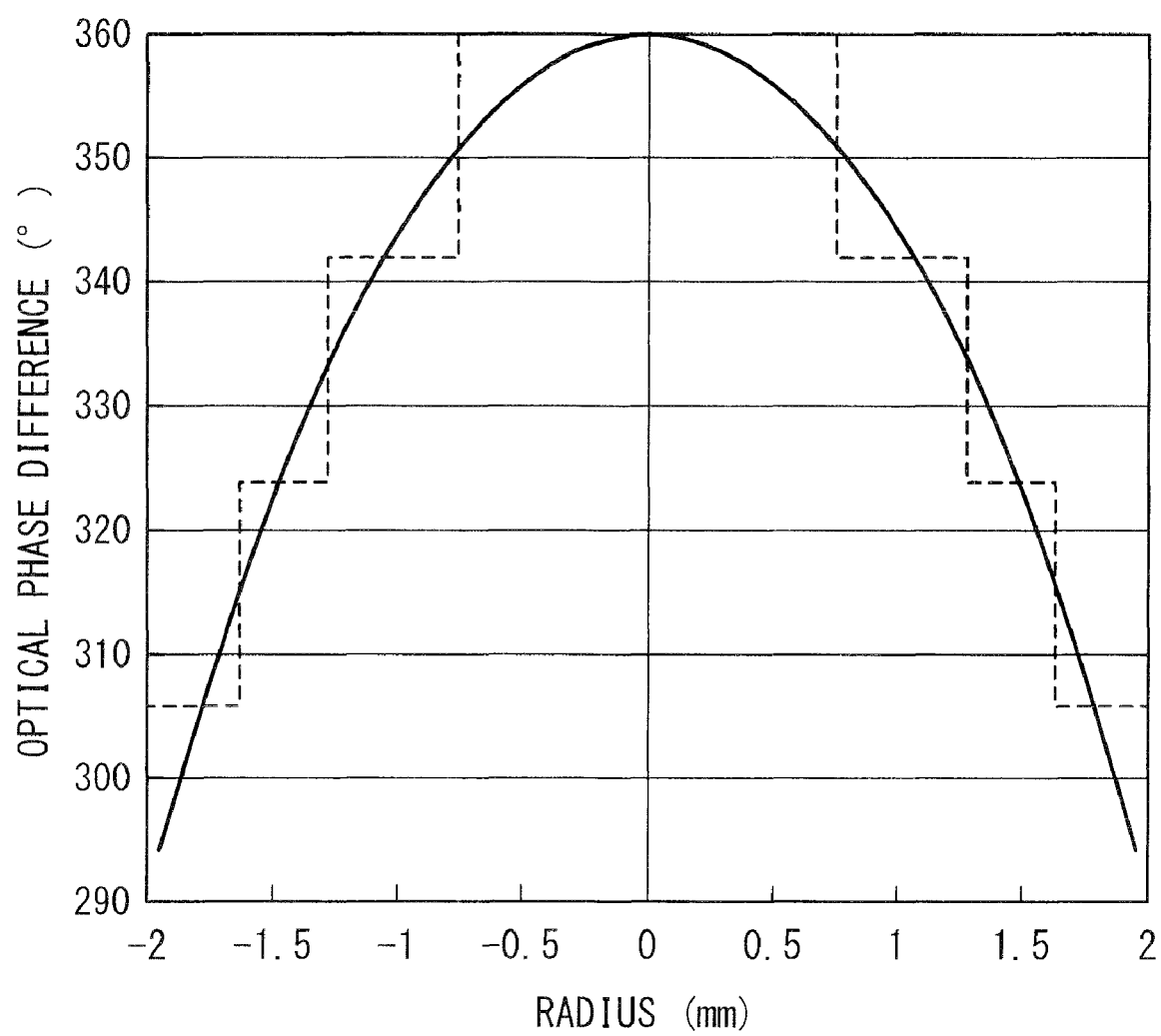
FIG. 7 is a view showing a calculation example of an optical phase difference between the polarization component in the direction parallel to the beam axis of the birefringence compensating element and the polarization component in the direction vertical to the beam axis.
Figure 8A:
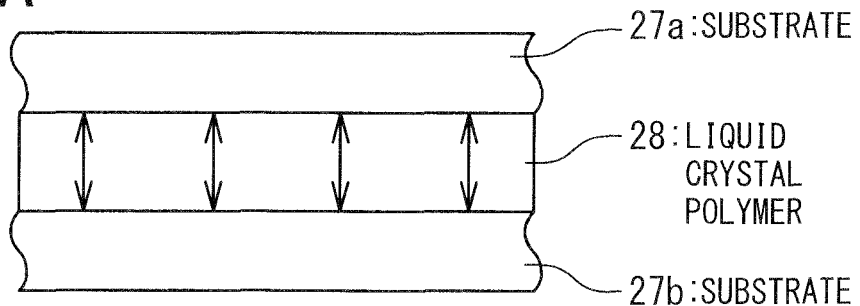
FIGS. 8A to 8D are sectional views of the birefringence compensating element used in the first to fourth exemplary embodiments of the optical head apparatus of the present invention.
Figure 8B:
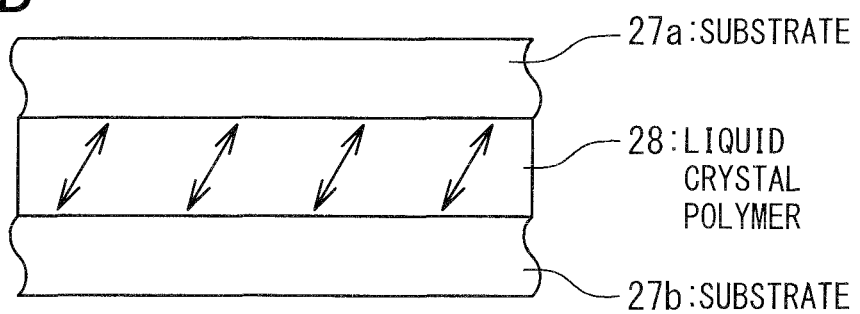
Figure 8C:
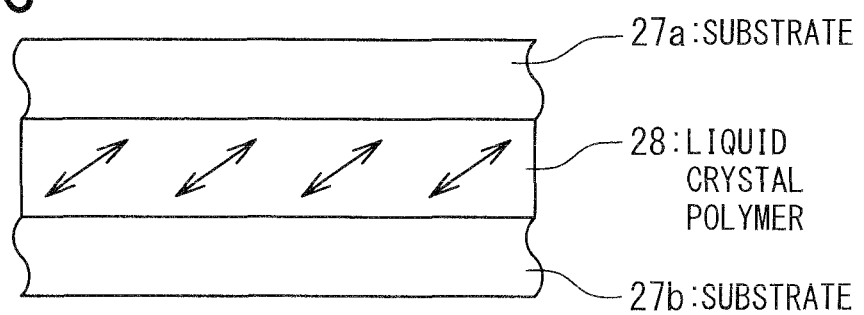
Figure 8D:
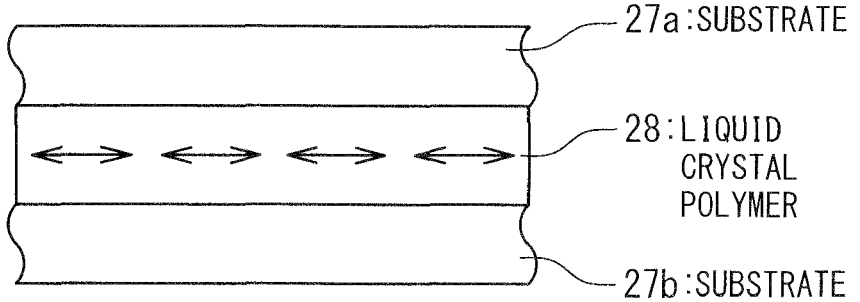

Next, the calculation of the optical phase difference between the polarization components in the directions parallel and vertical to the optic axis concludes that the optical phase difference is monotonously increased or decreased from the inside to the outside along the radius direction of the circle with center at the beam axis, distributed in the rotational symmetry with respect to the beam axis. FIG. 6 and FIG. 7 show calculation examples of the optical phase difference between the polarization components in the directions parallel and vertical to the optic axis in the birefringence compensating element. The calculation conditions are as follows: the wavelength of the light source is 405 nm, the numerical aperture of the objective lens is 0.65, the thickness of the protective layer of the optical recording medium is 0.6 mm, and the vertical birefringence of the protective layer of the optical recording medium is $7 \times 10^{-4}$. For the focal length of the objective lens being 3 mm, the effective radius of the objective lens is 3 mm×0.65=1.95 mm. As indicated by the solid lines in FIGS. 6 and 7, the optical phase difference varies continuously in the fashion of a quadratic function in accordance the distance from the beam axis. In an actual implementation, the optical phase difference may discretely vary, instead of continuously as mentioned above. The design in which the optical phase difference discretely varies provides easy manufacture for the birefringence compensating element, although the effect of the compensation for the vertical birefringence is slightly reduced.

As for the birefringence compensating elements $5a$ to $5d$ shown in FIG. 2 to FIG. 5, the optical phase difference discretely varies over the four regions divided in the radius direction in accordance with the distance from the beam axis, as indicated by the dashed lines in FIG. 6 and FIG. 7. The absolute value of the optical phase difference is 0° in the region groups 11, 15, 19 and 23, 18° in the region groups 12, 16, 20 and 24, 36° in the region groups 13, 17, 21 and 25, and 54° in the region groups 14, 18, 22 and 26. The boundary between the regions with the absolute values of the optical phase differences of 0° and 18° has a radius of 0.75 mm, the boundary between the regions with the absolute values of the optical phase differences of 18° and 36° has a radius of 1.28 mm, the boundary between the regions with the absolute values of the optical phase differences of 36° and 54° has a radius of 1.64 mm.

For the configurations of FIGS. 2 to 5, the compensation of the vertical birefringence requires a negative optical phase difference in the right and left regions, and the positive optical phase difference in the upper and lower regions, where the optical phase difference is defined to be positive when the phase of the polarization component in the x-axis direction leads ahead of the phase of the polarization component in the y-axis direction, and the optical phase difference is defined to be negative when the phase of the polarization component in the x-axis direction lags behind the phase of the polarization component in the y-axis direction. Liquid crystal polymer is used as the members with the uniaxial anisotropy of refractive index within the birefringence compensating elements $5a$ to $5d$. The liquid crystal polymer usually has a nature of the positive crystal, exhibiting a larger refractive index for the polarization component in the direction parallel to the optic axis than that for the polarization component in the direction vertical to the optic axis. In this case, the phase of the polarization component in the direction parallel to the optic axis lags behind that of the polarization component in the direction vertical to the optic axis.

When the direction of the optic axis is approximately directed in the radius direction of the circle with center at the beam axis, as is the case the birefringence compensating elements $5a$, $5c$, the phase lagging of the polarization component in the direction parallel to the optic axis with respect to the polarization component vertical to the optic axis should be increased from the inside to the outside in order to satisfy the foregoing conditions. The optical phase difference depicted in the vertical axis in FIG. 6 represents the phase lagging for this situation. In order to vary the absolute value of the optical phase difference from 0°, to 18°, to 36° and to 54° in the direction from the inside to the outside, the phase lagging should be varied from 0° to 18°, to 36° and to 54° as indicated by the dashed lines in FIG. 6.

On the other hand, when the direction of the optic axis is approximately directed in the tangential direction of the circle with center at the beam axis, as is the case the birefringence compensating elements $5b$ and $5d$, the phase leading of the polarization component in the direction parallel to the optic axis with respect to the polarization component vertical to the optic axis may be increased from the inside to the outside in order to satisfy the foregoing conditions. Since the phase cannot be led in an actual implementation, however, the phase lagging may be decreased instead. The optical phase difference depicted in the vertical axis in FIG. 7 represents the phase lagging for this situation. In order to vary the absolute value of the optical phase difference from 0°, to 18°, to 36° and to 54° in the direction from the inside to the outside, the phase lagging may be varied from 0° to −18°, to −36° and to −54°; however, the phase lagging cannot be negative in the actual implementation, and therefore the phase lagging may be varied from 360° to 342°, to 324° and to 306° instead as indicated by the dashed lines in FIG. 7. This makes use of the fact that 0° and 360° are equivalent to each other.

FIGS. 8A to 8D are sectional views of the birefringence compensating elements $5a$ to $5d$. The birefringence compensating elements $5a$ to $5d$ are structured so that liquid crystal polymer 28 having the uniaxial anisotropy in the refractive index is disposed between glass substrates 27a and 27b. The arrows on the drawings indicate the longitudinal directions of the liquid crystal polymer 28. The directions of the optic axes in the birefringence compensating elements $5a$ to $5d$ are determined as the projection of the longitudinal direction of the liquid crystal polymer 28 to the in-plane direction. On the other hand, the optical phase difference in the birefringence compensating elements $5a$ to $5d$ is determined in accordance with the angle between the longitudinal direction of the liquid crystal polymer 28 and the in-plane direction. The angle between the longitudinal direction of the liquid crystal polymer 28 and the in-plane direction is decreased as it goes from FIGS. 8A to 8D, while the optical phase difference is increased.

For the region groups a and c of the birefringence compensating element $5a$, the projection to the in-plane direction of the longitudinal direction of the liquid crystal polymer 28 is placed into a predetermined state so that the direction of the optic axis is directed in the direction of 0° with respect to the x-axis. For the region groups b and d of the birefringence compensating element $5a$, the projection to the in-plane direction of the longitudinal direction of the liquid crystal polymer 28 is placed into a predetermined state so that the direction of the optic axis is directed in the direction of 90° with respect to the x-axis.

For the region group 11 of the birefringence compensating element $5a$, on the other hand, the angle between the longitudinal direction of the liquid crystal polymer 28 and the in-plane direction is placed into a predetermined state so that the optical phase difference is adjusted to 0°. For the region group 12 of the birefringence compensating element $5a$, the angle between the longitudinal direction of the liquid crystal polymer 28 and the in-plane direction is placed into a predetermined state so that the optical phase difference is adjusted to 18°. For the region group 13 of the birefringence compensating element $5a$, the angle between the longitudinal direction of the liquid crystal polymer 28 and the in-plane direction is placed into a predetermined state so that the optical phase difference is adjusted to 36°. For the region group 14 of the birefringence compensating element 5a, the angle between the longitudinal direction of the liquid crystal polymer 28 and the in-plane direction is placed into a predetermined state so that the optical phase difference is adjusted to 54°. The angle between the longitudinal direction of the liquid crystal polymer 28 and the in-plane direction is varied from the state shown in FIG. 8A to the state shown in FIG. 8D, as the optical phase difference is increased from 0°, to 18°, to 36° and to 54°.

For the region groups a and c of the birefringence compensating element 5b, the projection to the in-plane direction of the longitudinal direction of the liquid crystal polymer 28 is placed into a predetermined state so that the direction of the optic axis is directed in the direction of 90° with respect to the x-axis. For the region groups b and d of the birefringence compensating element 5b, the projection to the in-plane direction of the longitudinal direction of the liquid crystal polymer 28 is placed into a predetermined state so that the direction of the optic axis is directed in the direction of 0° with respect to the x-axis.

For the region group 15 of the birefringence compensating element 5b, on the other hand, the angle between the longitudinal direction of the liquid crystal polymer 28 and the in-plane direction is placed into a predetermined state so that the optical phase difference is adjusted to 360°. For the region group 16 of the birefringence compensating element 5b, the angle between the longitudinal direction of the liquid crystal polymer 28 and the in-plane direction is placed into a predetermined state so that the optical phase difference is adjusted to 342°. For the region group 17 of the birefringence compensating element 5b, the angle between the longitudinal direction of the liquid crystal polymer 28 and the in-plane direction is placed into a predetermined state so that the optical phase difference is adjusted to 324°. For the region group 18 of the birefringence compensating element 5b, the angle between the longitudinal direction of the liquid crystal polymer 28 and the in-plane direction is placed into a predetermined state so that the optical phase difference is adjusted to 306°. The angle between the longitudinal direction of the liquid crystal polymer 28 and the in-plane direction is varied from the state shown in FIG. 8D to the state shown in FIG. 8A, as the optical phase difference is decreased from 360°, to 342°, to 324° and to 306°.

For the region groups a and c of the birefringence compensating element 5c, the projection to the in-plane direction of the longitudinal direction of the liquid crystal polymer 28 is placed into a predetermined state so that the direction of the optic axis is directed in the direction of 0° with respect to the x-axis. For the region groups b and d of the birefringence compensating element 5c, the projection to the in-plane direction of the longitudinal direction of the liquid crystal polymer 28 is placed into a predetermined state so that the direction of the optic axis is directed in the direction of 90° with respect to the x-axis. For the region groups e and g of the birefringence compensating element 5c, the projection to the in-plane direction of the longitudinal direction of the liquid crystal polymer 28 is placed into a predetermined state so that the direction of the optic axis is directed in the direction of 45° with respect to the x-axis. For the region groups f and h of the birefringence compensating element 5c, the projection to the in-plane direction of the longitudinal direction of the liquid crystal polymer 28 is placed into a predetermined state so that the direction of the optic axis is directed in the direction of 135° with respect to the x-axis.

For the region group 19 of the birefringence compensating element 5c, on the other hand, the angle between the longitudinal direction of the liquid crystal polymer 28 and the in-plane direction is placed into a predetermined state so that the optical phase difference is adjusted to 0°. For the region group 20 of the birefringence compensating element 5c, the angle between the longitudinal direction of the liquid crystal polymer 28 and the in-plane direction is placed into a predetermined state so that the optical phase difference is adjusted to 18°. For the region group 21 of the birefringence compensating element 5c, the angle between the longitudinal direction of the liquid crystal polymer 28 and the in-plane direction is placed into a predetermined state so that the optical phase difference is adjusted to 36°. For the region group 22 of the birefringence compensating element 5c, the angle between the longitudinal direction of the liquid crystal polymer 28 and the in-plane direction is placed into a predetermined state so that the optical phase difference is adjusted to 54°. The angle between the longitudinal direction of the liquid crystal polymer 28 and the in-plane direction is varied from the state shown in FIG. 8A to the state shown in FIG. 8D, as the optical phase difference is increased from 0°, to 18°, to 36° and to 54°.

For the region groups a and c of the birefringence compensating element 5d, the projection to the in-plane direction of the longitudinal direction of the liquid crystal polymer 28 is placed into a predetermined state so that the direction of the optic axis is directed in the direction of 90° with respect to the x-axis. For the region groups b and d of the birefringence compensating element 5d, the projection to the in-plane direction of the longitudinal direction of the liquid crystal polymer 28 is placed into a predetermined state so that the direction of the optic axis is directed in the direction of 0° with respect to the x-axis. For the region groups e and g of the birefringence compensating element 5d, the projection to the in-plane direction of the longitudinal direction of the liquid crystal polymer 28 is placed into a predetermined state so that the direction of the optic axis is directed in the direction of 135° with respect to the x-axis. For the region groups f and h of the birefringence compensating element 5d, the projection to the in-plane direction of the longitudinal direction of the liquid crystal polymer 28 is placed into a predetermined state so that the direction of the optic axis is directed in the direction of 45° with respect to the x-axis.

For the region group 23 of the birefringence compensating element 5d, on the other hand, the angle between the longitudinal direction of the liquid crystal polymer 28 and the in-plane direction is placed into a predetermined state so that the optical phase difference is adjusted to 360°. For the region group 24 of the birefringence compensating element 5d, the angle between the longitudinal direction of the liquid crystal polymer 28 and the in-plane direction is placed into a predetermined state so that the optical phase difference is adjusted to 342°. For the region group 25 of the birefringence compensating element 5d, the angle between the longitudinal direction of the liquid crystal polymer 28 and the in-plane direction is placed into a predetermined state so that the optical phase difference is adjusted to 324°. For the region group 26 of the birefringence compensating element 5d, the angle between the longitudinal direction of the liquid crystal polymer 28 and the in-plane direction is placed into a predetermined state so that the optical phase difference is adjusted to 306°. The angle between the longitudinal direction of the liquid crystal polymer 28 and the in-plane direction is varied from the state shown in FIG. 8D to the state shown in FIG. 8A, as the optical phase difference is decreased from 360°, to 342°, to 324° and to 306°.

A description is given of the amount of light received by the photo-detector 10 in the following. It is assumed that the P-polarization direction and S-polarization direction for the polarizing beam splitter 3 correspond to the X-axis direction and Y-axis direction shown in FIG. 27, respectively. It is also assumed that the polarization direction of the output light from the semiconductor laser 1 is the P-polarization direction for the polarizing beam splitter 3. The electric field distribution of the light passing through the quarter-wave plate 4, the birefringence compensating element 5 and the protective layer of the disc 7 on the outward path from the semiconductor laser 1 to the disc 7 is represented by the following equation by using a Jones vector:

$$\begin{pmatrix} E_{pi}(x, y) \\ E_{si}(x, y) \end{pmatrix} = S \cdot B \cdot Q \cdot \begin{pmatrix} E_0(x, y) \\ 0 \end{pmatrix}$$ [Equation 3]

where $E0(x,y)$ is the electric field distribution of the output light from the semiconductor laser 1 and Q is the Jones matrix of the quarter-wave plate 4. Here, Q is given by the following equation:

$$Q = \frac{1}{\sqrt{2}} \begin{pmatrix} 1 & -i \\ -i & 1 \end{pmatrix}$$ [Equation 4]

In the near-field over the disc 7, a U-axis and a V-axis are defined parallel to the X-axis and the Y-axis shown in FIG. 27, respectively. The electric field distribution of the focused spot on the disc 7 is represented by the following equation by using the Jones vector:

$$\begin{pmatrix} e_{pi}(u, v) \\ e_{si}(u, v) \end{pmatrix} \propto \int\int \begin{pmatrix} E_{pi}(x, y) \\ E_{si}(x, y) \end{pmatrix} \exp\left(-\frac{2\pi i(xu + yv)}{\lambda f}\right) dxdy$$ [Equation 5]

where $\lambda$ is the wavelength of the semiconductor laser 1 and f is the focal length of the objective lens 6.

The electric field distribution of the reflected light from the disc 7 is represented by the following equation by using the Jones vector.

$$\begin{pmatrix} E_{pr}(x, y) \\ E_{sr}(x, y) \end{pmatrix} \propto$$ [Equation 6]

$$\int\int \begin{pmatrix} e_{pi}(u, v) \\ e_{si}(u, v) \end{pmatrix} R(u, v) \exp\left(\frac{2\pi i(xu + yv)}{\lambda f}\right) dudv$$

where $R(u,v)$ is the complex reflectance distribution of the disc 7. Here, $R(u,v)$ is a function determined in accordance with the shape of the groove or pits formed on the disc 7.

The electric field distribution of the light passing transmitted through the protective layer of the disc 7, the birefringence compensating element 5 and the quarter-wave plate 4 on the return path from the disc 7 to the photo-detector 10 is represented by the following equation by using the Jones vector:

$$\begin{pmatrix} E_p(x, y) \\ E_s(x, y) \end{pmatrix} = Q^* \cdot B^* \cdot S^* \cdot \begin{pmatrix} E_{pr}^*(-x, -y) \\ E_{sr}^*(-x, -y) \end{pmatrix}$$ [Equation 7]

When the amount of light received by the photo-detector 10 is defined as L, L is given by the following equation:

$$L \propto \int\int |E_s(x,y)|^2 dxdy$$ [Equation 8]

Assuming that the reflected light from the disc 7 is received by the photo-detector 10 with the reflected light divided into two regions by a straight line parallel to the tangential direction of the disc 7 on a face vertical to the beam axis, and crossing the beam axis, La and Lb are obtained by the integrations given in the Equation 8 in the ranges of x<0 and x>0, respectively, where La and Lb are the light amounts on the photo-detector 10 corresponding to the two regions. Here, the sum signal is given by La+Lb, and the push-pull signal is given by La−Lb. The relation of the birefringence of the protective layer of the optical recording medium to the sum signal level and the push-pull signal amplitude can be calculated based on these equations for the case that the focused spot on the optical recording medium crosses the groove of the optical recording medium.

Also, assuming that the reflected light is received from the disc 7 by the photo-detector 10 with the reflected light divided into four regions defined by straight lines which each cross the beam axis on a face vertical to the beam axis, one extending in the direction parallel to the radial direction of the disc 7 and the other extending in the direction parallel to the tangential direction, La, Lb, Lc and Ld are obtained by the integrations given in the Equation 8 in the range of x<0 and y<0, the range of x>0 and y<0, the range of x>0 and y>0 and the range of x<0 and y>0, respectively, where La and Lc are the light amounts on the photo-detector 10 corresponding to the two regions positioned at one set of opposite angles and Lb an Ld are the light amounts on the photo-detector 10 corresponding to the two regions positioned at the other set of opposite angles. Here, the DPD signal is given by the temporal difference between (La+Lc) and (Lb+Ld). The relation of the birefringence of the protective layer of the optical recording medium to the DPD signal amplitude can be calculated in accordance with this equation, for the case that the focused spot on the optical recording medium crosses a pit on the optical recording medium.

Figure 9:
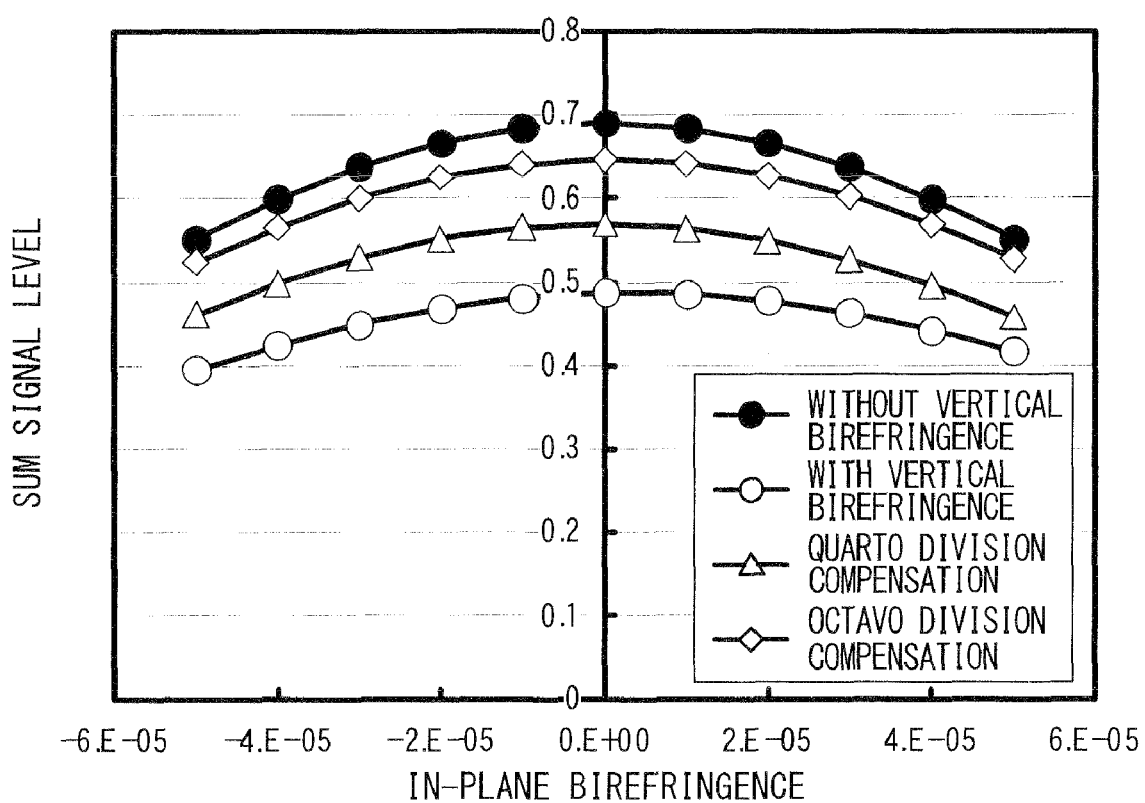
FIG. 9 is a view showing a calculation example of the relation between the value of in-plane birefringence and the sum signal level with the value of vertical birefringence used as a parameter.
Figure 10:
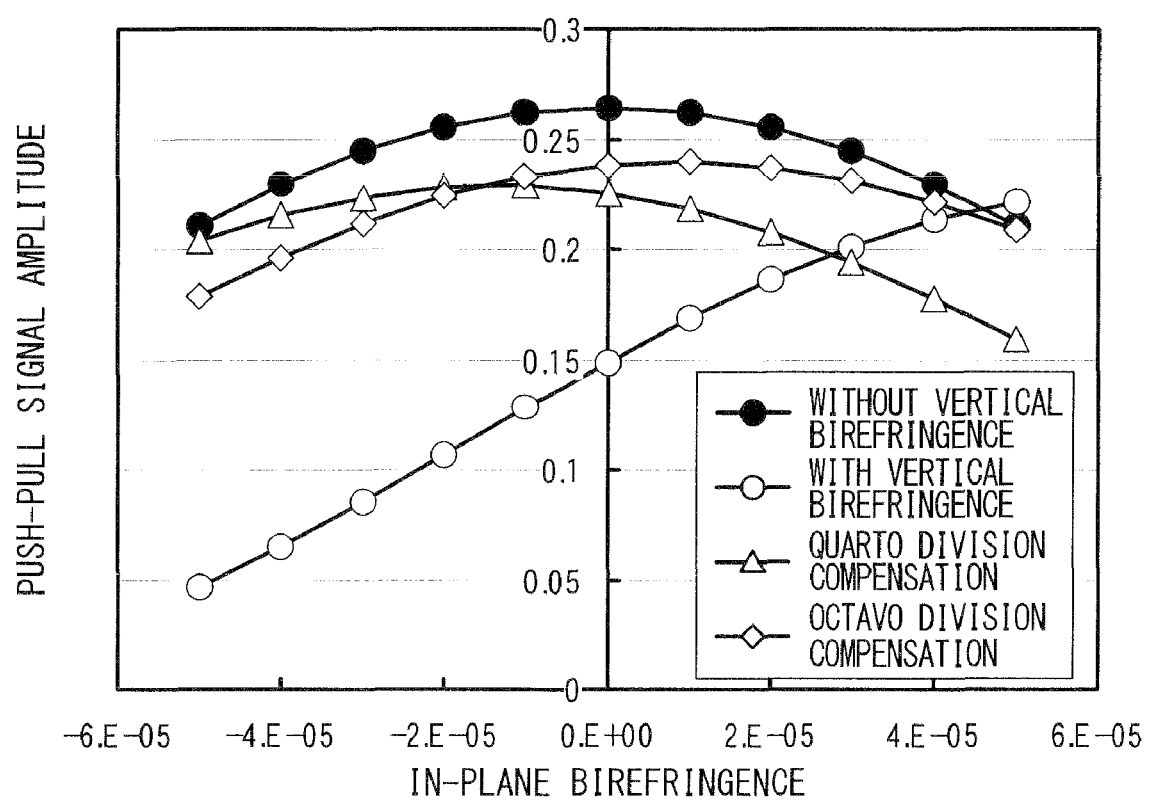
FIG. 10 is a view showing a calculation example of the relation between the value of in-plane birefringence and the push-pull signal amplitude with the value of vertical birefringence used as a parameter.
Figure 11:
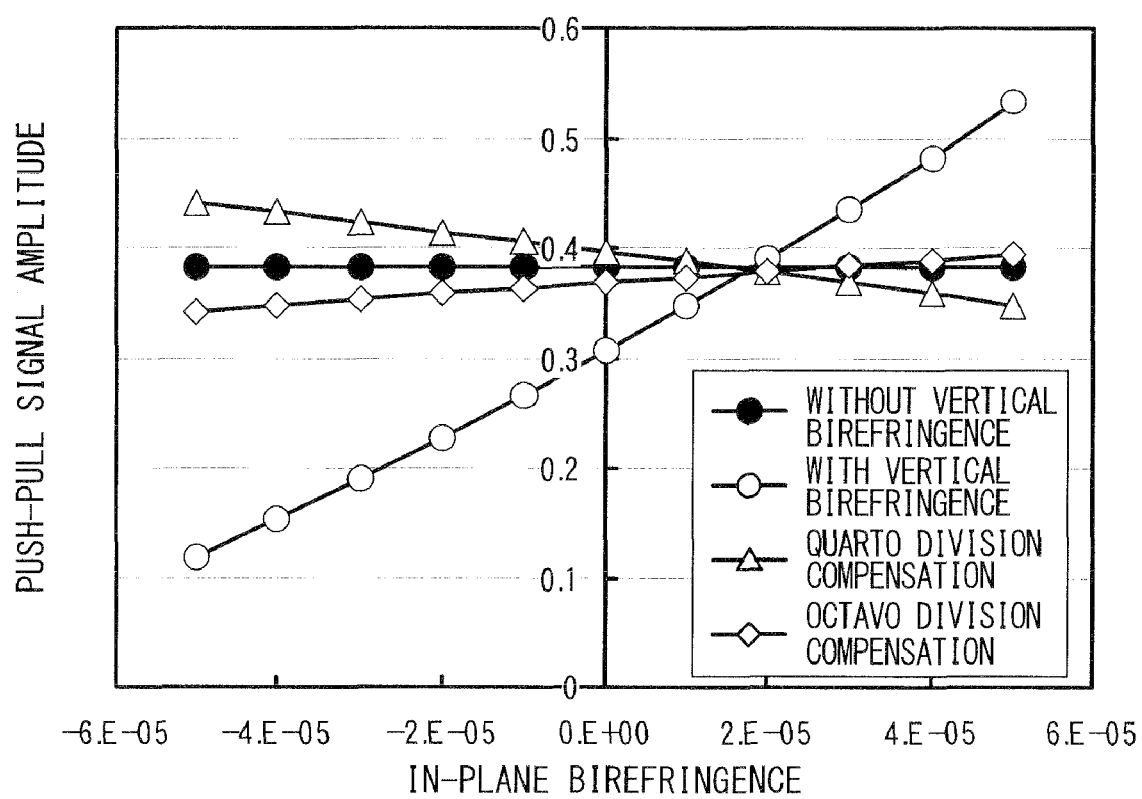
FIG. 11 is a view showing a calculation example of the relation between the value of in-plane birefringence and the push-pull signal modulation factor with the value of vertical birefringence used as a parameter.
Figure 28:
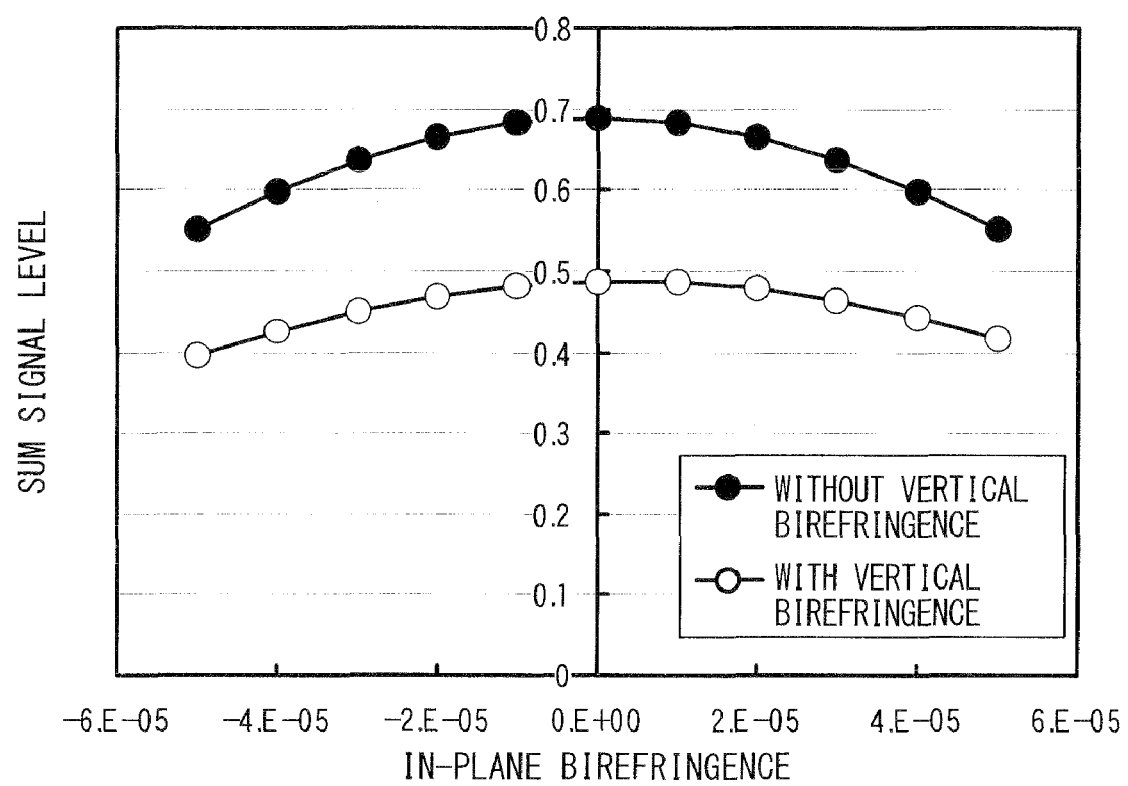
FIG. 28 is a view showing the calculation example of the relation between the value of in-plane birefringence and the sum signal level with the value of the vertical birefringence used as a parameter.
Figure 29:
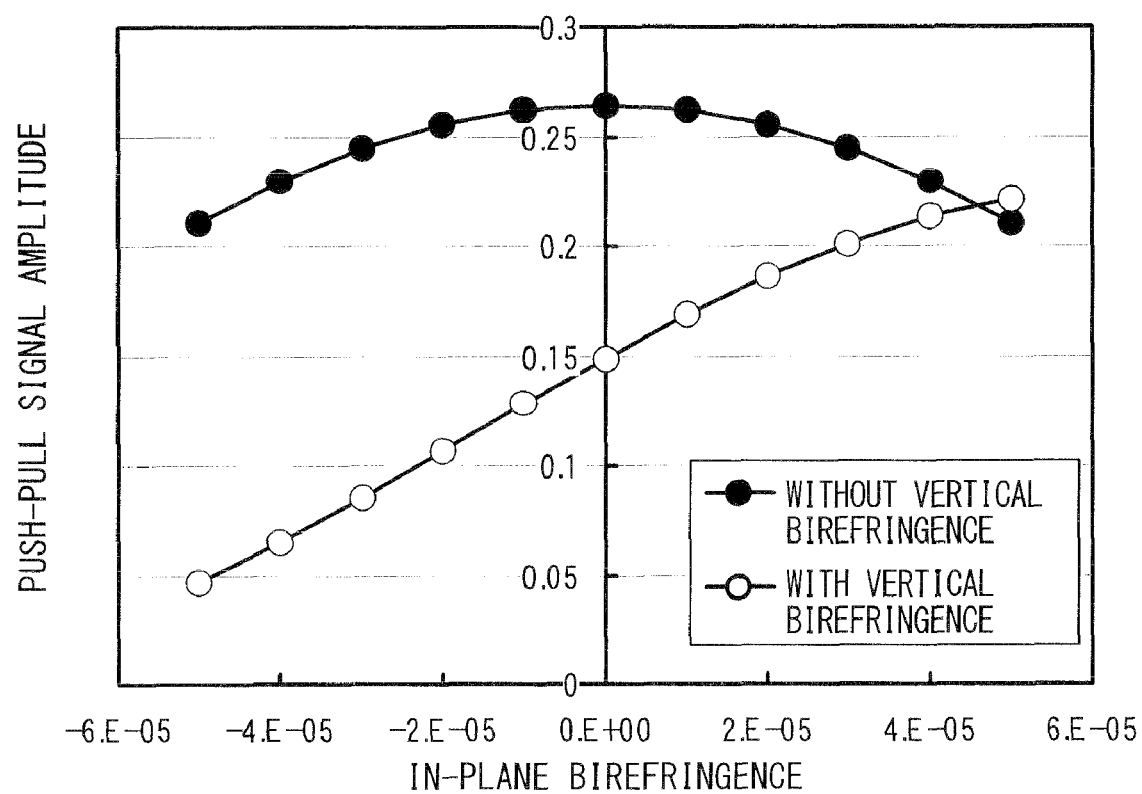
FIG. 29 is a view showing the calculation example of the relation between the value of in-plane birefringence and the push-pull signal amplitude with the value of the vertical birefringence used as a parameter.
Figure 30:
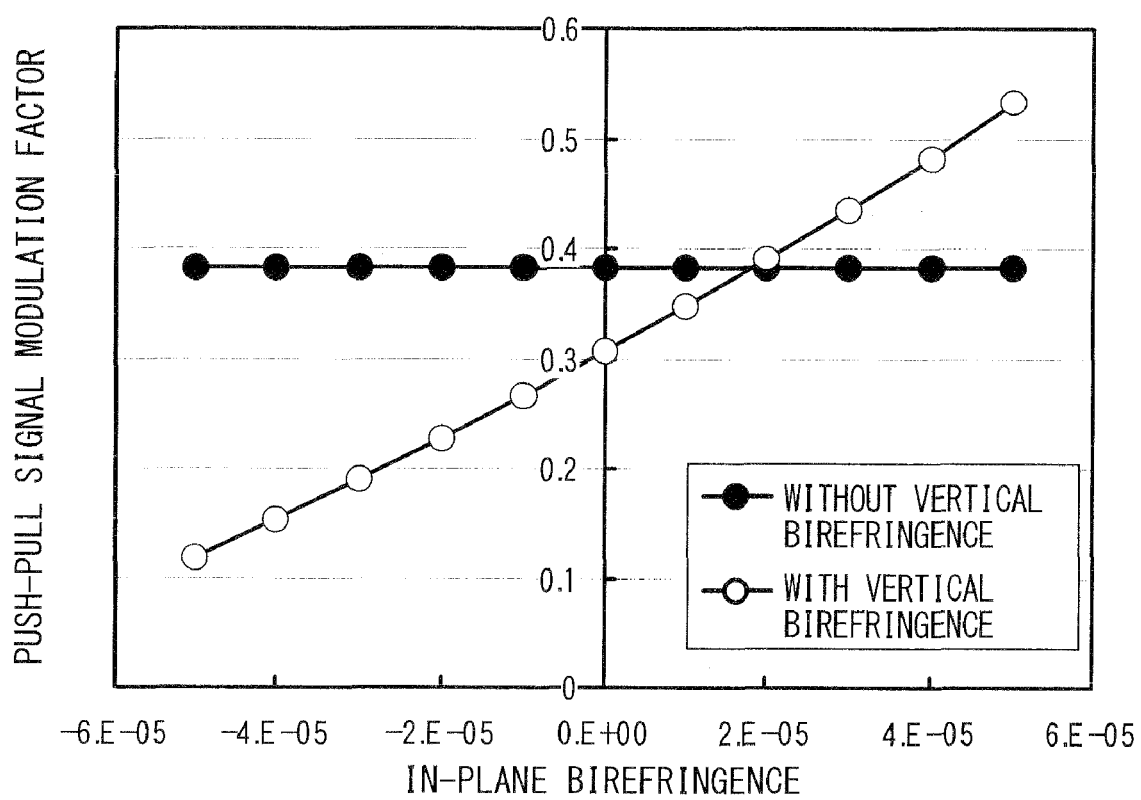
FIG. 30 is the view showing the calculation example of the relation between the value of in-plane birefringence and the push-pull signal modulation factor with the value of the vertical birefringence used as a parameter.

With regard to the case of using the birefringence compensating elements 5 explained in the first to fourth exemplary embodiments, FIG. 9 shows a calculation example of the relation of the value of in-plane birefringence to the sum signal level with the value of vertical birefringence used as a parameter, and FIG. 10 shows a calculation example of the relation of the value of in-plane birefringence to the push-pull signal amplitude with the value of vertical birefringence used as a parameter. Additionally, FIG. 11 shows a calculation example of the relation of the value of in-plane birefringence to the push-pull signal modulation factor with the value of vertical birefringence used as a parameter, which is obtained from the sum signal level shown in FIG. 9 and the push-pull signal amplitude shown in FIG. 10. The calculation conditions are same as the conditions described with respect to FIGS. 28 to 30. The vertical axes of FIG. 9 and FIG. 10 are standardized by the sum signal level for the case that the groove is not formed on the optical recording medium. The black circles on the drawings indicate the calculation result for the value of vertical birefringence being 0, and the white circles on the drawings indicate the calculation result for the value of the vertical birefringence being $7 \times 10^{-4}$ without the compensation by the birefringence compensating element 5. These results are same to those shown in FIGS. 28 to 30. The symbols Δ on the drawings indicate the calculation result for the value of vertical birefringence being $7 \times 10^{-4}$ with the compensation by the birefringence compensating element 5a or 5b, which is comprised of the four regions divided in the tangential direction as shown in FIG. 2 and FIG. 3. The symbols ◇ on the drawings indicate the calculation result for the value of vertical birefringence being $7 \times 10^{-4}$ with the compensation by the birefringence compensating element 5c or 5d, which is comprised of eight regions divided in the tangential direction as shown in FIGS. 4 and 5.

With reference to FIG. 9, the sum signal level shows the maximum value when the value of in-plane birefringence is zero, and the sum signal level decreases with the increase in the absolute value of the value of the in-plane birefringence, for both of the case that the compensation is achieved by the birefringence compensating element 5 (5a, 5b) comprised of four regions divided in the tangential direction, and the case that the compensation is achieved by the birefringence compensating element 5 (5c, 5d) comprised of eight regions divided in the tangential direction, similarly to the case without the vertical birefringence.

With reference to FIG. 10, on the other hand, the push-pull signal amplitude shows the maximum value at a value of in-plane birefringence slightly smaller than 0, and the push-pull signal amplitude decreases as the value of in-plane birefringence increases or decreases from that value, for the case that the compensation is achieved by the birefringence compensating element 5 (5a, 5b) comprised of four regions divided in the tangential direction. For the case that the compensation is achieved by the birefringence compensating element 5 (5c, 5d) divided into the eight regions in the tangential direction, on the other hand, the push-pull signal amplitude shows the maximum value at a value of in-plane birefringence slightly larger than 0, and the push-pull signal amplitude decrease as the value of the in-plane birefringence increases or decreases from that value.

As a result, as shown in FIG. 11, the push-pull signal modulation factor increases monotonously and slightly as the value of the in-plane birefringence is changed from positive to negative value, when the compensation is achieved by the birefringence compensating element 5 (5a, 5b) comprised of four regions divided in the tangential direction. On the other hand, the push-pull signal modulation factor decreases monotonously and slightly as the value of in-plane birefringence is changed from positive to negative value, when the compensation is achieved by the birefringence compensating element 5 (5c, 5d) comprised of eight regions divided in the tangential direction. This fact proves that the use of the birefringence compensating element 5 suppresses the change in the push-pull signal modulation factor depending on the in-plane position of the optical recording medium. Larger suppression effect of the change in the push-pull signal modulation factor is achieved by the birefringence compensating element 5 (5c, 5d) comprised of eight regions divided in the tangential direction, as compared with the birefringence compensating element 5 (5a, 5b) comprised of four regions divided in the tangential direction.

Figure 12:
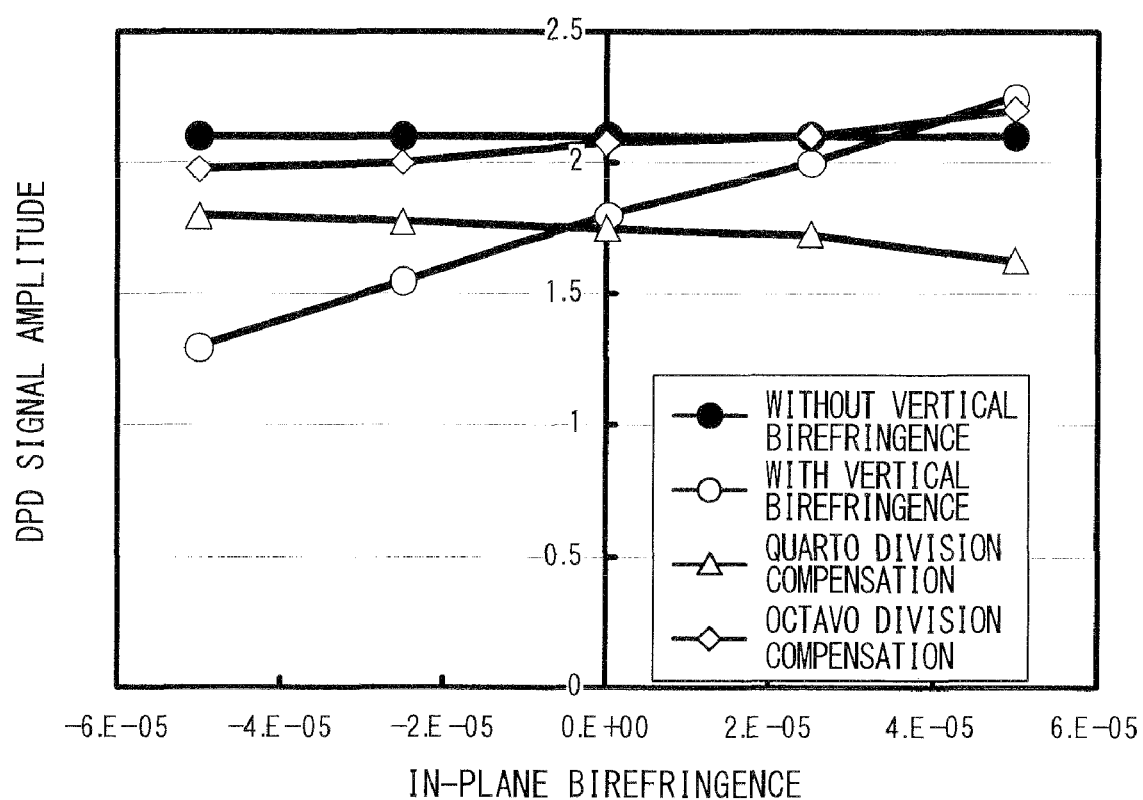
FIG. 12 is a view showing a calculation example of the relation between the value of in-plane birefringence and the DPD signal amplitude with the value of the vertical birefringence used as a parameter.
Figure 31:
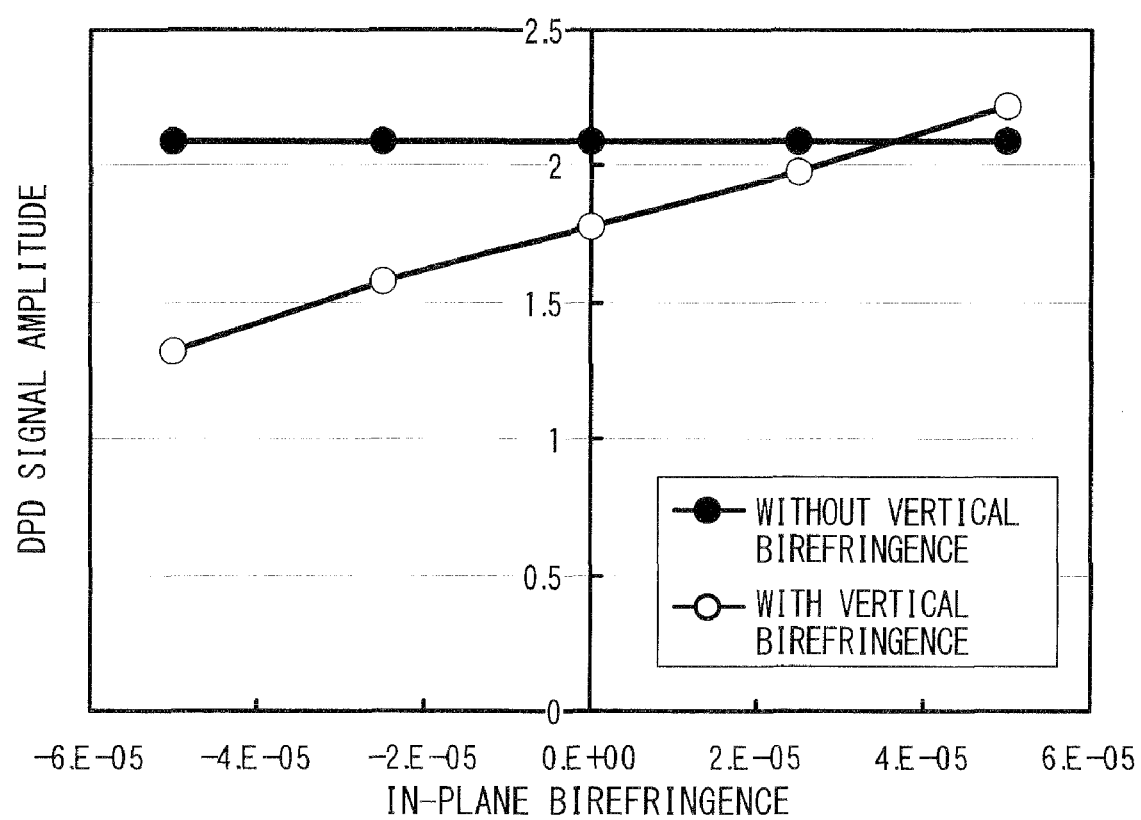
FIG. 31 is a view showing the calculation example of the relation between the value of in-plane birefringence and the DPD signal amplitude with the value of the vertical birefringence used as a parameter.

FIG. 12 shows a calculation example of the relation of the value of in-plane birefringence to the DPD signal amplitude with the value of vertical birefringence used as a parameter for the respective cases that the birefringence compensating element 5 depicted in the first to fourth exemplary embodiments. The calculation conditions are same as the conditions described with respect to FIG. 31. The vertical axis of FIG. 12 is standardized by the duration of the channel clock. The black circles on the drawing indicate the calculation result for the value of vertical birefringence being 0, and the white circles on the drawing indicate the calculation result for the value of vertical birefringence being $7 \times 10^{-4}$ without the compensation by the birefringence compensating element 5. These results are same as those shown in FIG. 31. The symbols Δ on the drawing indicate the calculation result for the value of vertical birefringence being $7 \times 10^{-4}$, when the compensation is achieved by the birefringence compensating element 5a or 5b, which is comprised of four regions divided in the tangential direction as shown in FIGS. 2 and 3. The symbols ◇ on the drawing indicate the calculation result for the value of vertical birefringence being $7 \times 10^{-4}$, when the compensation is achieved by the birefringence compensating element 5c or 5d, which are comprised of eight regions divided in the tangential direction as shown in FIGS. 4 and 5.

As shown in FIG. 12, the DPD signal amplitude increases monotonously and slightly as the value of in-plane birefringence is changed from positive to negative value, when the compensation is achieved by the birefringence compensating element 5 (5a, 5b) comprised of four regions divided in the tangential direction. When the compensation is achieved by the birefringence compensating element 5 (5c, 5d) comprised of eight regions divided in the tangential direction, on the other hand, the DPD signal amplitude decreases monotonously and slightly as the value of in-plane birefringence is changed from positive value to negative value. This fact proves the use of the birefringence compensating element 5 suppresses the change in the DPD signal amplitude depending on the in-plane position of the optical recording medium. Larger suppression effect of the change in the DPD signal amplitude is achieved by the birefringence compensating element 5 (5c, 5d) comprised of eight regions divided in the tangential direction, as compared with the birefringence compensating element 5 (5a, 5b) comprised of four regions divided in the tangential direction.

The birefringence compensating elements 5a and 5b shown in FIGS. 2 and 3 are divided into the four regions in the tangential direction, and each region is further divided into the four regions in the radius direction. On the other hand, the birefringence compensating elements 5c and 5d shown in FIGS. 4 and 5 are divided into the eight regions in the tangential direction, and each region is further divided into the four regions in the radius direction. However, the number of the regions divided in the tangential direction in the birefringence compensating element 5 may be arbitrarily selected, not limited to four or eight, and the number of the regions divided in the radius direction may be arbitrarily selected, not limited to four. The suppression effect of the changes in the push-pull signal modulation factor and DPD signal amplitude depending on the in-plane position of the optical recording medium is enhanced by the increase in the number of the regions divided in the tangential direction in the birefringence compensating element 5 and by the increase in the number of the regions divided in the radius direction. On the other hand, the decreases in the number of the regions divided in the tangential direction in the birefringence compensating element 5 and in the number of the regions divided in the radius direction improves manufacture easiness of the birefringence compensating element 5.

Fifth Exemplary Embodiment

Figure 13:
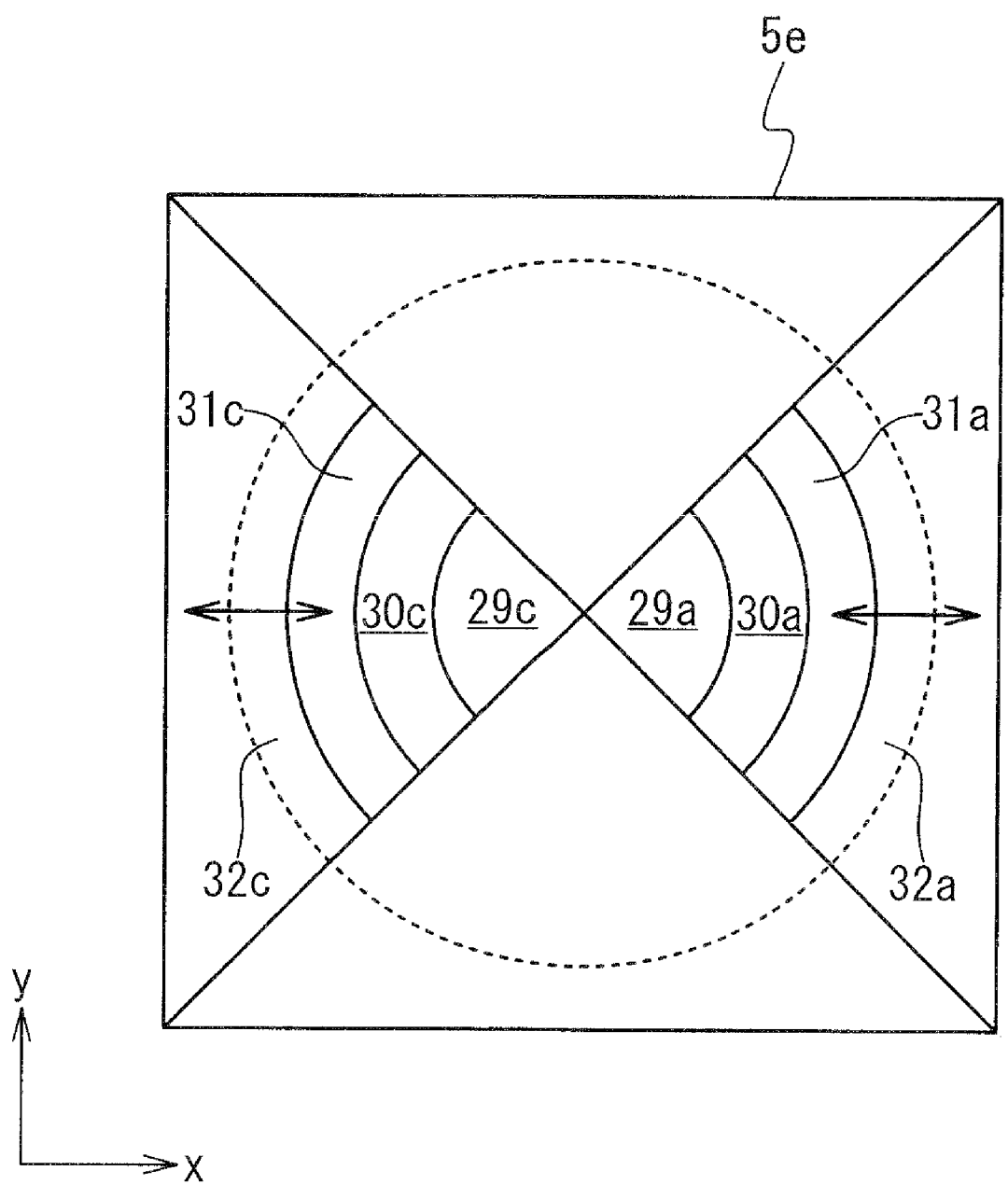
FIG. 13 is a plan view of a birefringence compensating element used in a fifth exemplary embodiment of the optical head apparatus of the present invention.

In a fifth exemplary embodiment of the optical head apparatus of the present invention, the birefringence compensating element 5e, the plan view of which is shown in FIG. 13, is used as the birefringence compensating element 5 in the optical head apparatus 50, the configuration of which is shown in FIG. 1.

FIG. 13 is a plan view of the birefringence compensating element 5e. The birefringence compensating element 5e is divided into four regions at intervals of 90° in the tangential direction with two straight lines which cross the beam axis. The left and right regions (denoted by suffixes "a" and "c") out of these four regions are each divided into four regions (denoted by the numerals 29 to 32) in the radius direction by three concentric circles with centers at the beam axis. In the following descriptions, the left and right groups of regions, namely, the groups of regions to which the suffixes "a" and "c" are attached are referred to as the region groups a and c. Also, a pair of groups of regions quartered in the radius direction, namely, the groups of regions to which the numerals "29" to "32" are assigned are referred to as the region groups 29 to 32. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5e includes members each of which exhibits uniaxial anisotropy in the refractive index. The arrows in the drawing indicate the directions of the optic axes of these members in the respective regions. The optic axes in the region groups a and c are directed in the directions of 0° with respect to the x-axis in the drawing. The absolute values of the optical phase differences between the polarization components in the directions parallel and vertical to the optic axis are 0° in the region group 29, 18° in the region group 30, 36° in the region group 31, and 54° in the region group 32. These optical phase differences within the region groups 29 to 32 of the birefringence compensating element 5e are those indicated by the dashed line in FIG. 6. The optical phase differences between the polarization components in the directions parallel and vertical to the optic axis are 0° in the upper and lower regions.

Sixth Exemplary Embodiment

Figure 14:
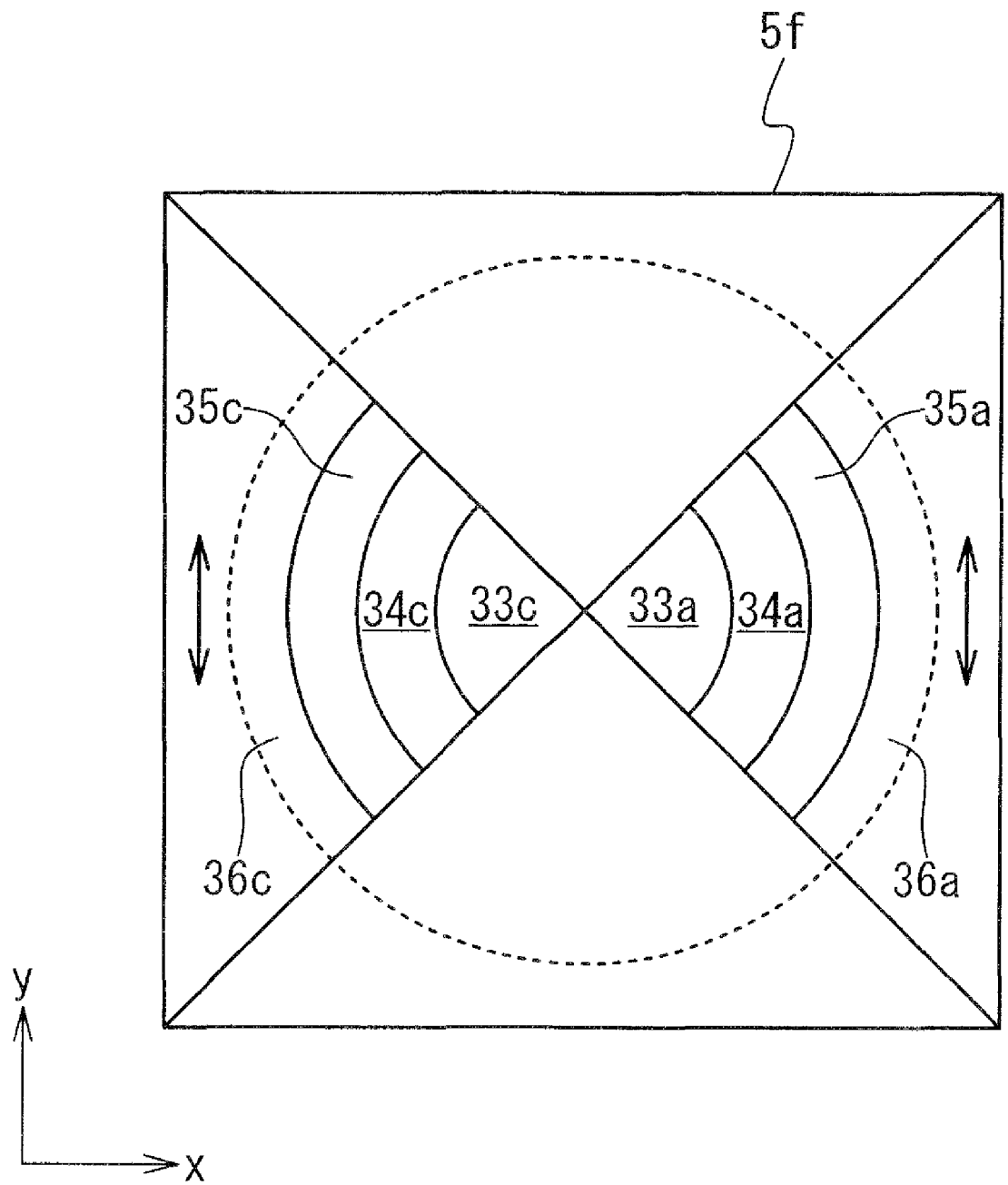
FIG. 14 is a plan view of a birefringence compensating element used in a sixth exemplary embodiment of the optical head apparatus of the present invention.

In a sixth exemplary embodiment of the optical head apparatus of the present invention, a birefringence compensating element 5f, the plan view of which is shown in FIG. 14 is used as the birefringence compensating element 5 in the optical head apparatus 50, the configuration of which is shown in FIG. 1.

FIG. 14 is a plan view of the birefringence compensating element 5e. The birefringence compensating element 5e is divided into four regions at intervals of 90° in the tangential direction with two straight lines which cross the beam axis. The left and right regions (denoted by suffixes "a" and "c") out of these four regions are each divided into four regions (denoted by the numerals 33 to 36) in the radius direction by three concentric circles with centers at the beam axis. In the following descriptions, the left and right groups of regions, namely, the groups of regions to which the suffixes "a" and "c" are attached are referred to as the region groups a and c. Also, a pair of groups of regions quartered in the radius direction, namely, the groups of regions to which the numerals "33" to "36" are assigned are referred to as the region groups 33 to 36. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5f includes members each of which exhibits uniaxial anisotropy in the refractive index. The arrows in the drawing indicate the directions of the optic axes of these members in the respective regions. The optic axes in the region groups a and c are directed in the directions of 90° with respect to the x-axis in the drawing. The absolute values of the optical phase differences between the polarization components in the directions parallel and vertical to the optic axis are 0° in the region group 33, 18° in the region group 34, 36° in the region group 35, and 54° in the region group 36. These optical phase differences within the region groups 33 to 36 of the birefringence compensating element 5e are those indicated by the dashed line in FIG. 7. The optical phase differences between the polarization components in the directions parallel and vertical to the optic axis are 0° in the upper and lower regions.

Seventh Exemplary Embodiment

Figure 15:
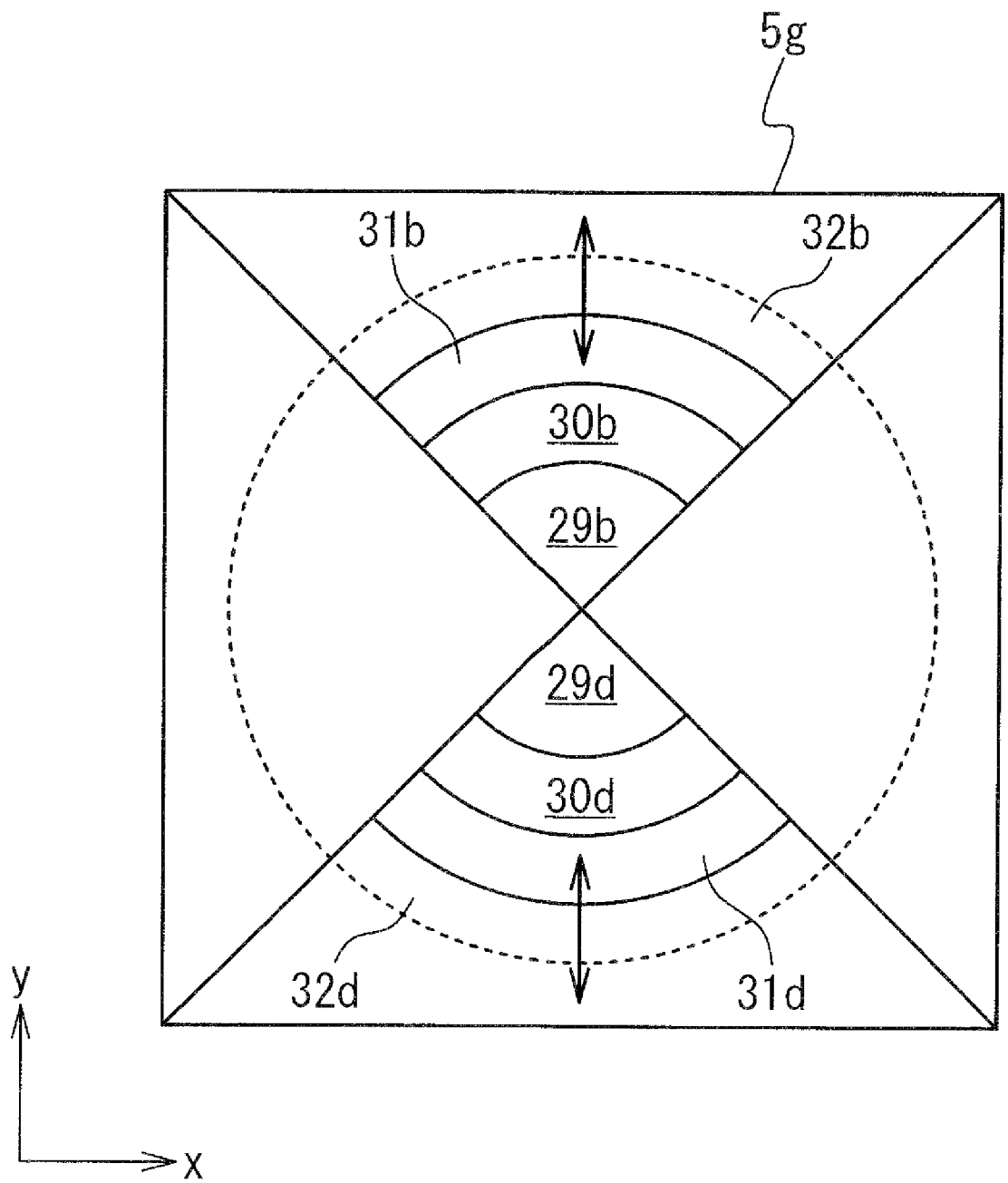
FIG. 15 is a plan view of a birefringence compensating element used in a seventh exemplary embodiment of the optical head apparatus of the present invention.

In a seventh exemplary embodiment of the optical head apparatus of the present invention, a birefringence compensating element 5g, the plan view of which is shown in FIG. 15, is used as the birefringence compensating element 5 in the optical head apparatus 50, the configuration of which is shown in FIG. 1.

FIG. 15 is a plan view of the birefringence compensating element 5g. The birefringence compensating element 5g is divided into four regions at intervals of 90° in the tangential direction with two straight lines which cross the beam axis. The upper and lower regions (denoted by suffixes "b" and "d") out of these four regions are each divided into four regions (denoted by the numerals 29 to 32) in the radius direction by three concentric circles with centers at the beam axis. In the following descriptions, the upper and lower groups of regions, namely, the groups of regions to which the suffixes "b" and "d" are attached are referred to as the region groups b and d. Also, a pair of groups of regions quartered in the radius direction, namely, the groups of regions to which the numerals "29" to "32" are assigned are referred to as the region groups 29 to 32. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5e includes members each of which exhibits uniaxial anisotropy in the refractive index. The arrows in the drawing indicate the directions of the optic axes of these members in the respective regions. The optic axes in the region groups b and d are directed in the directions of 90° with respect to the x-axis in the drawing. The absolute values of the optical phase differences between the polarization components in the directions parallel and vertical to the optic axis are 0° in the region group 29, 18° in the region group 30, 36° in the region group 31, and 54° in the region group 32. These optical phase differences within the region groups 29 to 32 of the birefringence compensating element 5e are those indicated by the dashed line in FIG. 6. The optical phase differences between the polarization components in the directions parallel and vertical to the optic axis are 0° in the left and right regions.

Eighth Exemplary Embodiment

Figure 16:
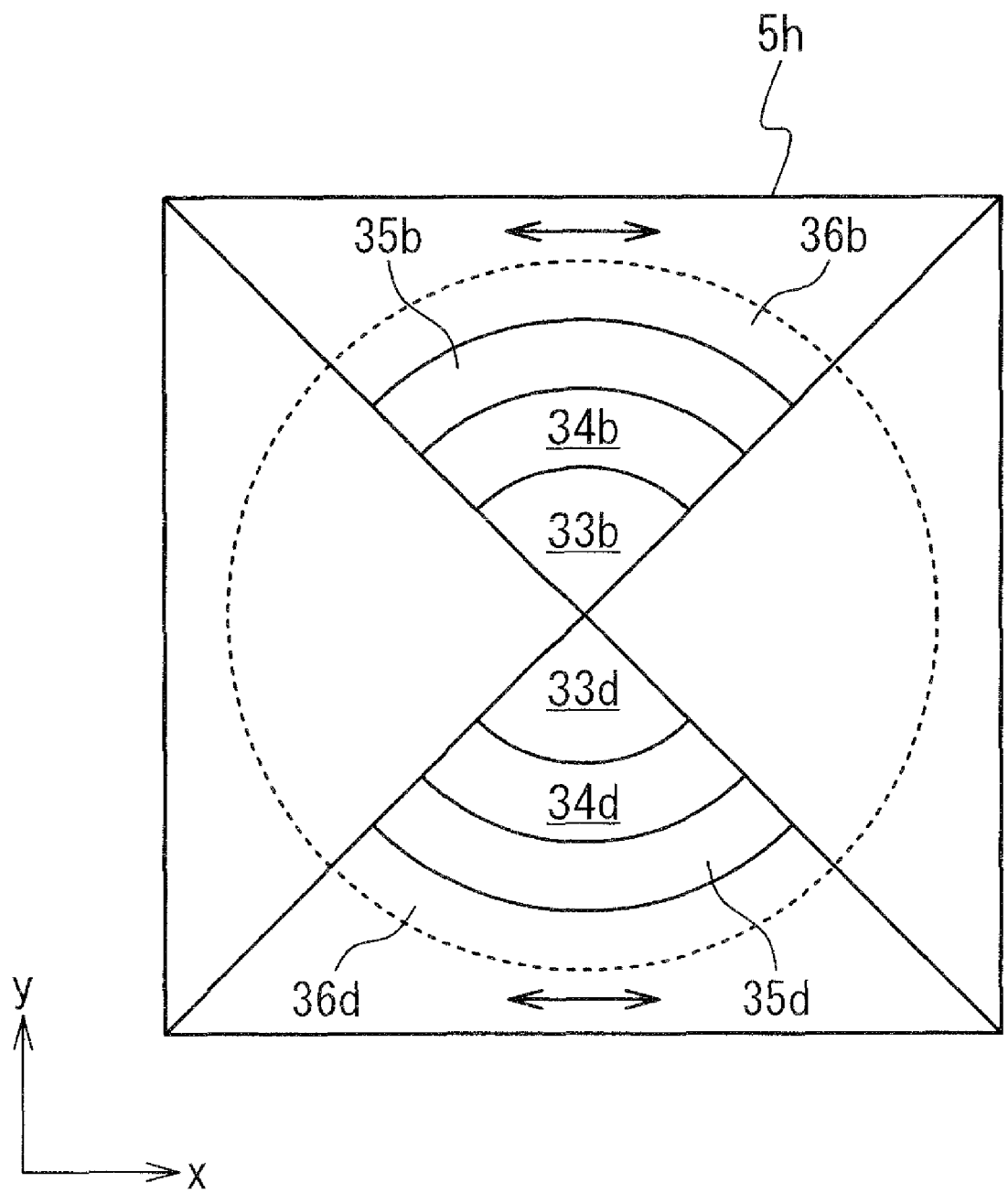
FIG. 16 is a plan view of a birefringence compensating element used in an eighth exemplary embodiment of the optical head apparatus of the present invention.

In an eighth exemplary embodiment of the optical head apparatus of the present invention, a birefringence compensating element 5h, the plan view of which is shown in FIG. 16, is used as the birefringence compensating element 5 in the optical head apparatus 50, the configuration of which is shown in FIG. 1.

FIG. 16 is a plan view of the birefringence compensating element 5h. The birefringence compensating element 5h is divided into four regions at intervals of 90° in the tangential direction with two straight lines which cross the beam axis. The upper and lower regions (denoted by suffixes "b" and "d") out of these four regions are each divided into four regions (denoted by the numerals 33 to 36) in the radius direction by three concentric circles with centers at the beam axis. In the following descriptions, the upper and lower groups of regions, namely, the groups of regions to which the suffixes "b" and "d" are attached are referred to as the region groups b and d. Also, a pair of groups of regions quartered in the radius direction, namely, the groups of regions to which the numerals "33" to "36" are assigned are referred to as the region groups 33 to 36. It should be noted that the dashed line on the drawing indicates the effective diameter of the objective lens 6. Also, the directions of the x-axis and the y-axis shown in the drawing correspond to the radius and tangential directions of the disc 7, respectively.

The birefringence compensating element 5h includes members each of which exhibits uniaxial anisotropy in the refractive index. The arrows in the drawing indicate the directions of the optic axes of these members in the respective regions. The optic axes in the region groups b and d are directed in the directions of 0° with respect to the x-axis in the drawing. The absolute values of the optical phase differences between the polarization components in the directions parallel and vertical to the optic axis are 0° in the region group 33, 18° in the region group 34, 36° in the region group 35, and 54° in the region group 36. These optical phase differences within the region groups 33 to 36 of the birefringence compensating element 5e are those indicated by the dashed line in FIG. 7. The optical phase differences between the polarization components in the directions parallel and vertical to the optic axis are 0° in the left and right regions.

In the birefringence compensating element 5e shown in FIG. 13, the direction of the optic axis is in the radius direction of the circle with center at the beam axis, at the centers of the regions 29a, 30a, 31a and 32a and at the centers of the regions 29c, 30c, 31c and 32c. However, the direction of the optic axis is shifted from the radius direction of the circle with center at the beam axis with a larger shifting, as it goes from the center of each region group to the boundary with the upper and lower region groups.

In the birefringence compensating element 5f shown in FIG. 14, the direction of the optic axis is in the tangential direction of the circle with center at the beam axis, at the centers of the regions 33a, 34a, 35a and 36a and at the centers of the regions 33c, 34c, 35c and 36c. However, the direction of the optic axis is shifted from the tangential direction of the circle with center at the beam axis with a larger shifting, as it goes from the center of each region group to the boundary with the upper and lower region groups.

In the birefringence compensating element 5g shown in FIG. 15, the direction of the optic axis is in the radius direction of the circle with center at the beam axis, at the centers of the regions 29b, 30b, 31b and 32b and at the centers of the regions 29d, 30d, 31d and 32d. However, the direction of the optic axis is shifted from the radius direction of the circle with center at the beam axis with a larger shifting, as it goes from the center of each region group to the boundary with the left and right region groups.

In the birefringence compensating element 5h shown in FIG. 16, the direction of the optic axis is in the tangential direction of the circle with center at the beam axis, at the centers of the regions 33a, 34a, 35a and 36a and at the centers of the regions 33c, 34c, 35c and 36c. However, the direction of the optic axis is shifted from the tangential direction of the circle with center at the beam axis with a larger shifting, as it goes from the center of each region group to the boundary with the left and right region groups.

Used as the members with the uniaxial anisotropy of refractive index within the birefringence compensating element 5e is liquid crystal polymer, as is the case of the birefringence compensating elements 5a to 5d. For the case of the optic axis is approximately in the radial direction of the circle with center at the beam axis as is the case of the left and right regions of the birefringence compensating element 5e, the phase lagging should be varied from 0° to 18°, to 36° and to 54° as indicated by the dashed lines in FIG. 6, in order to vary the absolute value of the optical phase difference from 0°, to 18°, to 36° and to 54° in the direction from the inside to the outside.

The sectional view of the birefringence compensating element 5e is same as that shown in FIG. 8. In the region groups a and c of the birefringence compensating element 5e, the projection of the longitudinal direction of the liquid crystal polymer 28 to the in-plane direction is placed into a predetermined state so that the direction of the optic axis is in the direction of 0° with respect to the x-axis. In the region group 29 of the birefringence compensating element 5e, the angle between the longitudinal direction of the liquid crystal polymer 28 and the in-plane direction is placed into a predetermined state so that the optical phase difference is adjusted to 0°. In the region group 30 of the birefringence compensating element 5e, the angle between the longitudinal direction of the liquid crystal polymer 28 and the in-plane direction is placed into a predetermined state so that the optical phase difference is adjusted to 18°. In the region group 31 of the birefringence compensating element 5e, the angle between the longitudinal direction of the liquid crystal polymer 28 and the in-plane direction is placed into a predetermined state so that the optical phase difference is adjusted to 36°. In the region group 32 of the birefringence compensating element 5e, the angle between the longitudinal direction of the liquid crystal polymer 28 and the in-plane direction is placed into a predetermined state so that the optical phase difference is adjusted to 54°. The angle between the longitudinal direction of the liquid crystal polymer 28 and the in-plane direction is varied from the state shown in FIG. 8A to the state shown in FIG. 8D, as the optical phase difference is increased from 0°, to 18°, to 36° and to 54°.

Used as the members with the uniaxial anisotropy of refractive index within the birefringence compensating element 5f is liquid crystal polymer, as is the case of the birefringence compensating elements 5a to 5d. For the case of the optic axis is approximately in the tangential direction of the circle with center at the beam axis as is the case of the left and right regions of the birefringence compensating element 5f, the phase lagging should be varied from 360° to 342°, to 324° and to 306° as indicated by the dashed lines in FIG. 7, in order to vary the absolute value of the optical phase difference from 0°, to 18°, to 36° and to 54° in the direction from the inside to the outside.

The sectional view of the birefringence compensating element 5f is same as that shown in FIG. 8. In the region groups a and c of the birefringence compensating element 5f, the projection of the longitudinal direction of the liquid crystal polymer 28 to the in-plane direction is placed into a predetermined state so that the direction of the optic axis is in the direction of 90° with respect to the x-axis. In the region group 33 of the birefringence compensating element 5f, the angle between the longitudinal direction of the liquid crystal polymer 28 and the in-plane direction is placed into a predetermined state so that the optical phase difference is adjusted to 360°. In the region group 34 of the birefringence compensating element 5f, the angle between the longitudinal direction of the liquid crystal polymer 28 and the in-plane direction is placed into a predetermined state so that the optical phase difference is adjusted to 342°. In the region group 35 of the birefringence compensating element 5f, the angle between the longitudinal direction of the liquid crystal polymer 28 and the in-plane direction is placed into a predetermined state so that the optical phase difference is adjusted to 324°. In the region group 36 of the birefringence compensating element 5f, the angle between the longitudinal direction of the liquid crystal polymer 28 and the in-plane direction is placed into a predetermined state so that the optical phase difference is adjusted to 306°. The angle between the longitudinal direction of the liquid crystal polymer 28 and the in-plane direction is varied from the state shown in FIG. 8D to the state shown in FIG. 8A, as the optical phase difference is increased from 360°, to 342°, to 324° and to 306°.

Used as the members with the uniaxial anisotropy of refractive index within the birefringence compensating element 5g is liquid crystal polymer, as is the case of the birefringence compensating elements 5a to 5d. For the case of the optic axis is approximately in the radial direction of the circle with center at the beam axis as is the case of the upper and lower regions of the birefringence compensating element 5g, the phase lagging should be varied from 0° to 18°, to 36° and to 54° as indicated by the dashed lines in FIG. 6, in order to vary the absolute value of the optical phase difference from 0°, to 18°, to 36° and to 54° in the direction from the inside to the outside.

The sectional view of the birefringence compensating element 5g is same as that shown in FIG. 8. In the region groups b and d of the birefringence compensating element 5g, the projection of the longitudinal direction of the liquid crystal polymer 28 to the in-plane direction is placed into a predetermined state so that the direction of the optic axis is in the direction of 90° with respect to the x-axis. In the region group 29 of the birefringence compensating element 5g, the angle between the longitudinal direction of the liquid crystal polymer 28 and the in-plane direction is placed into a predetermined state so that the optical phase difference is adjusted to 0°. In the region group 30 of the birefringence compensating element 5g, the angle between the longitudinal direction of the liquid crystal polymer 28 and the in-plane direction is placed into a predetermined state so that the optical phase difference is adjusted to 18°. In the region group 31 of the birefringence compensating element 5g, the angle between the longitudinal direction of the liquid crystal polymer 28 and the in-plane direction is placed into a predetermined state so that the optical phase difference is adjusted to 36°. In the region group 32 of the birefringence compensating element 5g, the angle between the longitudinal direction of the liquid crystal polymer 28 and the in-plane direction is placed into a predetermined state so that the optical phase difference is adjusted to 54°. The angle between the longitudinal direction of the liquid crystal polymer 28 and the in-plane direction is varied from the state shown in FIG. 8A to the state shown in FIG. 8D, as the optical phase difference is increased from 0°, to 18°, to 36° and to 54°.

Used as the members with the uniaxial anisotropy of refractive index within the birefringence compensating element 5h is liquid crystal polymer, as is the case of the birefringence compensating elements 5a to 5d. For the case of the optic axis is approximately in the tangential direction of the circle with center at the beam axis as is the case of the upper and lower regions of the birefringence compensating element 5h, the phase lagging should be varied from 360° to 342°, to 324° and to 306° as indicated by the dashed lines in FIG. 7, in order to vary the absolute value of the optical phase difference from 0°, to 18°, to 36° and to 54° in the direction from the inside to the outside.

The sectional view of the birefringence compensating element 5h is same as that shown in FIG. 8. In the region groups b and d of the birefringence compensating element 5h, the projection of the longitudinal direction of the liquid crystal polymer 28 to the in-plane direction is placed into a predetermined state so that the direction of the optic axis is in the direction of 0° with respect to the x-axis. In the region group 33 of the birefringence compensating element 5h, the angle between the longitudinal direction of the liquid crystal polymer 28 and the in-plane direction is placed into a predetermined state so that the optical phase difference is adjusted to 360°. In the region group 34 of the birefringence compensating element 5h, the angle between the longitudinal direction of the liquid crystal polymer 28 and the in-plane direction is placed into a predetermined state so that the optical phase difference is adjusted to 342°. In the region group 35 of the birefringence compensating element 5h, the angle between the longitudinal direction of the liquid crystal polymer 28 and the in-plane direction is placed into a predetermined state so that the optical phase difference is adjusted to 324°. In the region group 36 of the birefringence compensating element 5h, the angle between the longitudinal direction of the liquid crystal polymer 28 and the in-plane direction is placed into a predetermined state so that the optical phase difference is adjusted to 306°. The angle between the longitudinal direction of the liquid crystal polymer 28 and the in-plane direction is varied from the state shown in FIG. 8D to the state shown in FIG. 8A, as the optical phase difference is increased from 360°, to 342°, to 324° and to 306°.

Figure 17:
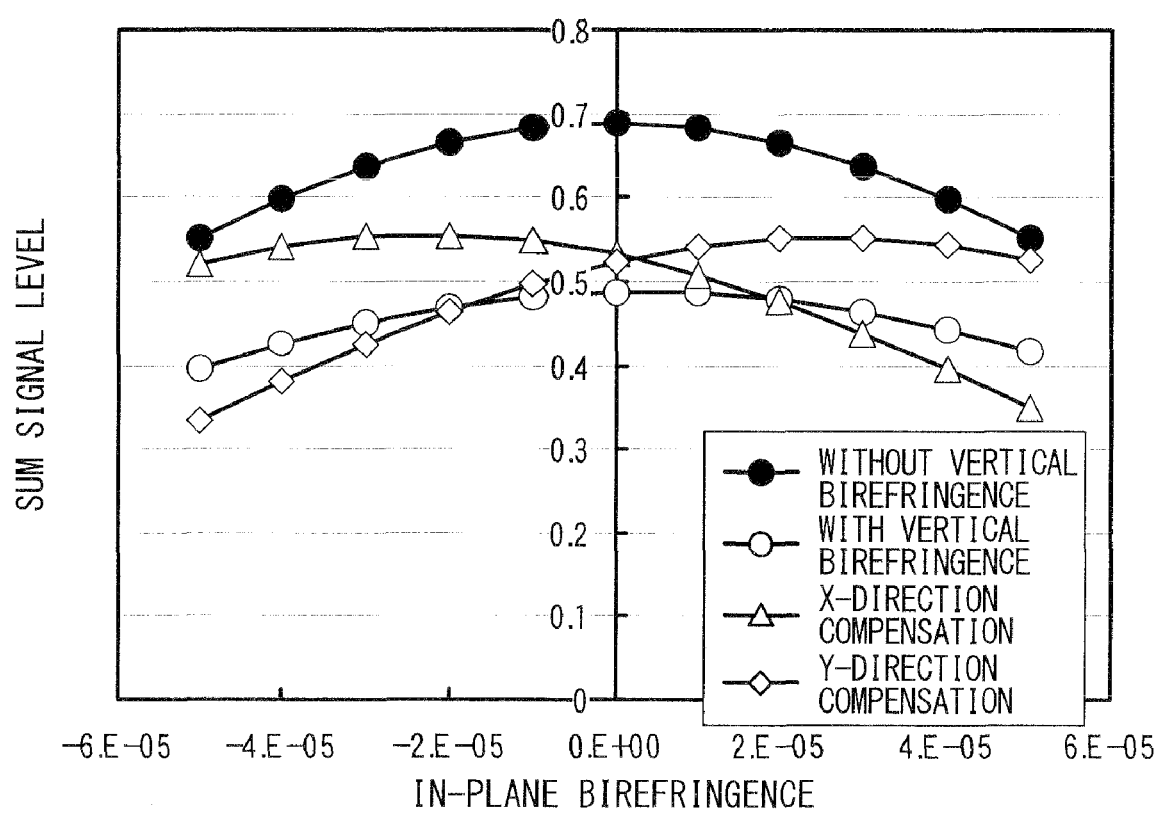
FIG. 17 is a view showing a calculation example of the relation between the value of in-plane birefringence and the sum signal level with the value of the vertical birefringence used as a parameter.
Figure 18:
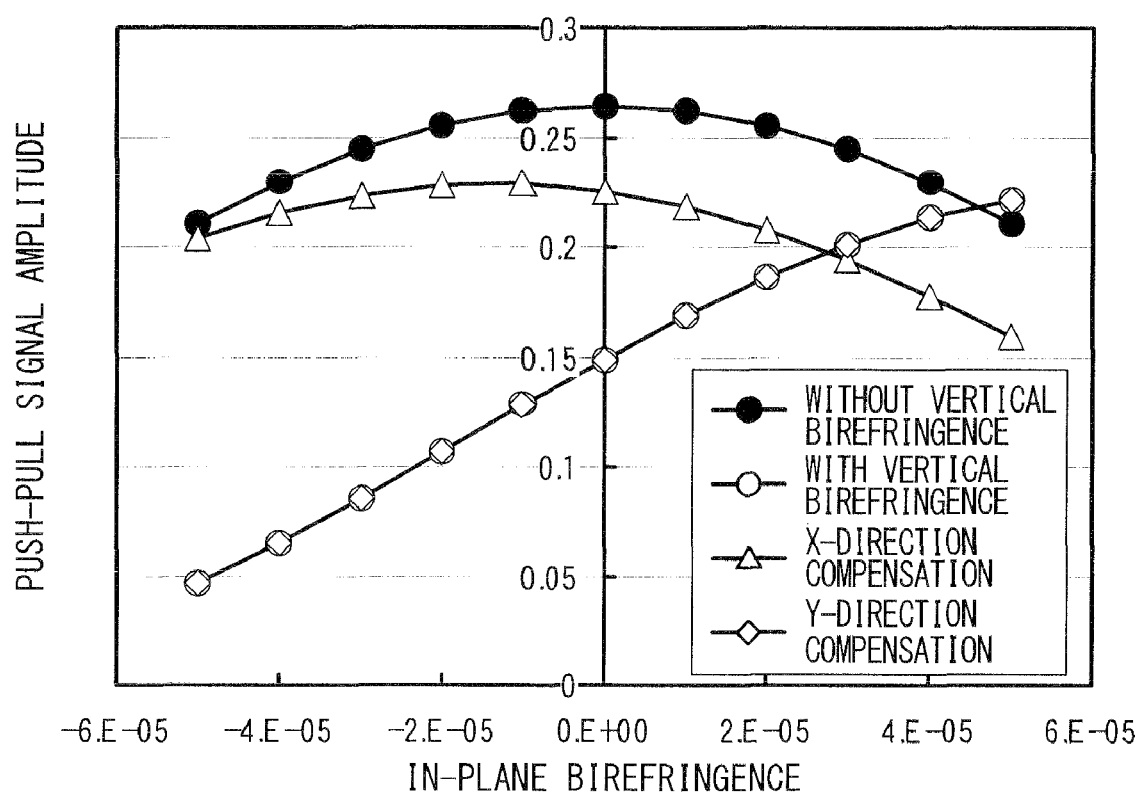
FIG. 18 is a view showing a calculation example of the relation between the value of in-plane birefringence and the push-pull signal with the value of vertical birefringence used as a parameter.
Figure 19:
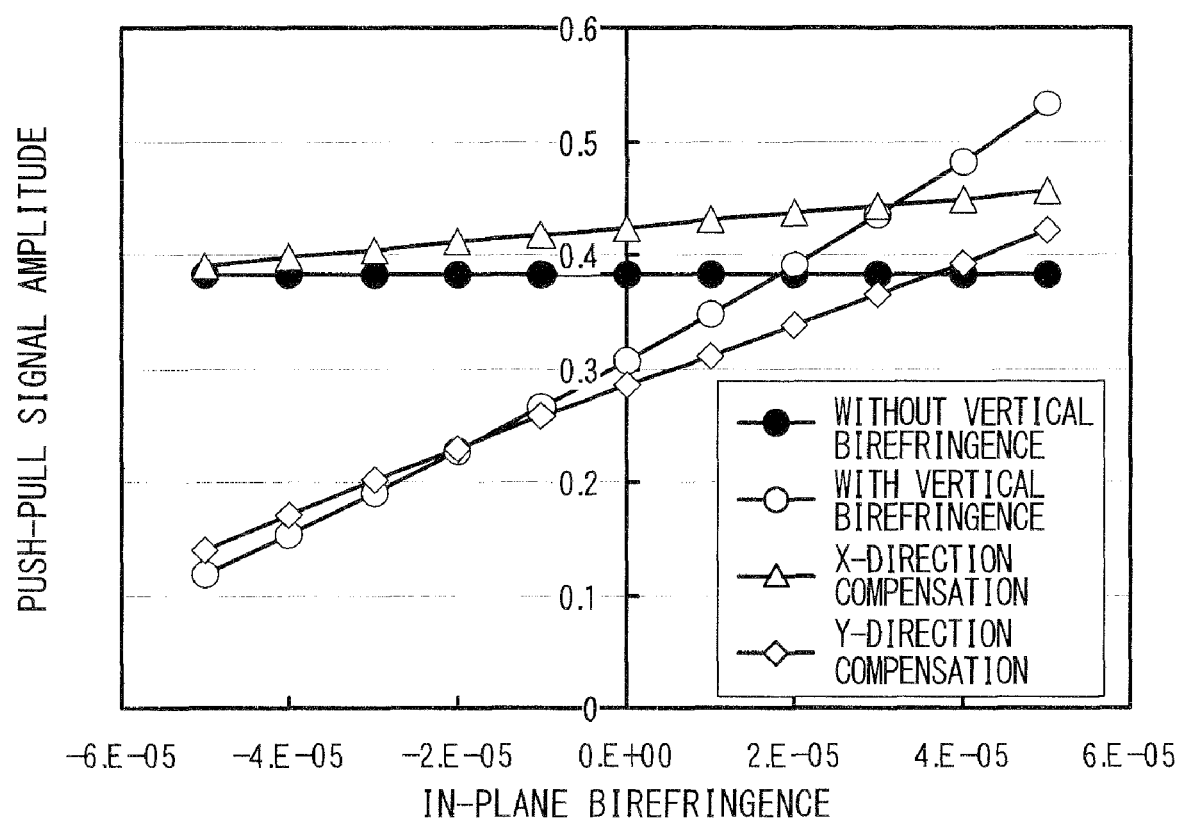
FIG. 19 is a view showing a calculation example of the relation between the value of in-plane birefringence and the push-pull signal modulation factor with the value of vertical birefringence used as a parameter.

With regard to the case of using the birefringence compensating elements 5 explained in the fifth to eight exemplary embodiments, FIG. 17 shows a calculation example of the relation of the value of in-plane birefringence to the sum signal level with the value of vertical birefringence used as a parameter, and FIG. 18 shows a calculation example of the relation of the value of in-plane birefringence to the push-pull signal amplitude with the value of vertical birefringence used as a parameter. Additionally, FIG. 19 shows a calculation example of the relation of the value of in-plane birefringence to the push-pull signal modulation factor with the value of vertical birefringence used as a parameter, which is obtained from the sum signal level shown in FIG. 17 and the push-pull signal amplitude shown in FIG. 18. The calculation conditions are same as the conditions described with respect to FIGS. 28 to 30. The vertical axes of FIG. 17 and FIG. 18 are standardized by the sum signal level for the case that the groove is not formed on the optical recording medium. The black circles on the drawings indicate the calculation result for the value of vertical birefringence being 0, and the white circles on the drawings indicate the calculation result for the value of the vertical birefringence being $7 \times 10^{-4}$ without the compensation by the birefringence compensating element 5. These results are same to those shown in FIGS. 28 to 30. The symbols Δ on the drawings indicate the calculation result for the value of vertical birefringence being $7 \times 10^{-4}$ with the compensation by the birefringence compensating element 5e or 5f shown in FIGS. 13 and 14 with respect to only the left and right regions (only X direction). The symbols ◇ on the drawings indicate the calculation result for the value of vertical birefringence being $7 \times 10^{-4}$ with the compensation by the birefringence compensating element 5g or 5h shown in FIGS. 15 and 16 with respect to only the upper and lower regions (only Y direction).

With reference to FIG. 17, the sum signal level shows the maximum value at a value of in-plane birefringence slightly smaller than zero, and the sum signal level decreases as the value of the in-plane birefringence increases or decreases from that value, for the case that the compensation is achieved by the birefringence compensating element 5 (5e, 5f). For the case that the compensation is achieved by the birefringence compensating element 5 (5g, 5h), on the other hand, the sum signal level shows the maximum value at a value of in-plane birefringence slightly larger than zero, and the sum signal level decreases as the value of the in-plane birefringence increases or decreases from that value.

With reference to FIG. 18, on the other hand, the push-pull signal amplitude shows the maximum value at a value of in-plane birefringence slightly smaller than 0, and the push-pull signal amplitude decreases as the value of in-plane birefringence increases or decreases from that value, for the case that the compensation is achieved by the birefringence compensating element 5 (5e, 5f) with respect to only the left and right regions. For the case that the compensation is achieved by the birefringence compensating element 5 (5g, 5h) with respect to only the upper and lower regions, on the other hand, the push-pull signal amplitude monotonously decreases as the value of in-plane birefringence is changed from positive to negative value.

As a result, as shown in FIG. 19, the push-pull signal modulation factor decreases monotonously and slightly as the value of the in-plane birefringence is changed from positive to negative value, when the compensation is achieved by the birefringence compensating element 5 (5e, 5f) only with respect to the left and right regions. On the other hand, the push-pull signal modulation factor decreases monotonously in some degree as the value of in-plane birefringence is changed from positive to negative value, when the compensation is achieved by the birefringence compensating element 5 (5g, 5h) only with respect to the upper and lower regions. This fact proves that the use of the birefringence compensating element 5 suppresses the change in the push-pull signal modulation factor depending on the in-plane position of the optical recording medium. Larger suppression effect of the change in the push-pull signal modulation factor is achieved by the birefringence compensating element 5 (5e, 5f), which provides the compensation only with respect to the left and right regions, as compared with the birefringence compensating element 5 (5g, 5h), which provides the compensation only with respect to the upper and lower regions.

Figure 20:
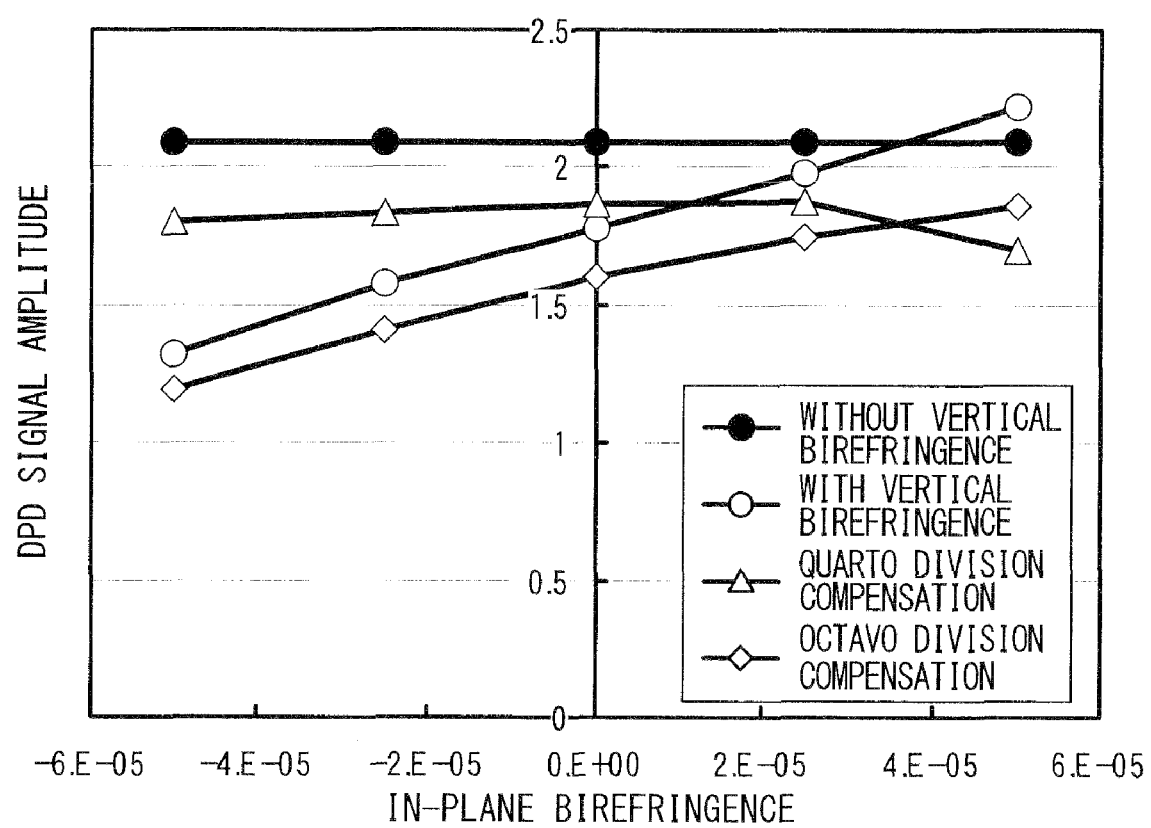
FIG. 20 is a view showing a calculation example of the relation between the value of in-plane birefringence and the DPD signal amplitude with the value of vertical birefringence used as a parameter.

FIG. 20 shows a calculation example of the relation of the value of in-plane birefringence to the DPD signal amplitude with the value of vertical birefringence used as a parameter for the respective cases that the birefringence compensating element 5 depicted in the fifth to eighth exemplary embodiments. The calculation conditions are same as the conditions described with respect to FIG. 31. The vertical axis of FIG. 20 is standardized by the duration of the channel clock. The black circles on the drawing indicate the calculation result for the value of vertical birefringence being 0, and the white circles on the drawing indicate the calculation result for the value of vertical birefringence being $7 \times 10^{-4}$ without the compensation by the birefringence compensating element 5. These results are same as those shown in FIG. 31. The symbols Δ in the drawing indicate the calculation result for the value of vertical birefringence being $7 \times 10^{-4}$, when the compensation is achieved by the birefringence compensating element 5e or 5f shown in FIGS. 13 and 14 with respect to only the left and right regions. The symbols ◇ in the drawing indicate the calculation result for the value of vertical birefringence being $7 \times 10^{-4}$, when the compensation is achieved by the birefringence compensating element 5g or 5h shown in FIGS. 15 and 16 with respect to only the upper and lower regions.

As shown in FIG. 20, the DPD signal amplitude slightly increases once as the value of in-plane birefringence is changed from positive to negative value, and then decreases slightly, when the compensation is achieved by the birefringence compensating element 5 (5e, 5f) with respect to only the left and right regions. When the compensation is achieved by the birefringence compensating element 5 (5g, 5h) with respect to only the upper and lower portions, on the other hand, the DPD signal amplitude decreases monotonously and slightly as the value of in-plane birefringence is changed from positive value to negative value. This fact proves the use of the birefringence compensating element 5 suppresses the change in the DPD signal amplitude depending on the in-plane position of the optical recording medium. Larger suppression effect of the change in the DPD signal amplitude is achieved by the birefringence compensating element 5 (5e, 5f), which provides the compensation with respect to only the left and right regions, as compared with the birefringence compensating element 5 (5g, 5h), which provides the compensation with respect to only the upper and lower regions.

The birefringence compensating elements 5e and 5f shown in FIGS. 13 and 14 are divided into the four regions in the tangential direction, and the right and left regions of the four regions provide the compensation of the vertical birefringence, while the upper and lower regions do not provide the compensation of the vertical birefringence. Each of the right and left regions is further divided into the four regions in the radius direction, with the optic axis directed in the same direction among the regions, and with the different optical phase differences among the regions. On the other hand, the birefringence compensating elements 5g and 5h shown in FIGS. 15 and 16 are divided into the four regions in the tangential direction, and the upper and lower regions of the four regions provides the compensation of the vertical birefringence, while the right and left regions do not provide the compensation of the vertical birefringence. Each of the upper and lower regions are further divided into the four regions in the radius direction, with the optic axis directed in the same direction among the regions, and with the different optical phase differences among the regions. However, the selection of the regions which provides the compensation of the vertical birefringence in the birefringence compensating element 5 is not limited to the right and left regions or the upper and lower regions, the combination of regions providing the compensation of the vertical birefringence may be arbitrary modified. Additionally, the direction of the optic axis and the optical phase difference in the regions providing the compensation of the vertical birefringence may be same or may be different depending on the in-plane position. The effect of the use of the birefringence compensating element 5 for suppressing the changes in the push-pull signal modulation factor and DPD signal amplitude depending on the in-plane position of the optical recording medium is enhanced, as the regions providing the compensation of the vertical birefringence in the birefringence compensating element 5 are positioned closer to the right and left positions.

Ninth Exemplary Embodiment

Figure 21:
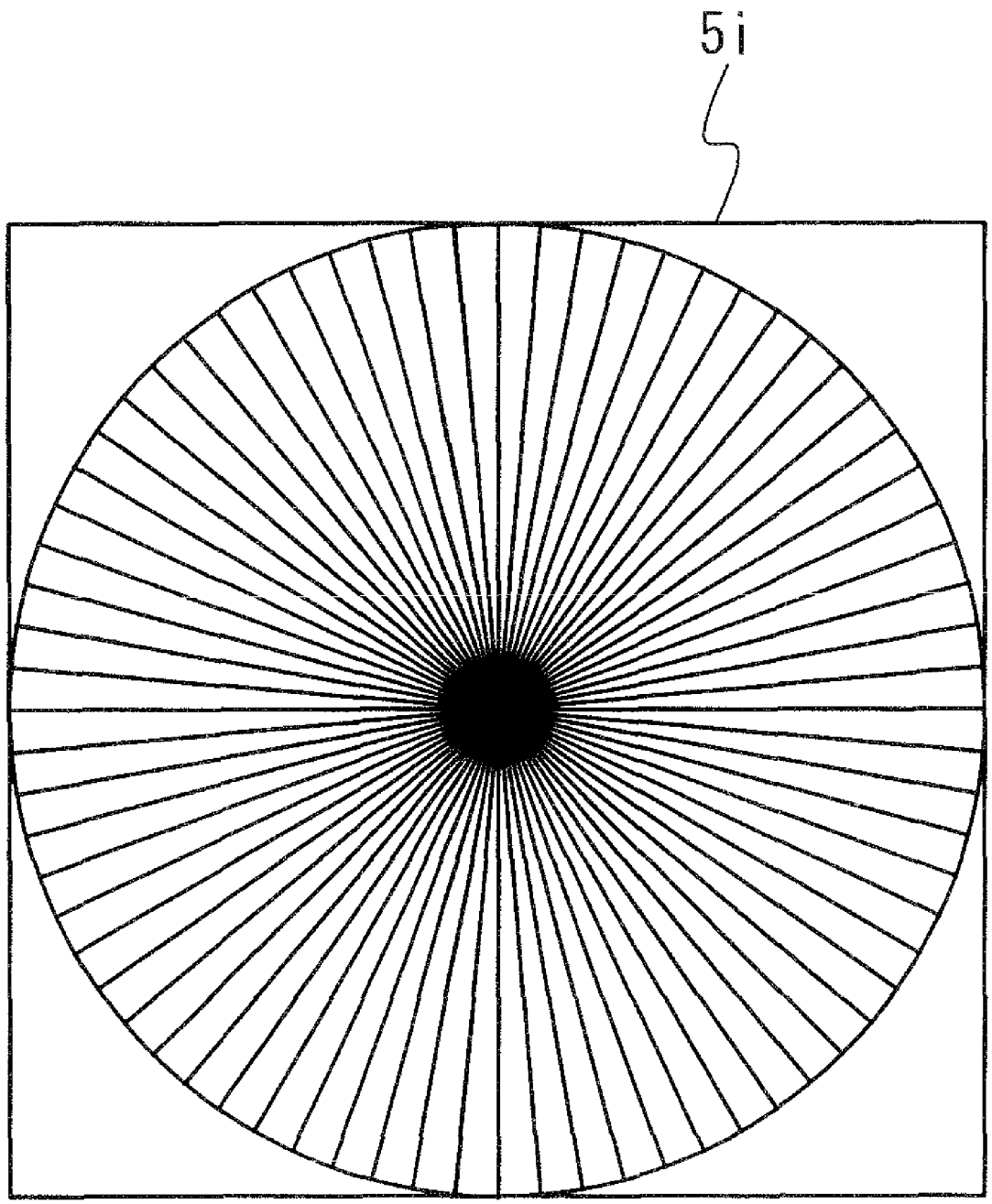
FIG. 21 is a plan view of a birefringence compensating element used in a ninth exemplary embodiment of the optical head apparatus of the present invention.

In a ninth exemplary embodiment of the optical head apparatus of the present invention, the birefringence compensating element 5i, the plan view of which is shown in FIG. 21, is used as the birefringence compensating element 5 in the optical head apparatus 50, the configuration of which is shown in FIG. 1.

FIG. 21 is the plan view of the birefringence compensating element 5i. The birefringence compensating element 5i is structured to have a radially-structured grating with center at the beam axis. The birefringence compensating element 5i does not include a member formed of material with uniaxial anisotropy in the refractive index; and the form birefringence is used to provide uniaxial anisotropy in the refractive index for the birefringence compensating element 5i formed of isotropic material. In this case, the direction of the optic axis in the birefringence compensating element 5i is the direction parallel or vertical to the grating. Thus, radially forming a grating allows directing the direction of the optic axis to the radius direction or the tangential direction of the circle with center at the beam axis in the rotational symmetry with respect to the beam axis. In other words, radially forming a grating allows successively varying the optic axis.

Tenth Exemplary Embodiment

Figure 22:
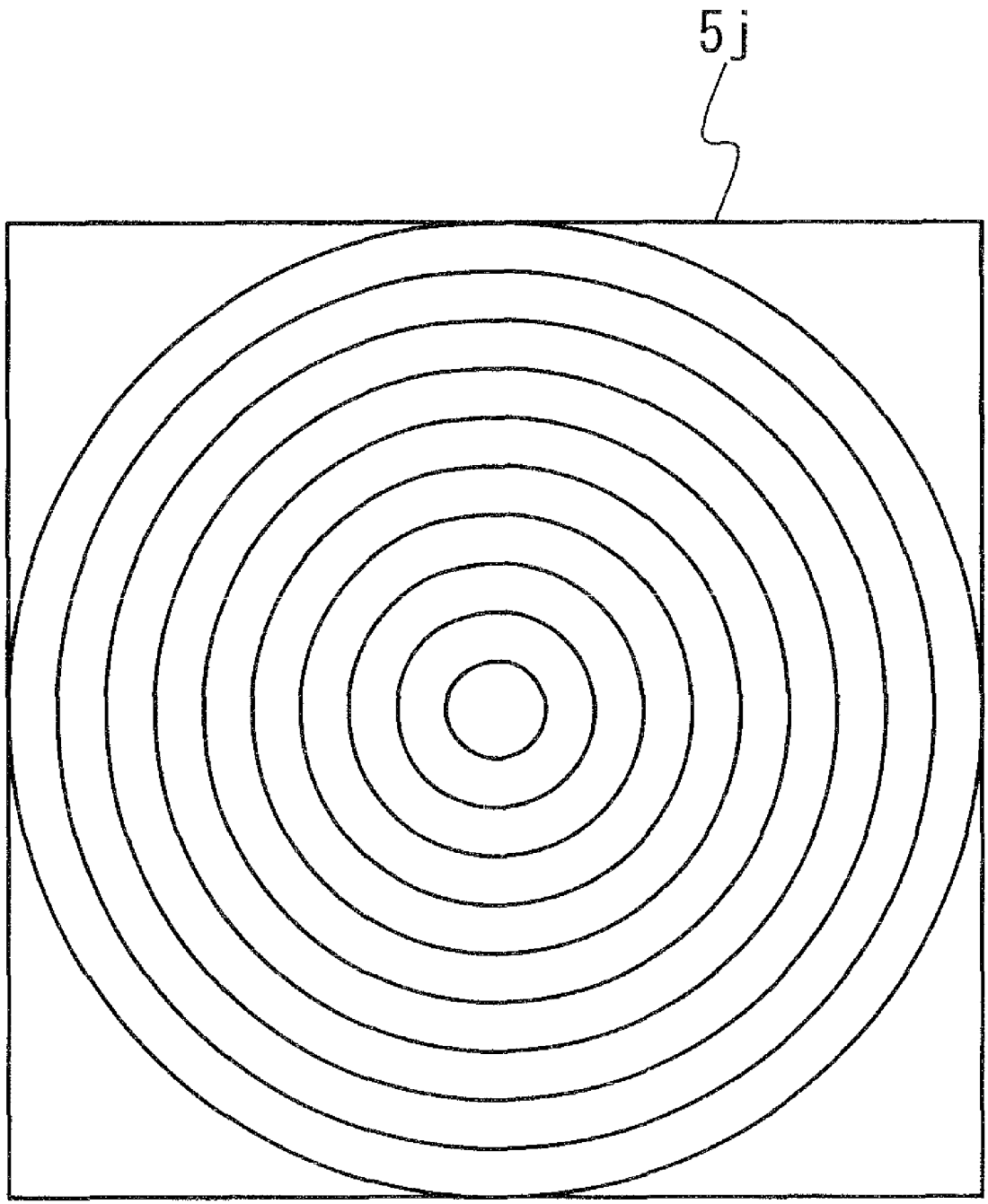
FIG. 22 is a plan view of a birefringence compensating element used in a tenth exemplary embodiment of the optical head apparatus of the present invention.

In a tenth exemplary embodiment of the optical head apparatus of the present invention, the birefringence compensating element 5j, the plan view of which is shown in FIG. 22, is used as the birefringence compensating element 5 in the optical head apparatus 50, the configuration of which is shown in FIG. 1.

FIG. 22 is a plan view of the birefringence compensating element 5j. The birefringence compensating element 5j is structured to have a concentric grating with center at the beam axis. The birefringence compensating element 5j does not include a member formed of material with uniaxial anisotropy in the refractive index; and the form birefringence is used to provide uniaxial anisotropy in the refractive index for the birefringence compensating element 5i formed of isotropic material. In this case, the direction of the optic axis in the birefringence compensating element 5i is the direction parallel or vertical to the grating. Thus, concentrically forming a grating allows directing the direction of the optic axis to the radius direction or the tangential direction of the circle with center at the beam axis in the rotational symmetry with respect to the beam axis. In other words, concentrically forming a grating allows successively varying the optic axis.

When the grating cycle is sufficiently smaller as compared with the wavelength of the incoming light, this grating does not refract the incoming light, rather acts as a wavelength plate for the incoming light. Assuming that the refractive indexes of the two media forming the grating are a medium refractive index n1 and a medium refractive index n2, the volume ratios of the respective mediums for one cycle of the grating are q and 1−q (q is the duty ratio of the grating), and the effective refractive indexes for the polarization component in the direction parallel to the grating (the TE polarized component) and the polarization component in the direction vertical to the grating (the TM polarized component) are $n_i$ and $n_v$, respectively. $n_i$ and $n_v$ are given by the following equations:

$$n_i = [n_1^2 q + n_2^2 (1-q)]^{\frac{1}{2}} \quad \text{[Equation 9]}$$

$$n_v = \left[\left(\frac{1}{n_1}\right)^2 q + \left(\frac{1}{n_2}\right)^2 (1-q)\right]^{\frac{1}{2}} \quad \text{[Equation 10]}$$

Figure 23:
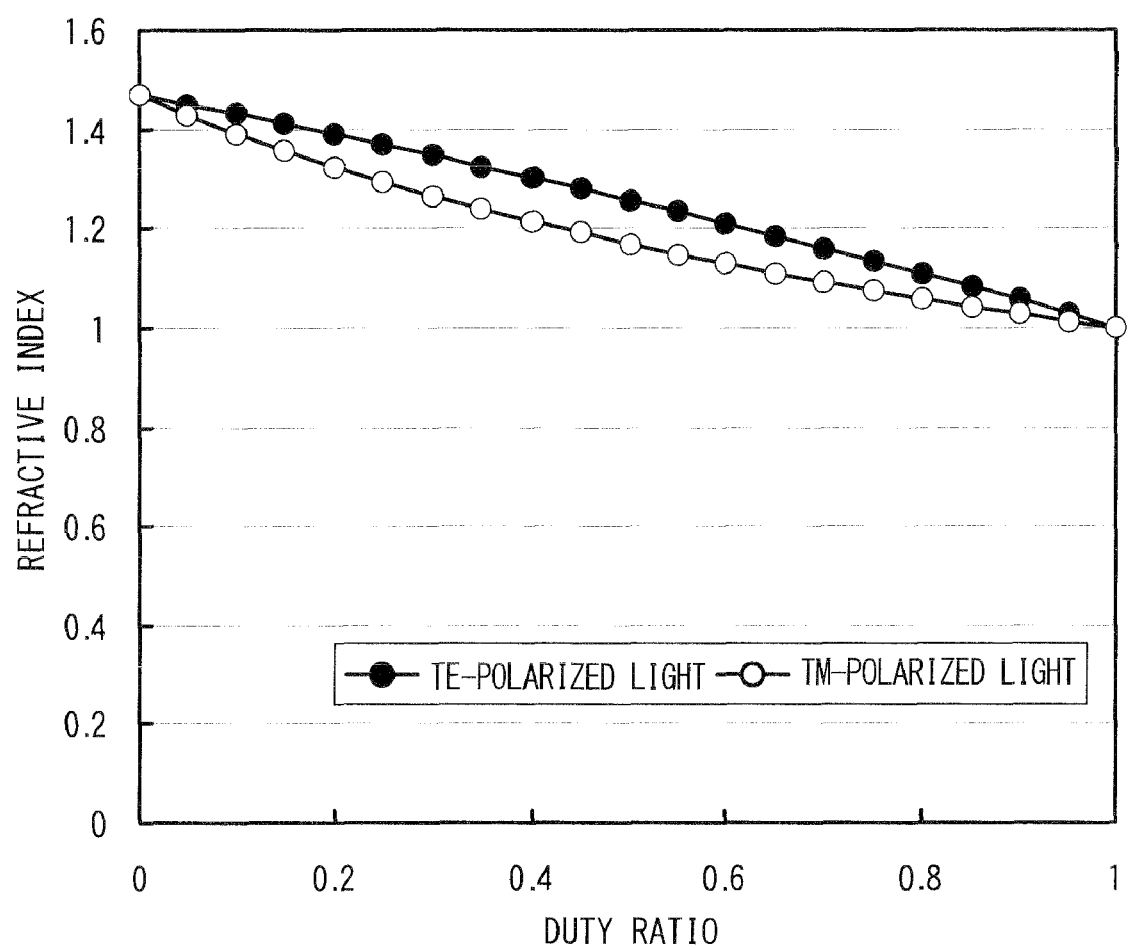
FIG. 23 is a view showing a calculation example of the relation between the duty ratio of the grating and the effective refractive index, in the birefringence compensating element used in the ninth and tenth exemplary embodiments of the optical head apparatus of the present invention.
Figure 24A:
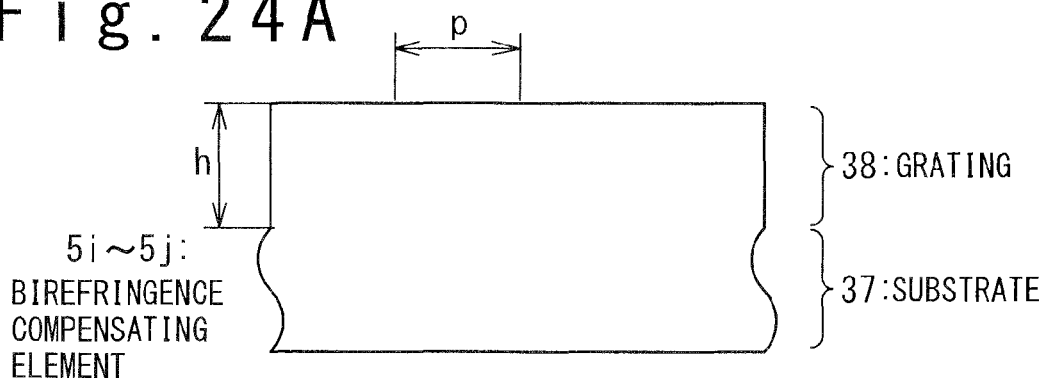
FIGS. 24A to 24D are sectional views of the birefringence compensating element used in the ninth and tenth exemplary embodiments of the optical head apparatus of the present invention.
Figure 24B:
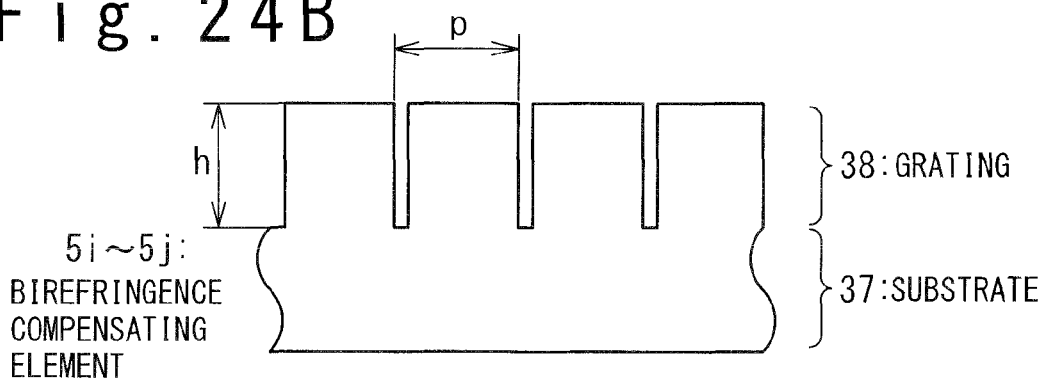
Figure 24C:
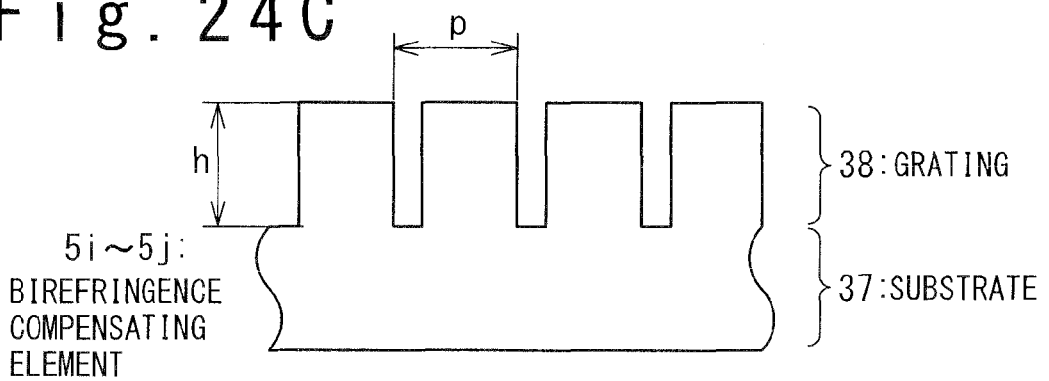
Figure 24D:
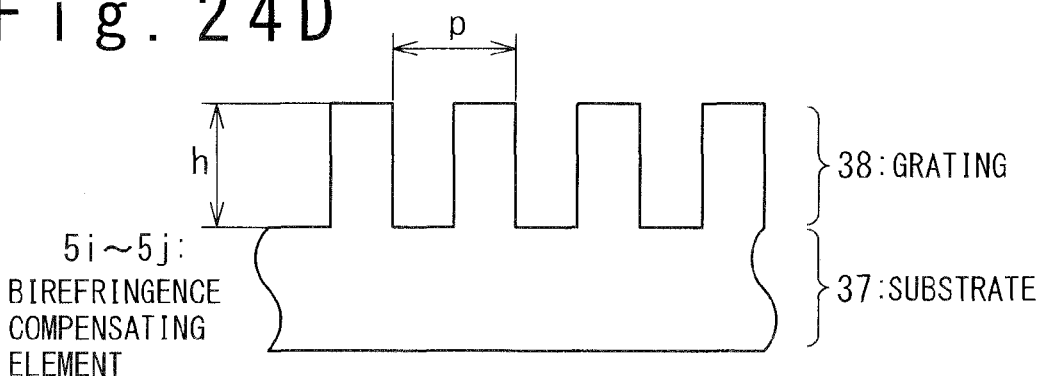

FIG. 23 shows a calculation example of the relation of the duty ration q of the grating to the effective refractive indexes. Here, the two media are assumed to be air and quartz, and the refractive indexes thereof are the medium refractive index n1=1, and the medium refractive index n2=1.47. The black circles in the drawing indicate the calculation result of the effective refractive index $n_i$ for the polarization component in the direction parallel to the grating (the TE polarized component). On the other hand, the white circles in the drawing indicate the calculation result of the effective refractive index $n_v$ for the polarization component in the direction vertical to the grating (the TM polarized component). For $\Delta n = n_i - n_v$, $\Delta n$ takes the minimum value of 0, when the grating duty ratio q=0, while $\Delta n$ takes the maximum value of 0.0887, when the grating duty ratio q=0.45.

FIG. 24 are sectional views of the birefringence compensating elements 5i and 5j. The birefringence compensating elements 5i and 5j are structured in which a grating 38 is formed on a substrate 37 made of quartz. The cycle of the grating 38 is denoted by the symbol p, and the height of the grating 38 is denoted by the symbol h. The cycle p of the grating 38 is sufficiently short as compared with the wavelength of the incoming light. The optical phase differences in the birefringence compensating elements 5i, 5j are given as $2\pi h \Delta n / \lambda$, where $\lambda$ is the wavelength of the incoming light. The duty ratio of the grating 38 shown in FIG. 24A is 0, and the duty ratio of the grating 38 shown in FIG. 24D is 0.45. The duty ratio of the grating 38 shown in FIGS. 24A to 24D is increased in this order. Therefore, the optical phase differences in the birefringence compensating elements 5i and 5j shown in FIGS. 24A to 24D are increased in this order.

The birefringence compensating elements 5i and 5j can be structured so that the optical phase difference varies continuously in accordance with a quadratic function as indicated by the solid lines in FIGS. 6 and 7 by continuously varying the duty ratio of the grating from 0 to 0.45 depending on the distance from the beam axis. As for the birefringence compensating element 5i, the optical phase difference is adjusted to 0° on the beam axis with the duty ratio of the grating adjusted to q=0, namely, with $\Delta n$=0. Additionally, at a position where the distance from the beam axis is 1.95 mm, which is the effective radius of the objective lens, the duty ratio of the grating is adjusted to q=0.45, namely, $\Delta n$=0.0887, and the grating height h is adjusted so that the optical phase difference is 65.7°. In this case, the grating height h is adjusted to h=833 nm, for the wavelength of the incoming light being $\lambda$=405 nm. As for the birefringence compensating element 5j, the duty ratio of the grating is adjusted to q=0.45, namely, $\Delta n$=0.0887, on the beam axis with the grating height h adjusted so that the optical phase difference is adjusted to 360°. Additionally, at a position where the distance from the beam axis is 1.95 mm, which is the effective radius of the objective lens, the height h of the grating is adjusted to h=4566 mm, and the duty ratio q of the grating, that is, $\Delta n$ is adjusted so that the optical phase difference is 294.3°. In this case, the duty ratio of the grating is adjusted to q=0.24, that is, $\Delta n$=0.0725, for the wavelength of the incoming light being $\lambda$=405 nm.

As thus described, the use of the birefringence compensating elements 5i and 5j allows perfectly suppressing the changes in the push-pull signal modulation factor and the DPD signal amplitude depending on the in-plane position of the optical recording medium.

The invention claimed is:

1. An optical head apparatus comprising:
a light source;
an objective lens focusing an output light emitted by said light source on a disc-shaped optical recording medium for which a groove or a pit for tracking is provided;
a photo-detector receiving a reflected light reflected by said optical recording medium;
a polarizing splitter unit splitting said output light and said reflected light;
a quarter-wave plate disposed between said polarizing splitter unit and said objective lens; and
a birefringence compensating unit reducing a change in an amplitude of a track error signal caused by birefringence in a protective layer of said optical recording medium,
wherein said protective layer exhibits vertical birefringence, and in-plane birefringence varying depending on an in-plane position, and
wherein said birefringence compensating unit provides compensation of said vertical birefringence for reducing the change in the amplitude of said track error signal depending on the variation in said in-plane birefringence.

2. The optical head apparatus according to claim 1, wherein said track error signal is detected by a push-pull method.

3. The optical head apparatus according to claim 1, wherein said track error signal is detected by a DPD method.

4. The optical head apparatus according to claim 1, wherein said birefringence compensating unit provides an optical phase difference for light passing through said protective layer, so as to cancel an optical phase difference caused by said vertical birefringence.

5. The optical head apparatus according to claim 1, wherein said birefringence compensating unit is provided between said quarter-wave plate and said objective lens.

6. The optical head apparatus according to claim 1, wherein said birefringence compensating unit includes a material member exhibiting uniaxial anisotropy in refractive index.

7. The optical head apparatus according to claim 6, wherein said birefringence compensating unit is divided into a plurality of regions by a plurality of straight lines crossing a beam axis around said beam axis,
wherein at least a group of regions out of said plurality of regions have an optic axis of said material member directed in a predetermined direction and are further divided in a plurality of fan-shaped regions by a circular arc(s) of one or more circles with center at said beam axis, said group of regions being positioned symmetrically with respect to said beam axis and arranged in a direction corresponding to a radial direction of said optical recording medium, and
wherein each of said plurality of fan-shaped regions is configured so that an absolute value of an optical phase difference between a polarization component in a direction parallel to said optic axis and a polarization component in a direction vertical to said optic axis is set to a predetermined value.

8. The optical head apparatus according to claim 7, wherein said predetermined direction is substantially directed in a radial direction of said circular arc.

9. The optical head apparatus according to claim 7, wherein said predetermined direction is substantially directed in a tangential direction of said circular arc.

10. The optical head apparatus according to claim 1, wherein said birefringence compensating unit is formed as an isotropic material member provided with uniaxial anisotropy in refractive index by form birefringence.

11. The optical head apparatus according to claim 10, wherein said birefringence compensating unit is provided with a radial grating with center at a beam axis.

12. The optical head apparatus according to claim 10, wherein said birefringence compensating unit is provided with a concentric grating with center at a beam axis.

13. An optical information recording/reproducing apparatus comprising:
an optical head apparatus comprising:
an optical head apparatus comprising:
a light source;
an objective lens focusing an output light emitted by said light source on a disc-shaped optical recording medium for which a groove or a pit for tracking is provided;
a photo-detector receiving a reflected light reflected by said optical recording medium;
a polarizing splitter unit splitting said output light and said reflected light;
a quarter-wave plate disposed between said polarizing splitter unit and said objective lens; and
a birefringence compensating unit reducing a change in an amplitude of a track error signal caused by birefringence in a protective layer of said optical recording medium;
a first circuit controlling an output of said light source;
a second circuit generating a readout signal, a focus error signal, and a track error signal based on an output signal outputted from said photo-detector; and
a third circuit controlling a position of said objective lens based on said focus error signal and said track error signal,
wherein said protective layer exhibits vertical birefringence, and in-plane birefringence varying depending on an in-plane position, and
wherein said birefringence compensating unit provides compensation of said vertical birefringence for reducing the change in the amplitude of said track error signal depending on the variation in said in-plane birefringence.

14. The optical information recording/reproducing apparatus according to claim 13, wherein said first circuit drives said light source based on a recording signal for recording data onto said optical recording medium.

15. The optical information recording/reproducing apparatus according to claim 13, wherein said first circuit drives said light source with a constant output.

* * * * *